(12) United States Patent
Li et al.

(10) Patent No.: US 12,322,073 B2
(45) Date of Patent: Jun. 3, 2025

(54) IMAGE PROCESSING MODEL GENERATION METHOD, PROCESSING METHOD, STORAGE MEDIUM, AND TERMINAL

(71) Applicant: TCL TECHNOLOGY GROUP CORPORATION, Huizhou (CN)

(72) Inventors: Songnan Li, Huizhou (CN); Yu Zhang, Huizhou (CN); Dahai Yu, Huizhou (CN)

(73) Assignee: TCL TECHNOLOGY GROUP CORPORATION, Huizhou (CN)

( * ) Notice: Subject to any disclaimer, the term of this patent is extended or adjusted under 35 U.S.C. 154(b) by 421 days.

(21) Appl. No.: 17/865,340

(22) Filed: Jul. 14, 2022

(65) Prior Publication Data
US 2022/0398698 A1 Dec. 15, 2022

Related U.S. Application Data

(63) Continuation of application No. PCT/CN2020/141932, filed on Dec. 31, 2020.

(30) Foreign Application Priority Data

Mar. 10, 2020 (CN) .......................... 202010162684.0
Mar. 10, 2020 (CN) .......................... 202010162709.7
Mar. 10, 2020 (CN) .......................... 202010163472.4

(51) Int. Cl.
*G06K 9/00* (2022.01)
*G06T 5/50* (2006.01)
(Continued)

(52) U.S. Cl.
CPC .................. *G06T 5/77* (2024.01); *G06T 5/50* (2013.01); *G06T 5/70* (2024.01); *G06T 5/73* (2024.01); *G06T 2207/20081* (2013.01)

(58) Field of Classification Search
CPC .... G06T 5/77; G06T 5/50; G06T 5/70; G06T 5/73; G06T 2207/20081; G06T 5/60;
(Continued)

(56) References Cited

U.S. PATENT DOCUMENTS 11,893,482 B2 * 2/2024 Zhou ...................... H04N 23/90
2019/0296062 A1 * 9/2019 Terauchi ............. G06F 9/30003

FOREIGN PATENT DOCUMENTS

CN 103379346 A 10/2013
CN 106412547 A 2/2017
(Continued)

OTHER PUBLICATIONS

Wan, Renjie, et al. "CRRN: Multi-scale guided concurrent reflection removal network." Proceedings of the IEEE Conference on Computer Vision and Pattern Recognition. 2018. (Year: 2018).*
(Continued)

*Primary Examiner* — Jayesh A Patel
(74) *Attorney, Agent, or Firm* — ANOVA LAW GROUP, PLLC

(57) ABSTRACT

An image processing method includes obtaining a to-be-processed image, performing an image processing operation on the to-be-processed image by inputting the to-be-processed image into a corresponding image processing model to obtain a processed image, and obtaining an output image according to the processed image of the corresponding image processing model. The image processing operation includes at least one of color deviation removal processing or ghost effect removal processing. The image processing model corresponding to the color deviation removal processing is a first image processing model, and the image processing model corresponding to the ghost effect removal processing is a second image processing model.

25 Claims, 19 Drawing Sheets

E100 — Obtain and input a to-be-processed image to the image processing model

E200 — Perform ghost effect removal on the to-be-processed image by the image processing model to obtain an output image corresponding to the to-be-processed image

(51) Int. Cl.
- *G06T 5/70* (2024.01)
- *G06T 5/73* (2024.01)
- *G06T 5/77* (2024.01)

(58) Field of Classification Search
CPC ........ G06T 2207/20084; G06N 3/0455; G06N 3/0464; G06N 3/09; H04N 5/211
See application file for complete search history.

(56) References Cited

FOREIGN PATENT DOCUMENTS

| | | | | |
|---|---|---|---|---|
| CN | 106709511 | A | | 5/2017 |
| CN | 107067367 | A | | 8/2017 |
| CN | 108401154 | A | | 8/2018 |
| CN | 110473154 | A | | 10/2018 |
| CN | 108965731 | A | | 12/2018 |
| CN | 109544482 | A | | 3/2019 |
| CN | 109584179 | A | | 4/2019 |
| CN | 109729332 | A | | 5/2019 |
| CN | 109978798 | A | | 7/2019 |
| CN | 109981991 | A | | 7/2019 |
| CN | 110097512 | A * | 8/2019 | ............ G06T 5/002 |
| CN | 110097519 | A | | 8/2019 |
| CN | 110166684 | A | | 8/2019 |
| CN | 110223254 | A * | 9/2019 | |
| CN | 110363171 | A | | 10/2019 |
| CN | 110520919 | A * | 11/2019 | ............... G09F 9/00 |
| CN | 110533752 | A | | 12/2019 |
| CN | 110602467 | A * | 12/2019 | ............ H04N 5/357 |
| CN | 111709891 | A * | 9/2020 | ........... G06K 9/6256 |
| JP | 2015036841 | A * | 2/2015 | ........... G06T 3/0081 |
| JP | 6324097 | B2 * | 5/2018 | |
| WO | WO-2020033524 | A1 * | 2/2020 | ............ G06F 18/214 |

OTHER PUBLICATIONS

Chen, Chen, et al. "Learning to see in the dark." Proceedings of the IEEE conference on computer vision and pattern recognition. 2018. (Year: 2018).*

Gharbi, Michaël, et al. "Deep bilateral learning for real-time image enhancement." ACM Transactions on Graphics (TOG) 36.4 (2017): 1-12. (Year: 2017).*

Szeliski, Richard. "Image alignment and stitching: A tutorial." Foundations and Trends® in Computer Graphics and Vision 2.1 (2007): 1-104. (Year: 2007).*

Kotera, Hiroaki, and Wang Hui. "Multi-scale image sharpening with noise reduction." NIP & Digital Fabrication Conference. vol. 18. Society of Imaging Science and Technology, 2002. (Year: 2002).*

Zhang, Xuaner, et al. "Zoom to learn, learn to zoom." Proceedings of the IEEE/CVF Conference on Computer Vision and Pattern Recognition. 2019. (Year: 2019).*

Zhou, Yuqian, et al. "Image Restoration for Under-Display Camera." arXiv preprint arXiv:2003.04857 (2020). (Year: 2020).*

Wang, Zhou, Eero P. Simoncelli, and Alan C. Bovik. "Multiscale structural similarity for image quality assessment." The Thrity-Seventh Asilomar Conference on Signals, Systems & Computers, 2003. vol. 2. Ieee, 2003. (Year: 2003).*

Ali, Shahnewaz, et al. "Supervised scene illumination control in stereo arthroscopes for robot assisted minimally invasive surgery." IEEE Sensors Journal 21.10 (2020): 11577-11587. (Year: 2020).*

Guo, Dong, et al. "Correcting over-exposure in photographs." 2010 IEEE Computer Society Conference on Computer Vision and Pattern Recognition. IEEE, 2010. (Year: 2010).*

CRRN: Multi-scale guided concurrent reflection removal network., Wan, Reniie, et al., IEEE, 2018, pp. 1-9 (Year: 2018).*

Learning to see in the Dark., Chen Chen et al., arXiv, 2018, pp. 1-10 (Year: 2018).*

Deep Bilateral Learning for Real-Time Image Enhancement, Michael Ghabri et al., ACM, 2017, pp. 118:1 to 118:12 (Year: 2017).*

Image Alignment and Stitching: A Tutorial, Richard Szeliski, now, 2006, pp. 1-104 (Year: 2006).*

Multi-Scale Image Sharpening with Noise Reguction, Hiroaki Kotera et al., IS&T, 2002, pp. 590-594 (Year: 2002).*

Zoom to Learn, Learn to Zoom, Xuaner Zhang et al., IEEE, 2019, pp. 1-9 (Year: 2019).*

Image Restoration for Under-Display Camera, Yuqian Zhou et al., arXiv, 2003, pp. 1-13 (Year: 2003).*

Multi-Scale Structural Similarity for Image Quality Assessment, Zhou Wang et al., IEEE, 2003, pp. 1398-1402 (Year: 2003).*

Supervised Scene Illumination—Surgery, Shahnewaz Ali et al., IEEE, 2020, pp. 11577-11587 (Year: 2020).*

Correcting Over-Exposure in Photographs, Dong Guo et al., IEEE, 2010, pp. 515-521 (Year: 2010).*

Siqi Han, "Research on Acceleration Method of HDR Imaging Based on Guided Up-sampling", Jun. 9, 2019. DOI:10.27675/d.cnki.gcydx.2019.000414.

The World Intellectual Property Organization (WIPO) International Search Report for PCT/CN2020/141932 Mar. 26, 2021 6 Pages.

Gharbi. Michael et al., "Deep Bilateral Learning for Real-Time Image Enhancement", Aug. 22, 2017 (Aug. 22, 2017), pp. 4-7.

* cited by examiner

Terminal 1    Server 2

IMAGE PROCESSING MODEL GENERATION METHOD, PROCESSING METHOD, STORAGE MEDIUM, AND TERMINAL

CROSS-REFERENCE TO RELATED APPLICATIONS

This application is a continuation of International Application No. PCT/CN2020/141932, filed Dec. 31, 2020, which claims priority to Chinese Application No. 202010162684.0, filed Mar. 10, 2020, Chinese Application No. 202010162709.7, filed Mar. 10, 2020, and Chinese Application No. 202010163472.4, filed Mar. 10, 2020, the entire content of all of which are incorporated herein by reference.

TECHNICAL FIELD

The present disclosure generally relates to the image processing technology field and, more particularly, to an image processing model generation method, a processing method, a storage medium, and a terminal.

BACKGROUND

An existing full-screen terminal generally includes a display panel area and a camera area. The camera area is located at a top of the display panel area. A screen-to-body ratio can be increased. However, the camera area also occupies a part of the display area, so a full screen cannot be truly achieved. Therefore, in order to install an imaging system below the display panel in the full-screen terminal. The existing display panel generally includes a substrate and a polarizer. When light passes through the display panel, on one hand, the display panel refracts the light, so that a light transmission rate is low. On another hand, the display panel absorbs the light, which can affect the image quality obtained by photographing. For example, image color obtained by photographing does not conform to a photographing scene, and image noise is increased.

SUMMARY

Embodiments of the present disclosure provide an image processing method. The method includes obtaining a to-be-processed image, performing an image processing operation on the to-be-processed image by inputting the to-be-processed image into a corresponding image processing model to obtain a processed image, and obtaining an output image according to the processed image of the corresponding image processing model. The image processing operation includes at least one of color deviation removal processing or ghost effect removal processing. The image processing model corresponding to the color deviation removal processing is a first image processing model, and the image processing model corresponding to the ghost effect removal processing is a second image processing model. Each image processing model is generated by generating a generated image corresponding to a first image by a predetermined network model according to the first image of a training image set, correcting a model parameter by the predetermined network model according to the second image corresponding to the first image and the generated image corresponding to the first image, and continuing to generate an updated generated image corresponding to a next first image according to the next first image in a next training image group of the training image set until a training condition of the predetermined network model satisfies a predetermined condition. The training image set includes a plurality of training image groups. Each training image group includes the first image and a second image. The first image is a color deviation image of the second image for the first image processing model, or the first image is a ghost effect image of the second image for the second image processing model.

Embodiments of the present disclosure provide a terminal, including a processor and a memory. The memory stores a program that, when executed by the processor, causes the processor to obtain a to-be-processed image, perform an image processing operation on the to-be-processed image by inputting the to-be-processed image into a corresponding image processing model to obtain a processed image, and obtain an output image according to the processed image of the corresponding image processing model. The image processing operation includes at least one of color deviation removal processing or ghost effect removal processing. The image processing model corresponding to the color deviation removal processing is a first image processing model, and the image processing model corresponding to the ghost effect removal processing is a second image processing model. Each image processing model is generated by generating a generated image corresponding to a first image by a predetermined network model according to the first image of a training image set, correcting a model parameter by the predetermined network model according to the second image corresponding to the first image and the generated image corresponding to the first image, and continuing to generate an updated generated image corresponding to a next first image according to the next first image in a next training image group of the training image set until a training condition of the predetermined network model satisfies a predetermined condition. The training image set includes a plurality of training image groups. Each training image group includes the first image and a second image. The first image is a color deviation image of the second image for the first image processing model, or the first image is a ghost effect image of the second image for the second image processing model.

Embodiments of the present disclosure provide a non-transitory computer readable storage medium. The non-transitory computer readable storage medium stores one or more computer programs, the one or more computer programs, when executed by a processor, causing the processor to obtain a to-be-processed image, perform an image processing operation on the to-be-processed image by inputting the to-be-processed image into a corresponding image processing model to obtain a processed image, and obtain an output image according to the processed image of the corresponding image processing model. The image processing operation includes at least one of color deviation removal processing or ghost effect removal processing. The image processing model corresponding to the color deviation removal processing is a first image processing model, and the image processing model corresponding to the ghost effect removal processing is a second image processing model. Each image processing model is generated by generating a generated image corresponding to a first image by a predetermined network model according to the first image of a training image set, correcting a model parameter by the predetermined network model according to the second image corresponding to the first image and the generated image corresponding to the first image, and continuing to generate an updated generated image corresponding to a next first image according to the next first image in a next training image group of the training image set until a training condition of the predetermined network model satisfies a predetermined condition. The training image set includes a plurality of training image groups. Each training image group includes the first image and a second image. The first image is a color deviation image of the second image for the first image processing model, or the first image is a ghost effect image of the second image for the second image processing model.

Beneficial effects include that compared with the prior art, the present disclosure provides a method for generating an image processing model, a processing method, a storage medium, and a terminal. The image processing model is obtained by inputting the first image of the predetermined training image set into the predetermined network model and training the predetermined network model through the generated image generated by the predetermined network model and the second image corresponding to the first image. The image processing model is obtained by performing deep learning on the color deviation process of the training image set having the plurality of training image groups. Each training image group includes a first image and a second image. The first image is a color deviation image corresponding to the second image. In the present disclosure, the trained image processing model is obtained by performing the deep learning based on the training image set to perform the color deviation removal processing. Thus, color deviation adjustment may be performed quickly on the image to improve the color quality of the image to improve the image quality.

DETAILED DESCRIPTION OF THE EMBODIMENTS

Figure 1:
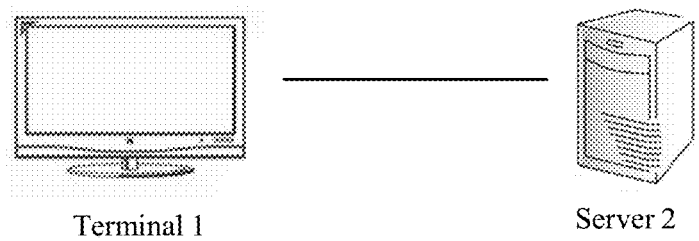
FIG. 1 is a schematic diagram of a generation method of an image processing model according to some embodiments of the present disclosure.

The present disclosure provides a generation method of an image processing model, a processing method, a storage medium, and a terminal. To make the purposes, technical solutions, and effects of the present disclosure clearer, the present disclosure is further described in detail below in connection with the accompanying drawings. Embodiments of the present disclosure are only used to explain the present disclosure and are not intended to limit the present disclosure.

Those skilled in the art should understand that singular forms "a," "an," "the," and "this" as used herein may also include plural forms unless otherwise specified. The phrase "comprising" used in the specification of the present disclosure means existence of features, integers, steps, operations, elements, and/or components, but does not preclude the existence or addition of one or more other features, integers, steps, operations, elements, components, and/or groups thereof. When an element is "connected" or "coupled" to another element, the element may be directly connected or coupled to the another element, or an intermediate element may also exist. In addition, "connection" or "coupling" as used herein may include a wireless connection or a wireless coupling. The phrase "and/or" as used herein may include all or any unit of one or more related listed items and all combinations of one or more of the related listed items.

Those skilled in the art should understand that, unless otherwise specified, all terms (including technical and scientific terms) used herein have the same meaning as commonly understood by those of ordinary skill in the art to which this disclosure belongs. Those terms defined in a generic dictionary should be understood to have a meaning that is consistent with the meaning in the context of the existing technology, and should not be interpreted in an idealized or overly formal sense unless otherwise specified here.

The inventor finds that in order to realize the full screen of the terminal, a front camera of the terminal needs to be installed below the display panel. However, the existing display panel normally includes a substrate and a polarizer. When light passes through the display panel, on one hand, the display panel refracts the light so that the light transmission rate is low. On another hand, the display panel absorbs the light, which can affect the image quality obtained through photography. For example, the image color obtained by the photographing does not conform to a photographing scene, the image noise is increased, and the image is blurred.

In order to solve the above problem, in embodiments of the present disclosure, a second image may be used as a target image. A color deviation image (i.e., a first image) of the second image may be used as a training sample image. The first image may be input into a predetermined network model. A generated image corresponding to the first image may be output through the predetermined network model. Then, the predetermined network model may be trained according to the second image corresponding to the first image and the generated image corresponding to the first image to obtain a trained image processing model. In embodiments of the present disclosure, deep learning may be performed on the predetermined network model to obtain the image processing model. Thus, the trained image processing model may remove the color deviation in the image. The image captured by an under-screen imaging system may be processed by the trained image processing model to remove the color deviation carried in the image. Therefore, the image quality of the image captured by the under-screen imaging system may be improved.

For example, embodiments of the present disclosure may be applied to the scenario shown in FIG. 1. In the scenario, first, a terminal 1 may be configured to collect a training image set and input the training image set to a server 2. Thus, the server 2 may be configured to train the predetermined network model according to the training image set. The server 2 may be configured to store a predetermined network model in advance, respond to the training image set that is input by the terminal 1, and input a first image in the training image set as an input item into the predetermined network model. Then, the server 2 may be configured to obtain a generated image output by the predetermined network model and correct the predetermined network model through a second image corresponding to the first image and the generated image corresponding to the first image. Then, the server 2 may be configured to continue to input the first image in the training image set into the predetermined network model and continue to generate a generated image corresponding to the first image according to the first image in the training image set until a training condition of the predetermined network model satisfies a predetermined condition to obtain the image processing model.

In the application scenario, although the actions of embodiments of the present disclosure are described as being partially executed by the terminal 1 and partially being executed by the server 2, these actions may be executed entirely by the server 2, or entirely executed by the terminal 1. The present disclosure is not limited to an execution object, as long as the actions disclosed in embodiments of the present invention are performed.

Further, after the trained image processing model is obtained, the trained image processing model may be configured to process an image captured by a terminal having an under-screen imaging system (e.g., an under-screen camera). For example, the image captured by the terminal having the under-screen imaging system (e.g., the under-screen camera) may be input as an input item to the trained image processing model. The image may be processed by the trained image processing model to obtain a processed image. Thus, color deviation removal may be quickly performed on the image to improve the image quality of the image captured by the under-screen camera. In practical applications, the trained image processing model may be configured at the terminal having the under-screen imaging system (e.g., the under-screen camera) as a color deviation removal function circuit. When the terminal having the under-screen imaging system (e.g., the under-screen camera) captures an image, the color deviation removal function circuit may be started. The color deviation removal processing may be performed on the image through the color deviation removal function circuit. Thus, the terminal having the under-screen imaging system (e.g., the under-screen camera) may output an image that the color deviation is removed. Therefore, the terminal having the under-screen imaging system (e.g., the under-screen camera) may directly output an image after the color deviation removal processing is performed.

The above application scenario is only shown to facilitate understanding of the present disclosure. Embodiments of the present disclosure are not limited to the application scenarios. Embodiments of the present disclosure may be applied to any application scenario.

The disclosure is further described below with reference to the accompanying drawings and according to the description of embodiments of the present disclosure.

Embodiments 1

Figure 2:
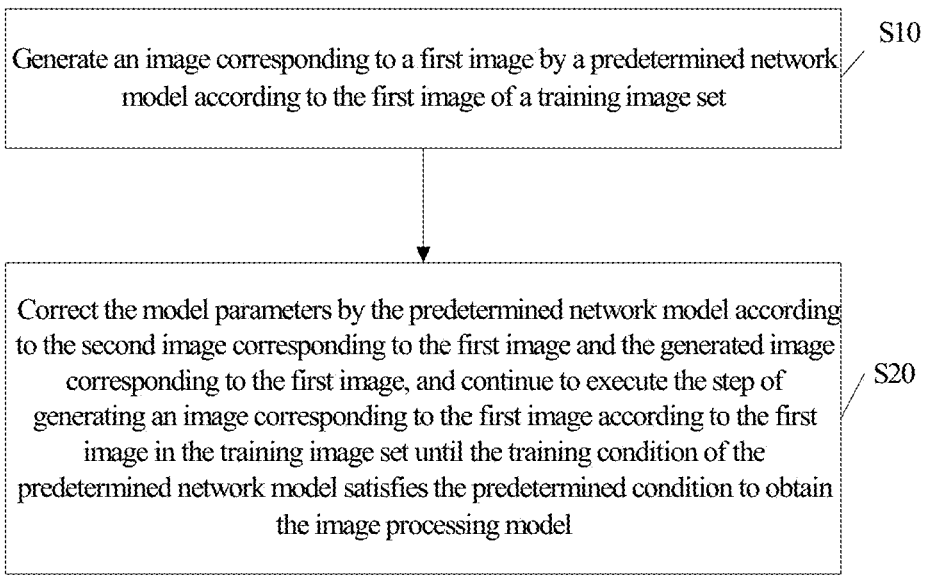
FIG. 2 is a schematic flowchart of a generation method of an image processing model according to some embodiments of the present disclosure.
Figure 4:
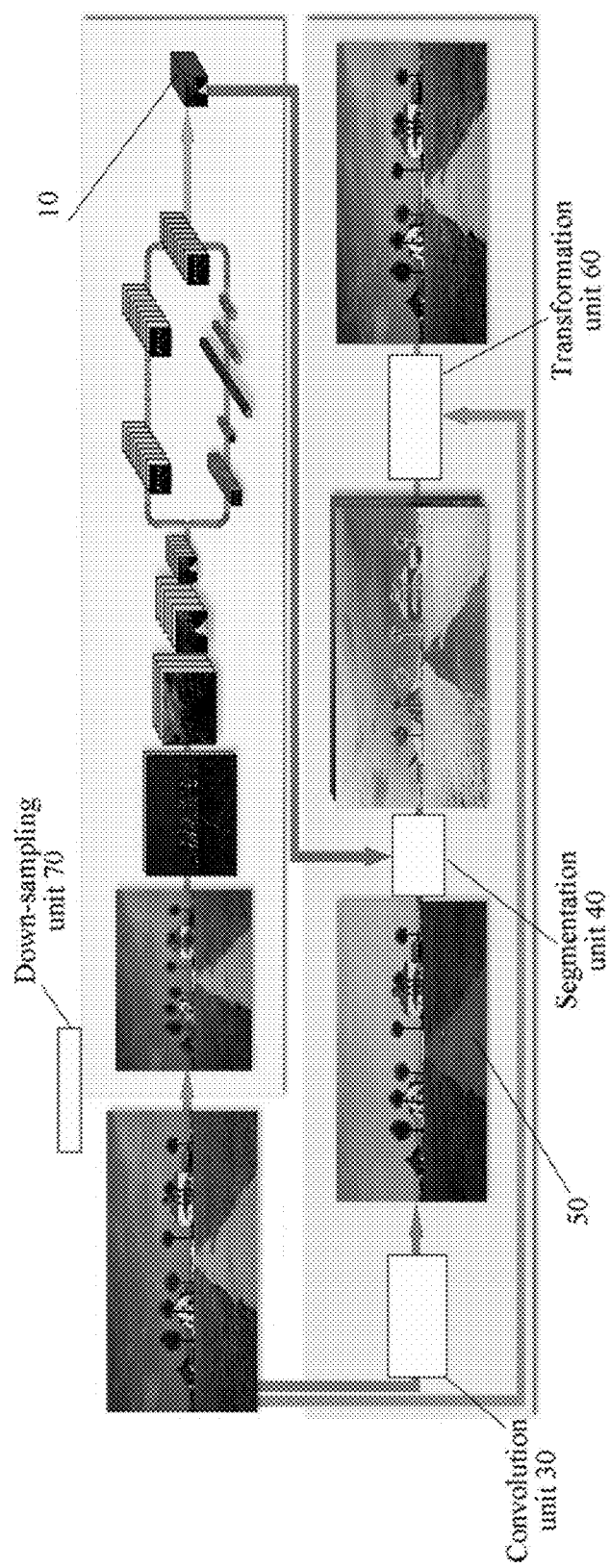
FIG. 4 is a schematic flowchart of a generation method of an image processing model according to some embodiments of the present disclosure.

Embodiments of the present disclosure provide a generation method of an image processing model. As shown in FIGS. 2 and 4, the method includes the following processes.

At S10, a predetermined network model is configured to generate an image corresponding to a first image according to the first image of a training image set.

Figure 5:
FIG. 5 is a schematic diagram of a first image according to some embodiments of the present disclosure.
Figure 6:
FIG. 6 is a schematic diagram of a second image according to some embodiments of the present disclosure.

In some embodiments, the predetermined network model may include a deep learning network model. The predetermined network model may be trained based on a predetermined training image set. The training image set may include a plurality of training image sets having different image contents. Each training image group may include a first image and a second image. The first image may include a color deviation image corresponding to the second image. The first image as the color deviation image corresponding to the second image may indicates that the first image corresponds to the second image. The first image and the second image may represent a same image scene. A quantity of first target pixels satisfying a predetermined color deviation condition of the first image may satisfy a predetermined quantity condition. The second image may include a normal display image. A plurality of first target pixels satisfying the predetermined color deviation condition may exist in the first image. The quantity of the plurality of first target pixels may satisfy the predetermined quantity condition. For example, the second image is an image as shown in FIG. 6, and the first image is an image as shown in FIG. 5. an image content of the first image is the same as an image content of the second image. However, color of an apple in the first image is different from color of an apple in the second image. For example, in FIG. 5, the color of the apple in the first image is bluish green. In FIG. 6, the color of the apple in the second image is dark green.

Further, the predetermined color deviation condition may include that an error between a display parameter of the first target pixel of the first image and a display parameter of a second target pixel of the second image satisfies a predetermined error condition. The first target pixel may have a one-to-one correspondence with the second target pixel. The display parameter may be a parameter that reflects a color corresponding to a pixel. For example, the display parameter may be an RGB value of a pixel. An R value may be a red channel value, a G value may be a green channel value, and a value B may be a blue channel value. In some other embodiments, the display parameter may also be a hsl value of the pixel. An h value may be a hue value, an l value may be a brightness value, and an s value may be a saturation value. In addition, when the display parameter is the RGB value of the pixel, the display parameter of any pixel of the first image and the second image may include three display parameter values of the R value, the G value, and the B value. When the display parameter is the hsl value of the pixel, the display parameter of any pixel of the first image and the second image may include three display parameter values, such as the h value, the l value, and the s value.

The predetermined error condition may be used to measure whether the first target pixel is a pixel that satisfies the predetermined color deviation condition. The predetermined error condition may include a predetermined error threshold. When the error satisfies the predetermined error condition, the error may be greater than or equal to the predetermined error threshold. In addition, the display parameter may include a plurality of display parameters. For example, the display parameter may include an RGB value of a pixel. The display parameter may include three display parameter values of the R value, the G value, and the B value. When the display parameter is the hsl value of the pixel, the display parameter may include three display parameter values, such as the h value, the l value, and the s value. Therefore, the error may be an error maximum value of the display parameter values of the display parameter, or an error minimum value of the display parameter values of the display parameter, or an error average value of the display parameter values. For example, the display parameter may be the RGB value of the pixel, and description may be made below. The display parameter of the first target pixel may be (55, 86, 108), and the display parameter of the second target pixel may be (58, 95, 120). Thus, error values of the display parameter values may include 3, 9, and 12. When the error between the first target pixel and the second target pixel is the error maximum value of the display parameter values, the error is 12. When the error between the first target pixel and the second target pixel is the error minimum value of the display parameter values, the error is 3. When the error between the first target pixel and the second target pixel is the error average value of the display parameter values, the error is 8. In a possible implementation manner, an error of only one parameter (e.g., R, G, or B) in RGB or errors of any two parameters may be considered. When the display parameter is the hsl value of the pixel, the same procedure may be included.

Further, the second target pixel that is used to calculate the error with the first target pixel may have a one-to-one correspondence with the first second target pixel. For the first target pixel, a unique second target pixel that corresponds to the first target pixel may exist in the second image. The first target pixel corresponding to the second target pixel may indicate that a pixel position of the first target pixel in the first image may correspond to a pixel position of the second target pixel in the second image. For example, the pixel position of the first target pixel in the first image may be (5, 6), and the pixel position of the second target pixel in the second image may be (5, 6). In addition, the first target pixel may be any pixel in the first image, or may be any pixel in a target region in the first image. The target region may be a region where an item is located in the first image. The region where the item is located may be a region corresponding to a person or an object in the image. For example, as shown in FIG. 5, the target region is a region where the apple is located in the first image. That is, all the pixels in the first image may have the color deviation when compared with the second image. That is, all the pixels in the first image may be the first target pixels. In some embodiments, only some of the pixels may have the color deviation when compared with the second image. That is, some of the pixels in the first image may be the first target pixels. For example, when only a partial region (e.g., an area corresponding to the apple in the figure) in an image has the color deviation compared with the second image, the image may also be understood as a color deviation image corresponding to the second image, i.e., the first image.

Further, the first image corresponding to the second image may indicate that the first image and the second image may have a same image size and correspond to a same image scene. The first image and the second image corresponding to the same image scene may indicate that a similarity between the image content of the first image and the image content of the second image may reach a predetermined threshold. Since the first image and the second image have the same image size, when the first image and the second image coincide, a coverage rate of an item of the first image over a corresponding item of the second image may reach a predetermined condition. The predetermined threshold may be 99%, and the predetermined condition may be 99.5%. In an actual application, the first image may be captured through the under-screen imaging system. The second image may be captured by a normal on-screen imaging system (e.g., an on-screen camera), or may be obtained through a network (e.g., Baidu), or sent by another external apparatus (e.g., a smartphone).

In some embodiments of the present disclosure, the second image may be captured by a normal on-screen imaging system. The second image and the first image may have a same photographing parameter. The photographing parameter may include an exposure parameter of the imaging system. The exposure parameter may include an aperture, a shutter speed, a sensitivity, a focus, and a white balance. In an actual application, the photographing parameter may further include ambient light, a photographing angle, and a photographing range. For example, the first image is the image obtained by capturing a scene through the under-screen camera as shown in FIG. 5. The second image is the image obtained by capturing the scene through the on-screen camera as shown in FIG. 6.

Further, in embodiments of the present disclosure, in order to reduce an effect of an image difference between the first image and the second image on the training of the predetermined network model, the image content of the first image and the image content of the second image may be completely the same. That is, the first image and the second image having the same image content may indicate that an item content of the first image may be the same as an item content of the second image. The image size of the first image may be the same as the image size of the second image. When the first image and the second image coincide, the item in the first image may cover the object corresponding item in the second image.

For example, the image size of the first image may be 400×400. The image content of the first image may be a circle. A position of a circle center of the circle in the first image may be (200, 200), and a radius length may be 50 pixels. Then, the image size of the second image may be 400×400. The image content of the second image may be also a circle. A position of a circle center of the circle in the second image may be (200, 200). A radius length may be 50 pixels. When the first image is placed over the second image and coincides with the second image, the first image may cover the second image, and the circle in the first image may overlap with the circle in the second image.

Further, the second image may be captured by the normal on-screen imaging system. The first image and the second image may be captured by two different imaging systems. When the imaging system is switched, a photographing angle and/or a photographing position of the on-screen imaging system and a photographing angle and/or a photographing position of the under-screen imaging system may be changed. Thus, the first image and the second image may not be aligned in space. Thus, in some embodiments, when the second image is captured by the on-screen imaging system and the first image is captured by the under-screen imaging system, the on-screen imaging system and the under-screen imaging system may be arranged at a same fixing frame. The on-screen imaging system and the under-screen imaging system may be arranged at the fixing frame side by side. The on-screen imaging system may be kept in contact with the under-screen imaging system. Meanwhile, the on-screen imaging system and the under-screen imaging system may be connected to a wireless setting (e.g., a Bluetooth watch). Shutters of the on-screen imaging system and the under-screen imaging system may be triggered by the wireless setting. The position change of the on-screen imaging system and the under-screen imaging system may be reduced in a photographing process, and the alignment of the first image and the second image may be improved in space. Of course, photographing time and a photographing range of the on-screen imaging system may be same as photographing time and a photographing range of the under-screen imaging system.

In addition, in the photographing process of the first image and the second image, the photographing positions, the photographing angles, the photographing time, the exposure coefficients of the under-screen imaging system and the on-screen imaging system may be fixed. However, due to an environmental parameter (e.g., light intensity, wind blowing the imaging system, etc.), the first image captured by the under-screen imaging system and the second image captured by the on-screen imaging system may also not be aligned in space. Therefore, before the first image in the training image set is input into the predetermined network model, the first image and the second image in each training image group of the training image set may be aligned. Thus, in some embodiments, before the predetermined network model generates the generated image corresponding to the first image according to the first image of the training image set, the method may further include the following process.

At M10, for each training image group of the training image set, alignment processing is performed on the first image and the second image corresponding to the first image in the training image group to obtain an aligned image aligned with the second image, and the aligned image is used as the first image.

In some embodiments, processing for each training image group in the training image set may indicate that the alignment processing is performed on each training image group in the training image set. The alignment processing may be performed on each training image group, after the training image set is obtained, to obtain an aligned training image group. After each training image group is aligned, the first image of each training image group may be input into the predetermined network model. In some other embodiments, before the first image of each training image group is input into the predetermined network model, the alignment processing may be performed on the training image group to obtain the aligned training image group corresponding to the training image group. Then, the first image in the aligned training image group may be input into the predetermined network model. In some embodiments, after the training image set is obtained, the alignment processing may be performed on each training image group. After all the training image groups are aligned, the first image in the training image set may be input into the predetermined network model.

Further, performing the alignment processing on the first image and the second image corresponding to the first image in the training image group may include aligning the pixel in the first image with the corresponding pixel in the second image by using the second image as a reference to causing the alignment rate of the pixel in the first image and the pixel in the second image to reach the predetermined value, e.g., 99%. The alignment of the pixel in the first image and the corresponding pixel in the second image may indicate that, for the first pixel in the first image and the second pixel corresponding to the first pixel in the second image, if a pixel coordinate corresponding to the first pixel is the same as a pixel coordinate corresponding to the second pixel, the first pixel is aligned with the second pixel. If the pixel coordinate corresponding to the first pixel is different from the pixel coordinate corresponding to the second pixel, the first pixel is not aligned with the second pixel. The aligned image may refer to an image obtained by aligning the first image. The pixel coordinate of each pixel in the aligned image may be the same as the pixel coordinate of the corresponding pixel in the second image. In addition, after the aligned image is obtained, the aligned image may be used to replace the corresponding first image to update the training image group. Thus, the first image and the second image in the updated training image group may be aligned in space.

Figure 7:
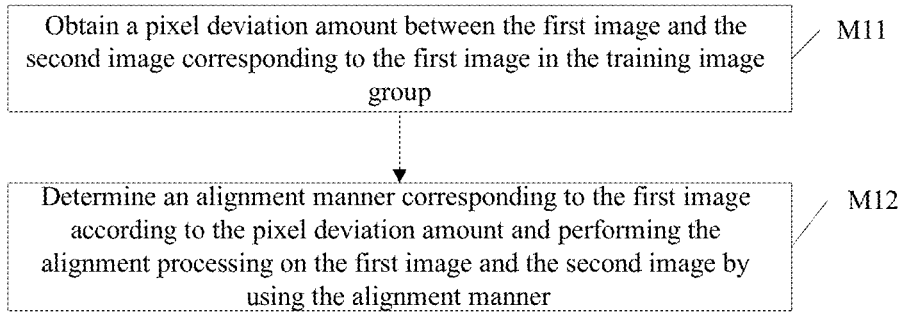
FIG. 7 is a schematic flowchart of a process of determining an alignment mode according to some embodiments of the present disclosure.

Further, since alignment degrees of the first images and the second images in different training image groups are different, on the basis of achieving alignment, the first images and the second images with different alignment degrees may be aligned in different alignment manners. Thus, the training image groups may be aligned in an alignment manner with low complexity. Therefore, in some embodiments, as shown in FIG. 7, aligning the first image with the second image corresponding to the first image in the training image group includes obtaining a pixel deviation amount between the first image and the second image corresponding to the first image in the training image group (M11), and determining an alignment manner corresponding to the first image according to the pixel deviation amount and performing the alignment processing on the first image and the second image by using the alignment manner (M12).

In some embodiments, the pixel deviation amount may refer to a total quantity of first pixels in the first image that is not aligned with the second pixels corresponding to the first pixels in the first image. The pixel deviation amount may be obtained by obtaining a first coordinate of a first pixel in the first image and a second coordinate of a second pixel in the second image, and then comparing the first coordinate of the first pixel with the second coordinate of the corresponding second pixel. If the first coordinate is the same as the second coordinate, the first pixel may be determined to be aligned with the corresponding second pixel. If the first coordinate is different from the second coordinate, the first pixel may be determined to not be aligned with the corresponding second pixel. Then, the total number of all the first pixels that are not aligned to obtain the pixel deviation amount. For example, when the first coordinate of the first pixel in the first image is (200, 200), the second coordinate of the second pixel corresponding to the first pixel in the second image is (201, 200), the first pixel is not aligned with the second pixel, and the total number of the first pixels that is not aligned may be added by one. When the first coordinate of the first pixel in the first image is (200, 200), and the second coordinate of the second pixel corresponding to the first pixel in the second image is (200, 200), the first pixel is aligned with the second pixel, and the total number of the first pixels that is not aligned may remain the same.

Further, in order to determine a correspondence between the pixel deviation amount and the alignment manner, a deviation amount threshold may need to be set. When the pixel deviation amount of the first image is obtained, the alignment manner corresponding to the pixel deviation amount may be determined by comparing the obtained pixel deviation amount with a predetermined deviation amount threshold. Therefore, in some embodiments, determining the alignment manner corresponding to the first image according to the pixel deviation amount and aligning the first image with the second image by using the alignment manner includes, when the pixel deviation amount is less than or equal to the predetermined deviation amount threshold, performing the alignment processing on the first image by using the second image as the reference according to mutual information of the first image and the second image (M121).

Determining the alignment manner corresponding to the first image according to the pixel deviation amount and aligning the first image with the second image by using the alignment manner includes further includes, when the pixel deviation amount is greater than the predetermined deviation amount threshold, extracting a first pixel set of the first image and a second pixel set of the second image, calculating a coordinate difference between the first pixel and the corresponding second pixel for each first pixel in the first pixel set, and performing position adjustment on the first pixel according to the coordinate difference corresponding to the first pixel to align the first pixel with the second pixel corresponding to the first pixel (M122). The first pixel set may include a plurality of first pixels in the first image. The second pixel set may include a plurality of second pixels in the second image. The second pixels in the second pixel set may have a one-to-one correspondence with the first pixels in the first pixel set.

In some embodiments, the predetermined deviation amount threshold may be set in advance. For example, the predetermined deviation amount threshold may be 20. The pixel deviation amount less than or equal to the predetermined deviation amount threshold may indicate that, when the pixel deviation amount is compared to the predetermined deviation amount threshold, the pixel deviation amount may be less than or equal to the predetermined deviation amount threshold. When the pixel deviation amount is less than or equal to the predetermined deviation amount threshold, the deviation of the first image and the second image in space may be relatively small. Thus, the first image and the second image may be aligned according to the mutual information of the first image and the second image. In some embodiments, a process of aligning the first image and the second image with the mutual information between the first image and the corresponding second image may adopt an image registration method. In the image registration method, the mutual information may be used as a measurement criterion. An alignment parameter may be obtained by iteratively optimizing the measurement criterion by an optimizer. The first image may be aligned with the second image by the optimizer registering with the alignment parameter, which ensures an alignment effect of the first image and the second image, reduces the alignment complexity of the first image and the second image, and improves the alignment efficiency. In embodiments of the present disclosure, the optimizer may be mainly configured to optimize the measurement criterion with translation and rotation transformation.

Further, the pixel deviation amount being greater than the predetermined deviation threshold may indicate that the first image and the second image are not aligned in space to a relatively high degree. Thus, the alignment effect may need to be focused on. Therefore, the first image and the second image may be aligned by selecting the first pixel set in the first image and the second pixel set in the second image. The first pixels of the first pixel set may have a one-to-one correspondence with the second pixels in the second pixel set. Thus, for any first pixel in the first pixel set, a second pixel may be found in the second pixel set, and the position of the second pixel in the second image may correspond to the position of the first pixel in the first image. In addition, after the first pixel set/the second pixel set are obtained, the first pixel set and the second pixel set may be determined according to a correspondence between the first pixel and the second pixel. For example, the first pixel set may be generated by randomly selecting a plurality of first pixels in the first image. The second pixel may be determined according to the first pixels included in the first pixel set.

Meanwhile, in embodiments of the present disclosure, the first pixel set and the second pixel set may be obtained by a scale-invariant feature transform (sift) manner. That is, the first pixel in the first pixel set may be a first sift feature point in the first image, and the second pixel in the second pixel set may be a second sift feature point of the second image. Correspondingly, calculating the coordinate difference between the first pixel and the corresponding second pixel may include performing point-to-point matching on the first sift feature point in the first pixel set and the second sift feature point in the second pixel set to obtain a coordinate difference between the first sift feature point and the corresponding second sift feature point and performing position transformation on the first sift feature point according to the coordinate difference corresponding to the first sift feature point to align the first sift feature point and the second sift feature point corresponding to the first sift feature point. Thus, the position of the first sift feature point in the first image and the position of the second sift feature point in the second image may be the same, and the first image may be aligned with the second image.

Figure 3:
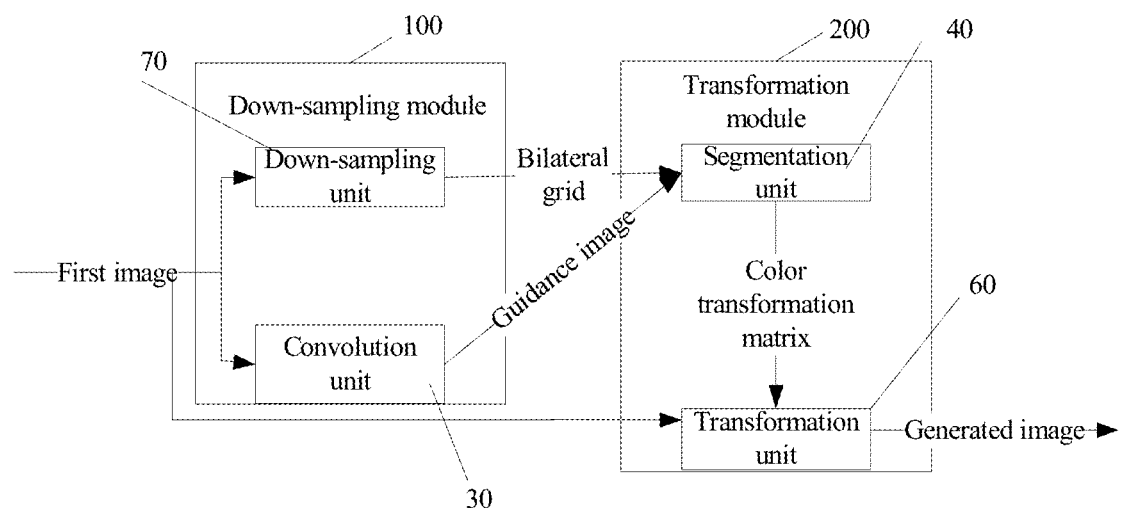
FIG. 3 is a schematic diagram of a principle of a predetermined network model of a generation method of an image processing model according to some embodiments of the present disclosure.

Further, in embodiments of the present disclosure, as shown in FIGS. 3, 4, and 7, the predetermined network model includes a down-sampling module 100 and a transformation module 200. Correspondingly, the predetermined network model generating a generated image corresponding to the first image according to the first image in the training image set includes the following processes.

At S11, the first image in the training image set is input into the down-sampling module, and a bilateral grid corresponding to the first image and a guidance image corresponding to the first image are obtained by the down-sampling module. Resolution of the guidance image is the same as resolution of the first image.

At S12, the guidance image, the bilateral grid, and the first image are input into the transformation module, and the generated image corresponding to the first image is generated by the transformation module.

In some embodiments, the bilateral grid 10 may be a three-dimensional bilateral grid obtained by adding a dimension that represents pixel intensity in the pixel coordinate of the two-dimensional image. Three dimensions of the three-dimensional bilateral grid may include a horizontal axis and a longitudinal axis in the pixel coordinate of the two-dimensional image, and the added dimension that represents the pixel intensity. The guidance image may be obtained by performing a pixel-level operation on the first image. The resolution of the guidance image 50 may be the same as the resolution of the first image. For example, the guidance image 50 may be a grayscale image corresponding to the first image.

Figure 8:
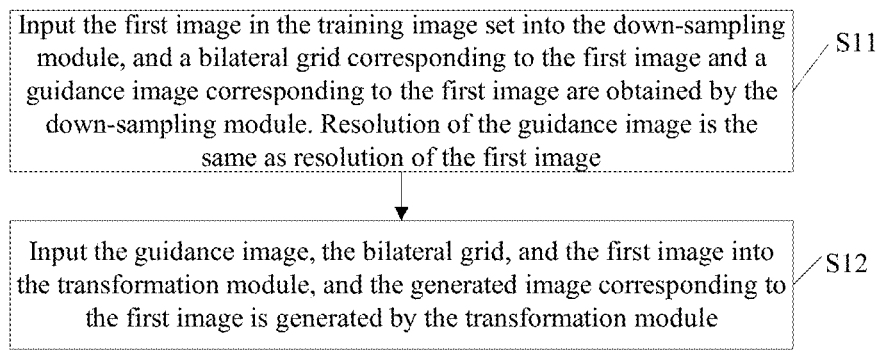
FIG. 8 is a schematic flowchart of step S10 of a generation method of an image processing model according to some embodiments of the present disclosure.

Further, since the down-sampling module 100 is configured to output the bilateral grid 10 and the guidance image 50 corresponding to the first image, the down-sampling module 100 may include a down-sampling unit 70 and a convolution unit 30. The down-sampling unit 70 may be configured to output the bilateral grid 10 corresponding to the first image. The convolution unit 30 may be configured to output the guidance image 50 corresponding to the first image. Correspondingly, as shown in FIGS. 3, 4, and 8, the first image in the training image set is input into the down-sampling module. Obtaining the bilateral grid corresponding to the first image and the guidance image corresponding to the first image through the down-sampling module includes inputting the first image of the training image set into the down-sampling unit and the convolution unit (S111) and obtaining the bilateral grid corresponding to the first image through the down-sampling unit and obtaining the guidance image corresponding to the first image through the convolution unit (S112).

In some embodiments, the down-sampling unit 70 may be configured to down-sample the first image to obtain a feature image corresponding to the first image and generate the bilateral grid corresponding to the first image according to the feature image. A quantity of spatial channels of the feature image may be greater than a quantity of spatial channels of the first image. The bilateral grid may be generated according to a local feature and a global feature of the feature image. The local feature may include a feature extracted from a local region of the image, for example, an edge, an angular point, a line, a curve, an attribute region, etc. In embodiments of the present disclosure, the local feature may include a regional color feature. The global feature may refer to a feature that represents an attribute of an entire image, e.g., a color feature, a texture feature, and a shape feature. In embodiments of the present disclosure, the global feature may include the color feature of the entire image.

Further, in some embodiments, the down-sampling unit 70 may include a down-sampling layer, a local feature extraction layer, a global feature extraction layer, and a fully connected layer. The local feature extraction layer may be connected between the down-sampling layer and the fully connected layer. The global feature extraction layer may be connected between the down-sampling layer and the fully connected layer. The global feature extraction layer may be connected in parallel to the local feature extraction layer. The first image may be input to the down-sampling layer as an input item, and the feature image may be output through the down-sampling layer. The feature image of the down-sampling layer may be input to the local feature extraction layer and the global feature extraction layer. The local feature extraction layer may be configured to extract a local feature of the feature image. The global feature extraction layer may be configured to extract a global feature of the feature image. The local feature output by the local feature extraction layer and the global feature output by the global feature extraction layer may be input to the fully connected layer. Thus, the bilateral grid corresponding to the first image may be output by the full connection layer. In addition, in some embodiments, the down-sampling layer may include a down-sampling convolutional layer and four first convolutional layers. A convolution kernel of a first convolutional layer may be 1×1, and a step size of the first convolutional layer may be 1. The local feature extraction layer may include two second convolutional layers. A convolution kernel of each second convolutional layer may be 3×3, and a step size of each second convolutional layer may be 1. The global feature extraction layer may include two third convolutional layers and three fully connected layers. A convolution kernel of each third convolutional layer may be 3×3, and a step size of each third convolutional layer may be 2.

Further, the convolution unit 30 may include a fourth convolutional layer. The first image may be input to the fourth convolutional layer. The guidance image may be output by the fourth convolutional layer. The guidance image may have the same resolution as the first image. For example, the first image may be a color image. The fourth convolutional layer may be configured to perform a pixel-level operation on the first image to cause the guidance image to be a gray scale image of the first image.

For example, the first image I may be input to the down-sampling convolution layer. A three-channel low-resolution image with a size of 256×256 may be output through the down-sampling convolutional layer. A 64-channel feature image with a size of 16×16 may be obtained by passing the three-channel low-resolution image with a size of 256×256 sequentially through the four first convolutional layers. A local feature L may be obtained by inputting the 64-channel feature image with the size of 16×16 into the local feature extraction layer. A global feature may be obtained by inputting the 64-channel feature image with the size of 16×16 into the global feature extraction layer. The local feature and the global feature may be input into the fully connected layer. The bilateral grid may be output by the fully connected layer. In addition, the first image may be input to the convolution unit. The guidance image corresponding to the first image may be output by the convolution unit.

Figure 9:
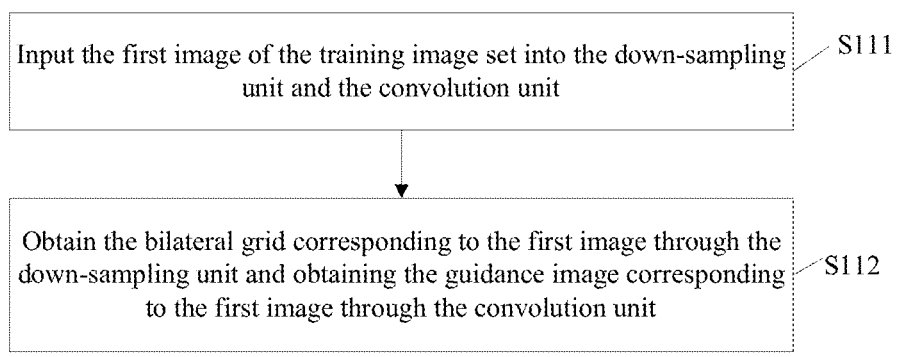
FIG. 9 is a schematic flowchart of step S11 of the generation method of the image processing model according to some embodiments of the present disclosure.

Further, in some embodiments, the transformation module 200 may include a segmentation unit 40 and a transformation unit 60. Correspondingly, as shown in FIGS. 3, 4, and 9, inputting the guidance image, the bilateral grid, and the first image into the transformation module, and generating the generated image corresponding to the first image by the transformation module includes inputting the guidance image into the segmentation unit and segmenting the bilateral grid by the segmentation unit to obtain a color transformation matrix of the pixels in the first image (S121) and inputting the first image and the color transformation matrix of the pixels in the first image into the transformation unit and generating the generated image corresponding to the first image by the transformation unit (S122).

In some embodiments, the segmentation unit 40 may include an up-sampling layer. Input items of the up-sampling layer may include the guidance image and the bilateral grid. The color transformation matrix of the pixels in the first image may be obtained by up-sampling the bilateral grid through the guidance image. An up-sampling process of the up-sampling layer may include up-sampling the bilateral grid with reference to the guidance image to obtain the color transformation matrix of the pixels in the first image. In addition, input items of the transformation unit 60 may include the color transformation matrix of the pixels and the first image. The generated image corresponding to the first image may be obtained by transforming the colors of the corresponding pixels in the first image through the color transformation matrix of the pixels.

At S20, the predetermined network model is configured to correct the model parameters according to the second image corresponding to the first image and the generated image corresponding to the first image, and continue to execute the step of generating a generated image corresponding to the first image according to the first image in the training image set until the training condition of the predetermined network model satisfies the predetermined condition to obtain the image processing model.

In some embodiments, the predetermined condition may include a loss function value satisfying a predetermined requirement or a number of times of training reaching a predetermined number of times. The predetermined requirement may be determined according to the precision of the image processing model, which is not described in detail here. The predetermined number of times may be a maximum number of times of the training of the predetermined network model, e.g., 5000 times. Therefore, after the predetermined network model outputs the generated image, the loss function value of the predetermined network model may be calculated according to the generated image and the second image. After the loss function value is calculated, whether the loss function value satisfies the predetermined requirement or not may be determined. If the loss function value satisfies the predetermined requirement, the training may be ended. If the loss function value does not satisfy the predetermined requirement, whether the number of times of the training of the predetermined network model reaches the predetermined number of times may be determined. If the number of times of the training does not reach the predetermined number of times, the network parameters of the predetermined network model may be corrected according to the loss function value. If the number of times of the training reaches the preset number of times, the training may be ended. Thus, whether the training of the predetermined network model is ended may be determined according to the loss function value and the number of times of the training, which may avoid the training of the predetermined network model from entering an infinite loop due to the reason that the loss function value cannot reach the predetermined requirement.

Further, since the network parameter of the predetermined network model is modified when the training condition of the predetermined network model does not satisfy the predetermined condition (i.e., the loss function value does not meet the predetermined requirement and the number of times of the training does not reach the predetermined number of times), the network model may need to be continuously trained after the network parameter of the predetermined network model is corrected according to the loss function value. That is, the step of inputting the first image in the training image set into the predetermined network model may continue to be executed. The first image may continue to be input to the predetermined network model as the input item of the predetermined network model. For example, each of the first images in the training image set may have a unique image identifier (e.g., image number). An image identifier of a first image that is input in the first training may be different from an image identifier of a first image that is input in the second training. For example, an image number of the first image that is input in the first training may be 1, an image number of the first image that is input in the second training may be 2, and an image number of the first image that is input in an n-th training may be N. In an actual application, since a quantity of the first images in the training image set may be limited, in order to improve the training effect of the image processing model, the first images in the training image set may be sequentially input to the predetermined network model to train the predetermined network model. After all the first images in the training image set are input to the predetermined network model, the operation of inputting the first image in the training image set to the predetermined network model may continue to be executed to input the training image groups in the training image set into the predetermined network model in a loop.

In addition, diffusion degrees of a highlight portion of an image captured at different exposure degrees may be different. Thus, diffusion degrees of the highlight portion of the image captured by the under-screen imaging system at different light intensities may be different. As such, the image quality of the images captured by the under-screen imaging system may be different. Therefore, when the image processing model is trained, a plurality of training image sets may be obtained. Each training image set may correspond to a different exposure degree. Each training image set may be used to train the predetermined network model to obtain a model parameter corresponding to each training image set. Thus, by using the first images with the same exposure degree as the training sample image, the training speed of the network model may be improved. Meanwhile, different exposure degrees may correspond to different model parameters. When the image processing model is used to process the to-be-processed image with the color deviation, the corresponding model parameter may be selected according to the exposure degree corresponding to the to-be-processed image. Thus, the diffusion of the highlight portion of the image under the exposure degrees may be inhibited to improve the image quality of the processed image corresponding to the to-be-processed image.

Further, in some embodiments, the training image set may include a plurality of training image sub-sets. Each training image sub-set may include a plurality of training sample image groups. Exposure degrees of the first images in any two training sample image groups in the plurality of training sample image groups may be the same (i.e., for each training sample image group, exposure degrees of first images of the plurality of training image groups are the same). If exposure degrees of the second images in each training sample image group in the plurality of training sample image groups are all within a predetermined range, exposure degrees of the first images in any two training sample image sub-sets may be different. The predetermined range of the exposure degree of the second image may be determined according to exposure time and ISO (an aperture of the existing mobile phone is a fixed value). The predetermined range of the exposure degree may represent an exposure degree of photographing an image without exposure compensation. The second image captured by the on-screen camera at the first exposure degree within the predetermined range of the exposure degree may be a normal exposure image. By using the normal exposure image as the second image, the image output by the image processing model that is trained according to the training image set may have the normal exposure degree. Thus, the image processing model may have a brightness enhancement function. For example, when image A that is input to the image processor is an image with a low exposure degree after image A is processed by the image processing model, the exposure degree of processed image A may be a normal exposure degree. Thus, the image brightness of image A may be improved.

For example, assume that the exposure degree of the image may include 5 levels, which may be denoted as 0, −1, −2, −3, and −4, respectively. The exposure degree may be increased as the exposure level is reduced. For example, an exposure degree corresponding to exposure level 0 may be lower than an exposure degree corresponding to exposure level −4. The training image set may include five training image sub-sets, which may be denoted as a first training image sub-set, a second training image sub-set, a third training image sub-set, a fourth training image sub-set, and a fifth training image sub-set, respectively. An exposure degree of a first image in each training image group included in the first training image sub-set may correspond to level 0. A second image may be an image with an exposure degree within a predetermined range. An exposure degree of a first image in each training image group included in the second training image sub-set may correspond to level −1. A second image may be an image with an exposure degree within the predetermined range. An exposure degree of a first image in each training image group included in the third training image sub-set may correspond to level −2. A second image may be an image with an exposure degree within the predetermined range. An exposure degree of a first image in each training image group included in the fourth training image sub-set may correspond to level −3. A second image may be an image with an exposure degree within the predetermined range. An exposure degree of a first image in each training image group included in the fifth training image sub-set may correspond to level −4. A second image may be an image with an exposure degree within the predetermined range. A quantity of the training image groups included in the first training image sub-set, a quantity of the training image groups included in the second training image sub-set, a quantity of the training image groups included in the third training image sub-set, a quantity of the training image groups included in the fourth training image sub-set, and a quantity of the training image groups included in the fifth training image sub-set may be the same or different. For example, the first training image sub-set, the second training image sub-set, the third training image sub-set, the fourth training image sub-set, and the fifth training image sub-set may each include 5000 training image groups.

In addition, for each training image sub-set, the training image sub-set may include a training image set of a predetermined network model. The predetermined network model may be trained by using the training image sub-set to obtain a model parameter corresponding to the training image sub-set. The process of training the predetermined network model by using the training image sub-set as the training image set may include generating, by the predetermined network model, a generated image corresponding to the first image according to the first image in the training image sub-set and correcting the model parameter according to the second image corresponding to the first image and the generated image corresponding to the first image. The process may further include continuing to execute the step of generating, by the predetermined network model, a generated image corresponding to the first image according to the first image in the training image sub-set until the training condition of the predetermined network model satisfies the predetermined condition to obtain the model parameter corresponding to the training sub-image. For a specific description, references may be made to step S10 and step S20, which are not repeated here.

Further, a training process of each training image sub-set for the predetermined network model may be independent.

That is, the predetermined network model may be trained individually by using each training image sub-set. Meanwhile, by training the predetermined network model using the training image sub-sets, a plurality of model parameters may be obtained. Each model parameter may be trained and obtained according to a training image sub-set. Training image sub-sets corresponding to any two model parameters may be different from each other. Thus, the image processing model may correspond to the plurality of model parameters, and the plurality of model parameters may have a one-to-one correspondence with the plurality of training image sub-sets.

For example, the training sample image may include a first training image sub-set, a second training image sub-set, a third training image sub-set, a fourth training image sub-set, and a fifth training image sub-set. Thus, the image processing model may include five model parameters, which may be denoted as a first model parameter, a second model parameter, a third model parameter, a fourth model parameter, and a fifth model parameter, respectively. The first model parameter may correspond to the first training image sub-set. The second model parameter may correspond to the second training image sub-set. The third model parameter may correspond to the third training image sub-set. The fourth model parameter may correspond to the fourth training image sub-set. The fifth model parameter may correspond to the fifth training image sub-set.

Further, when the training image set includes a plurality of training image sub-sets, the predetermined network model may be trained according to each training image sub-set. For example, the training image set may include five training image sub-sets, which are used for description. A process of training the predetermined network model by using the first training image sub-set, the second training image sub-set, the third training image sub-set, the fourth training image sub-set, and the fifth training image sub-set may include training the predetermined network model by using the first training image sub-set to obtain the first model parameter corresponding to the first training image sub-set, and then training the predetermined network model by using the second training image sub-set to obtain the second model parameter corresponding to the second training image sub-set, so on and so as to obtain the fifth model parameter corresponding to the fifth training image sub-set.

In addition, when the plurality of training image sub-sets are trained by using the same predetermined network model, the training image sub-sets may affect the model parameter of the predetermined network model. For example, assume that training image sub-set A may include 1000 training image groups, and training image sub-set B may include 200 training image groups. Thus, the predetermined network model may be trained by using training image sub-set A. Subsequently, the predetermined network model may be trained by using training image sub-set B. Then, a model parameter corresponding to training image sub-set B may be obtained. The model parameter may be different from a model parameter corresponding to training image sub-set B obtained by training the predetermined network model by using only training image sub-set B.

Therefore, in some embodiments, after the predetermined network model trains the training image sub-set, the predetermined network model may be first initialized, and then the initialized predetermined network model may be configured to perform training on a next training image sub-set. For example, after the first model parameter corresponding to the first training image sub-set is obtained by training the first training image sub-set through the predetermined network model, the predetermined network model may be initialized. Thus, an initial model parameter and a model structure of the predetermined network model that is configured to train the second model parameter may be the same as the predetermined network model that is configured to train the first model parameter. Before the third model parameter, the fourth model parameter, and the fifth model parameter are trained, the predetermined network model may be initialized. Thus, the initial model parameter and the model structure of the predetermined network model corresponding to each training image sub-set may be the same. In an actual application, after the first model parameter corresponding to the first training image sub-set is obtained by training the predetermined network model according to the first training image sub-set, the second training image sub-set may be directly trained by using the predetermined network model (configured with the first model parameter) that is trained base on the first training image sub-set to obtain the second model parameter corresponding to the second training image sub-set. The step of training the predetermined network model (configured with the second model parameter) according to the third training image sub-set may continue to be performed until the fifth model parameter corresponding to the fifth training image sub-set is obtained by training the fifth training image sub-set is.

In addition, the first training image sub-set, the second training image sub-set, the third training image sub-set, the fourth training image sub-set, and the fifth training image sub-set each may include a certain number of training image groups. Thus, each training sub-image group may satisfy a training requirement of the predetermined network model. In an actual application, when the predetermined network model is trained based on each training image sub-set, the training image groups of the training image sub-set may be input to the predetermined network model in a loop to train the predetermined network model to cause the predetermined network model to satisfy the predetermined requirement.

Further, in some embodiments, a process of obtaining training samples including the training image sub-sets may include setting a first exposure degree for the under-screen imaging system, obtaining a first image in the first training image sub-set through the under-screen imaging system, and obtaining a second image corresponding to the first image in the first training image sub-set through the on-screen imaging system. The process may further include, after the first training image sub-set is obtained, setting a second exposure degree for the under-screen imaging system, and obtaining a first image and a second image corresponding to the first image in the second training image sub-set through the under-screen imaging system and the on-screen imaging system. The process may further include, after the second training image sub-set is obtained, continuing to execute the step of setting the exposure degree of the under-screen imaging system and obtaining the training image sub-set until all the training image sub-sets included in the training image set are obtained. A quantity of the training image groups included in each training image sub-set included in the training image set may be the same or different. In some embodiments, the quantity of the training image groups included in each training image sub-set included in the training image set may be the same. For example, the quantity of the training image groups included in each training image sub-set may be 5000.

Further, since the training image sub-sets correspond to different exposure degrees, after the model parameter corresponding to each training image sub-set is obtained, for each training image sub-set, the model parameter corresponding to the training image sub-set may be associated with the exposure degree corresponding to the training image sub-set to establish a correspondence between the exposure degree and the model parameter. As such, when the image processing model is configured to process the image that is to be processed, an exposure degree of the image that is to be processed may be obtained first, and then the model parameter corresponding to the image that is to be processed may be determined according to the exposure degree. Then, the model parameter corresponding to the image that is to be processed may be configured to the predetermined network model to obtain the image processing model corresponding to the image that is to be processed. Thus, the image processing model may be configured to process the image that is to be processed. Therefore, the image processing models configured with different model parameters may be determined for the image that is to be processed with different exposure degrees. The image processing model corresponding to the image that is to be processed may be configured to process the image that is to be processed to avoid an influence of the exposure degree on the color deviation, which can improve the effect of removing the color deviation of the image that is to be processed. In addition, the second image may have a normal exposure degree. Thus, the processed image output by the image processing model may have a normal exposure degree, which can improve the brightness of the image that is to be processed.

Figure 10:
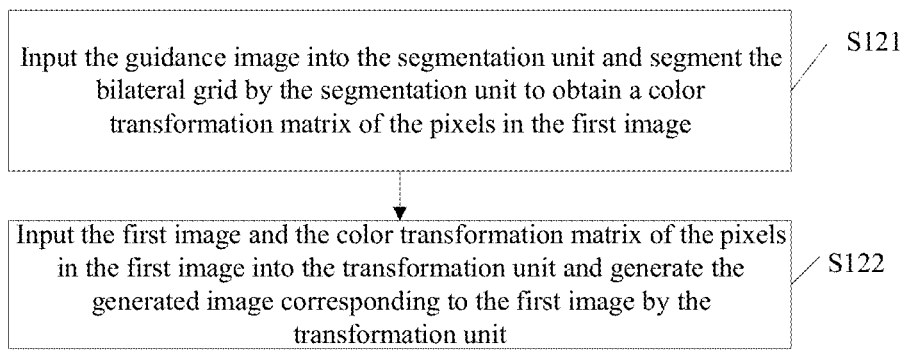
FIG. 10 is a schematic flowchart of step S12 of the generation method of the image processing model according to some embodiments of the present disclosure.

Based on the generation method of the image processing model, embodiments of the present disclosure further provide an image processing method. As shown in FIG. 10, the image processing method includes the following processes.

At A100, an image that is to be processed is obtained, and the image that is to be processed is input into the image processing model.

In some embodiments, the to-be-processed image may be an image captured by an imaging apparatus that is configured to process the to-be-processed image, or an image captured by another external apparatus and stored in the image processing apparatus, or an image sent by the cloud. In some embodiments, the to-be-processed image may be an image captured by an under-screen imaging system (for example, an under-screen camera). The under-screen imaging system may be configured for the imaging apparatus, or may be configured for another apparatus. For example, the to-be-processed image may be a people image captured by a mobile phone configured with an under-screen imaging system.

In addition, the image processing model may be pre-trained by the imaging apparatus (e.g., a mobile phone configured with an under-screen camera) that is configured to process the to-be-processed image. In some embodiments, the image processing model may be a file corresponding to the image processing model that is trained by other images. The file may be transferred to the imaging apparatus. In addition, the imaging apparatus may use the image processing model as a color deviation removal function circuit. When the imaging apparatus obtains the to-be-processed image, the imaging apparatus may start the color deviation removal function circuit to output the to-be-processed image to the image processing model.

Further, in some embodiments, the image processing model may include a plurality of model parameters according to a generation process of the image processing model. Each model parameter may correspond to an exposure degree. Therefore, in some embodiments, after the to-be-processed image is obtained, a quantity of the model parameters included in the image processing model may be detected first. When the quantity of the model parameters is one, the to-be-processed image may be directly input into the image processing model to process the to-be-processed image through the image processing model. When the quantity of the model parameters is greater than 1, the exposure degree of the to-be-processed image may be obtained first, then the model parameter corresponding to the to-be-processed image may be determined according to the exposure degree. The model parameter corresponding to the to-be-processed image may be configured to the image processing model to update the model parameter of the image processing model. The to-be-processed image may be input into the updated image processing model.

Figure 11:
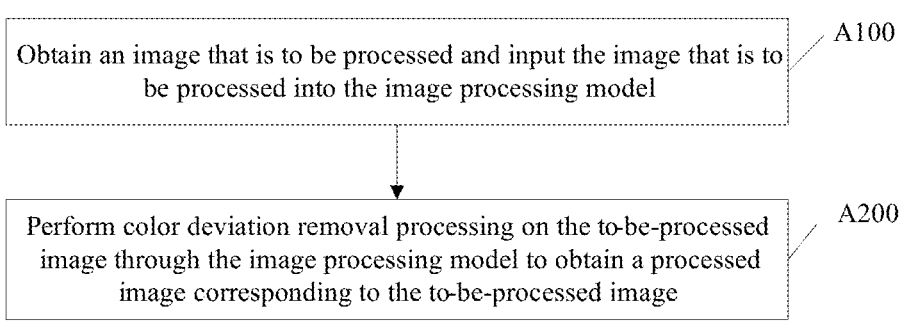
FIG. 11 is a schematic flowchart of an image processing method according to some embodiments of the present disclosure.

Further, in some embodiments, the image processing model may correspond to the plurality of model parameters. Each model parameter may be trained and obtained according to a training image sub-set. The training image sub-sets corresponding to any two model parameters may be different from each other (for example, the training image sub-set corresponding to model parameter A is different from the training image sub-set corresponding to model parameter B). Correspondingly, as shown in FIG. 11, obtaining the to-be-processed image, and inputting the to-be-processed image into the image processing model includes the following processes.

At A101, the to-be-processed image is obtained, and the exposure degree of the to-be-processed image is extracted.

In some embodiments, the exposure degree may be a degree of light irradiation of the photosensitive element of an image acquisition device and be used to reflect the exposure degree during imaging. The to-be-processed image may be an RGB three-channel image. The exposure degree of the to-be-processed image may be determined according to a highlight region of the to-be-processed image. At least one of an R (i.e., a red channel) value, a G (i.e., a green channel) value, or a B (i.e., a blue channel) value of each pixel included in the highlight region may be greater than a predetermined threshold. In an actual application, the to-be-processed image may also be a Y-channel image or a Bell format image. When the to-be-processed image is a Y-channel image or a Bell format image (RAW format), before the to-be-processed image is extracted, the Y-channel image or the Bell format image may need to be converted into an RGB three-channel image. Thus, the highlight region of the to-be-processed image may be determined according to the red channel R value, the green channel G value, and the blue channel B value of the to-be-processed image.

Further, in some embodiments, extracting the exposure degree of the to-be-processed image may include determining a third pixel satisfying the predetermined condition according to the red channel R value, the green channel G value, and the blue channel B value of each pixel in the to-be-processed image (B10), and determining the highlight region of the to-be-processed image according to all third pixels satisfying the predetermined condition and determining the exposure degree of the to-be-processed image according to the highlight region (B20). The predetermined condition may include that at least one of the R value, the G value, or the B value is greater than a predetermined threshold.

In some embodiments, the to-be-processed image may be an RGB three-channel image. Thus, for each pixel in the to-be-processed image, the pixel may include a red channel R value, a green channel G value, and a blue channel B value. That is, for each pixel in the to-be-processed image, the red channel R value, the green channel G value, and the blue channel B value of the pixel may be obtained. Therefore, in a process of extracting the exposure degree of the to-be-processed image, firstly, for each pixel of each to-be-processed image, a red channel R value, a green channel G value, and a blue channel B value of the pixel may be obtained. Then, the R value, the G value, and the B value of each pixel may be compared with the predetermined threshold to obtain a third pixel that satisfies the predetermined condition in the to-be-processed image. The predetermined condition may include that at least one of the R value, the G value, or the B value may be greater than the predetermined threshold. The third pixel satisfying the predetermined condition may indicate that the R value of the third pixel may be greater than the predetermined threshold, the G value of the third pixel may be greater than the predetermined threshold, the value B of the third pixel may be greater than the predetermined threshold, the R value and the G value of the third pixel may both be greater than the predetermined threshold, the R value and the B value of the third pixel may both be greater than the predetermined threshold, the G value and the B value of the third pixel may both be greater than the predetermined threshold, or the R value, the B value, and the G value of the third pixel may be greater than the predetermined threshold.

Further, after all the third pixels that satisfy the predetermined condition are obtained, all the third pixels that are obtained may be denoted as a third pixel set. The third pixel set may include neighboring pixels and non-neighboring pixels. The pixels that are neighboring to each other may indicate that the positions of the pixels are neighboring to each other in the to-be-processed image. The pixels that are not neighboring to each other may indicate that the positions of the pixels are neighboring to each other in the to-be-processed image. The positions that are neighboring to each other may indicate that, in a coordinate of the to-be-processed image, abscissas or ordinates of the two neighboring pixels may be the same. For example, the third pixel set may include a pixel (100, 101), a pixel (100, 100), a pixel (101, 101), and a pixel (200, 200). Thus, the pixel (100, 101) and the pixel (100, 100) may be neighboring pixels. The pixel (100, 101) and the pixel (101, 101) may be neighboring pixels. The pixel (100, 100), the pixel (101, 101), and the pixel (200, 200) may not be neighboring pixels.

Further, the highlight region may be a connected region formed by the neighboring pixels in the third pixel set. That is, a pixel value of each third pixel included in the highlight region may satisfy the predetermined condition. Therefore, in some embodiments, determining the highlight region of the to-be-processed image according to all the third pixels satisfying the predetermined condition may include the following processes.

At C10, the connected region formed by all the third pixels that satisfy the predetermined condition is obtained. A target region that satisfies the predetermined rule is selected in all the obtained connected regions. The predetermined rule includes that pixels having the R value, the G value, and/or the B value that are greater than the predetermined threshold of the R value, the G value, and the B value of the third pixel in the target region belong to the same type.

At C20, areas corresponding to the target regions that are selected are calculated, and a target region with a maximum area is used as the highlight region.

In some embodiments, the connected region may be a closed region formed by all the neighboring third pixels in the third pixel set. Each pixel included in the connected region may be a third pixel. At least a third pixel B in the connected region may be neighboring to a third pixel A for each third pixel A in the connected region. Meanwhile, for each third pixel C besides the third pixels included in the connected region in the third pixel set, the third pixel C may not be neighboring to any third pixel A in the connected region. For example, the third pixel set may include a pixel (100, 101), a pixel (100, 100), a pixel (101, 100), a pixel (101, 101), a pixel (100, 102), and a pixel (200, 200). Then, the pixel (100, 101), the pixel (100, 100), the pixel (101, 100), the pixel (101, 101), and the pixel (100, 102) may form a connected region.

In addition, since the connected region of the to-be-processed image may be formed by a light source, the light source may generate light with a same color. After all the connected regions of the to-be-processed image are obtained, the connected regions may be selected according to region colors corresponding to the connected regions. Therefore, after the connected region of the to-be-processed image is obtained, whether the pixels of the R value, the G value, and the value B that are greater than the predetermined threshold of the R value, the G value, and the B value of the third pixel in the connected region belong to the same type may be determined to determine whether the connected region satisfies the predetermined rule. The pixels belonging to the same type may indicate that for two third pixels, pixel A and pixel B, if the R value of pixel A is greater than the predetermined threshold, only the R value of pixel B may be greater than the predetermined threshold. If the R value and the G value of pixel A are greater than the predetermined threshold, only the R value and the G value of pixel B may be greater than the predetermined threshold. If the R value, the G value, and the B value of pixel A are greater than the predetermined threshold, the R value, the G value, and the B value of pixel B may be greater than the predetermined threshold. The pixels belonging to different types may indicate that, for two third pixels, pixel C and pixel D, if the V value (one of the R value, the G value, and the B value) of the pixel C is greater than the predetermined threshold, the V value of pixel D is less than or equal to the predetermined threshold value, or the V value of pixel D may be greater than the predetermined threshold and at least an M value (one of the two values of the R value, the G value, and the B value except for the V value) may be greater than the predetermined threshold. For example, if the R value of pixel C is greater than the predetermined threshold, and the R value of pixel D may be less than or equal to the predetermined threshold, the types of pixel C and pixel D may be different. If the R value of pixel C is greater than the predetermined threshold, the R value of pixel D is greater than the predetermined threshold, and the G value of pixel D is greater than the predetermined threshold, the types of pixel C and pixel D may be different. In some embodiments, the predetermined rule may include that the pixels of the R value, the G value, and/or the B value that are greater than the predetermined threshold of the R value, the G value, and the B value of the third pixel in the connected regions belong to the same type.

Further, the to-be-processed image may include a plurality of target regions. After the target regions are obtained, the highlight region may be obtained by selecting the target regions according to the areas of the target regions. An area of a target region may refer to an area of a region where the target region is located in the to-be-processed image. The area may be calculated in the pixel coordinate system of the to-be-processed image. After the areas of the target regions are obtained, the areas of the target regions may be compared with each other. The target region with the largest area may be selected. The target region may be used as the highlight region. As such, the target region with the largest area in the to-be-processed image may be used as the highlight region. Thus, the region with a largest brightness area may be obtained in the to-be-processed image. The exposure degree may be determined according to the region with the largest brightness area, which may improve the accuracy of the exposure degree.

Further, in some embodiments, determining the exposure degree of the to-be-processed image according to the highlight region includes calculating a first area of the highlight region and a second area of the to-be-processed image (D10) and determining the exposure degree corresponding to the to-be-processed image according to a ratio of the first area and the second area (D20).

In some embodiments, the second area of the to-be-processed image may be calculated according to the image size of the to-be-processed image. For example, if the image size of the to-be-processed image is 400×400, the image area of the to-be-processed image may be 400×400=160000. The first area of the highlight region may be a region area of the highlight region in the pixel coordinate system of the to-be-processed image. For example, the highlight region may be a square region with a side length of 20. Thus, the first area of the highlight region may be 20×20=400.

Further, in order to determine the exposure degree according to the ratio of the first area to the second area, a correspondence between a ratio interval and the exposure degree may be predetermined. After the ratio is obtained, a ratio interval at which the ratio is located may be obtained. Then, the exposure degree corresponding to the ratio interval may be determined according to the correspondence to obtain the exposure degree of the to-be-processed image. For example, the correspondence between the ratio interval and the exposure degree may include that when the interval is [0, 1/100), the exposure degree may correspond to level 0, when the interval is [1/100, 1/50), the exposure degree may correspond to level −1, when the interval is [1/50, 1/20), the exposure degree may correspond to level −2, when the interval is [1/20, 1/50), the exposure degree may correspond to level −3, and when the interval is [1/20, 1], the exposure degree may correspond to level −4. Thus, when the ratio of the first area to the second area is 1/10, the ratio is located in the interval [1/20, 1]. Therefore, the exposure degree corresponding to the to-be-processed image may be level −4.

At A102, the model parameter corresponding to the to-be-processed image is determined according to the exposure degree, and the model parameter is used to update the model parameter of the image processing model.

In some embodiments, the correspondence of the exposure degree and the model parameter may be established when the image processing model is trained. Thus, after the exposure degree of the to-be-processed image is obtained, the model parameter corresponding to the exposure degree may be determined according to the correspondence between the exposure degree and the model parameter. The exposure degree may refer to an exposure level. That is, the correspondence between the exposure degree and the model parameter may be a correspondence between the exposure level and the model parameter. In addition, each exposure level may correspond to a ratio interval. Thus, after the to-be-processed image is obtained, a ratio of the region area of the highlight region and the image area in the to-be-processed image may be obtained. The ratio interval where the ratio is located may be determined. The exposure level corresponding to the to-be-processed image may be determined according to the ratio interval. Then, the model parameter corresponding to the to-be-processed image may be determined according to the exposure level to obtain the model parameter corresponding the to-be-processed image. In addition, after the model parameter corresponding to the exposure degree is obtained, the obtained model parameter may be used to update the model parameter configured to the image processing model to update the image processing model, that is, the image processing model corresponding to the obtained model parameter.

At A103, the to-be-processed image is input into the updated image processing model.

In some embodiments, the to-be-processed image may be used as an input item of the updated image processing model. The to-be-processed image may be input to the updated image processing model to process the to-be-processed image. The model parameter of the image processing model corresponding to the to-be-processed image may be the model parameter determined according to the exposure degree of the to-be-processed image. The model parameter may be the model parameter obtained by training the pre-determined network model. Thus, the processing accuracy of the updated image processing model on the to-be-processed image may be ensured. As such, step A100 (i.e., obtaining the to-be-processed image and inputting the to-be-processed image into the image processing model) is described. Subsequent steps of step A100 are described below.

At A200, color deviation removal processing is performed on the to-be-processed image through the image processing model to obtain a processed image corresponding to the to-be-processed image.

Figure 12:
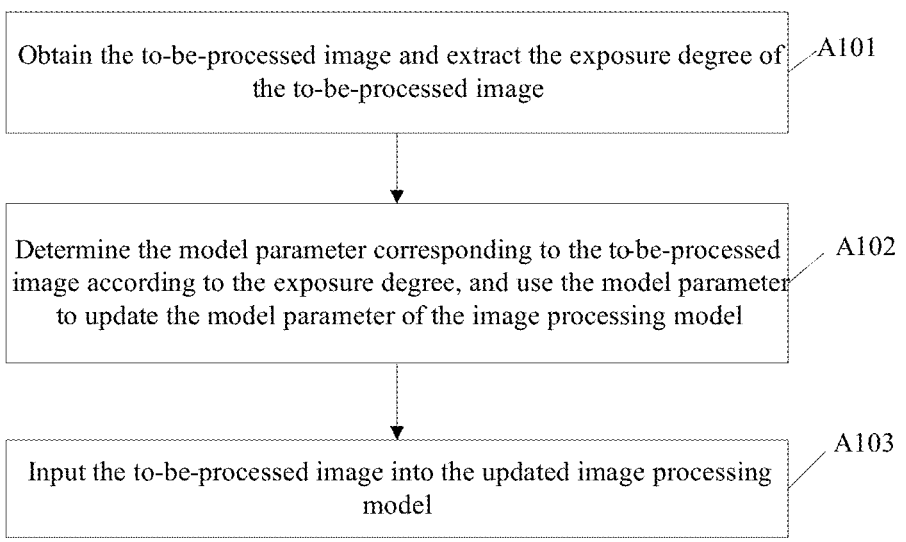
FIG. 12 is a schematic flowchart of step A100 of an image processing method according to some embodiments of the present disclosure.
Figure 13:
FIG. 13 is a schematic diagram of an image that is to be processed according to some embodiments of the present disclosure.

In some embodiments, performing color deviation removal on the to-be-processed image through the image processing model may include inputting the to-be-processed image as the input item of the image processing model into the image processing model, and removing the color deviation of the to-be-processed image through the image processing model, that is removing the first target pixel of the to-be-processed image, to obtain a processed image. The processed image may be an image after the image processing model corresponding to the to-be-processed image performs the color deviation removal on the to-be-processed image. That is, the to-be-processed image is a color deviation image of the corresponding processed image. For example, the to-be-processed image as shown in FIG. 12 is processed by the image processing model to obtain the processed image as shown in FIG. 13.

Further, according to the training process of the image processing model, the image processing model may include a down-sampling module and a transformation module. Thus, when the image processing model processes the to-be-processed image, the to-be-processed image may be processed through the down-sampling module and the transformation module in sequence. Correspondingly, performing, by the image processing model, the color deviation removal processing on the to-be-processed image to obtain the processed image corresponding to the to-be-processed image includes the following processes.

At A201, the to-be-processed image is input into the down-sampling module, and a bilateral grid corresponding to the to-be-processed image and a guidance image corresponding to the to-be-processed image are obtained through the down-sampling module. The resolution of the guidance image is the same as the resolution of the to-be-processed image.

At A202, the guidance image, the bilateral grid, and the to-be-processed image are input into the transformation module, and the processed image corresponding to the first image is obtained through the transformation module.

In some embodiments, an input item of the down-sampling module may include the to-be-processed image, an output item of the down-sampling module may include a bilateral grid corresponding to the to-be-processed image and a guidance image. An input item of the transformation module may include the guidance image, the bilateral grid, and the to-be-processed image, and an output item of the transformation module may include the processed image. The structure of the down-sampling module may be the same as the structure of the down-sampling module in the predetermined network model. For the structure of the down-sampling module, references may be made to the description of the structure of the down-sampling module in the predetermined network model. The processing performed by the down-sampling module of the image processing model on the to-be-processed image may be same as the processing performed by the down-sampling module in the predetermined network model on the first image. Thus, for a specific execution process of process A201, references may be made to process S11. Similarly, the structure of the transformation module may be the same as the structure of the transformation module in the predetermined network model. For the structure of the transformation module, references may be made to the description of the structure of the transformation module in the predetermined network model. The processing performed by the transformation module of the image processing model on the to-be-processed image may be the same as the processing performed by the transformation module in the predetermined network model on the first image. Thus, for a specific execution process of process A202, references may be made to process S12.

Further, in some embodiments, the down-sampling module may include a down-sampling unit and a convolution unit. Correspondingly, inputting the to-be-processed image into the down-sampling module, and obtaining the bilateral grid corresponding to the to-be-processed image and the guidance image corresponding to the to-be-processed image through the down-sampling module includes inputting the to-be-processed image into the down-sampling unit and the convolution unit (A2011), and obtaining the bilateral grid corresponding to the to-be-processed image by the down-sampling unit and obtaining the guidance image corresponding to the to-be-processed image by the convolution unit (A2012).

In some embodiments, an input item of the down-sampling unit may include the to-be-processed image, an output item of the down-sampling unit may include the bilateral grid. An input item of the convolution unit may include the to-be-processed image, and an output item of the convolution unit may include the guidance image. The structure of the down-sampling unit may be the same as the structure of the down-sampling unit in the predetermined network model. For the structure of the down-sampling unit, references may be made to the description of the structure of the down-sampling unit in the predetermined network model. The processing performed by the down-sampling unit of the image processing model on the to-be-processed image may be the same as the processing performed by the down-sampling unit in the predetermined network model on the first image. Thus, for a specific execution process of process A2011, references may be made to process S111. Similarly, the structure of the convolution unit may be the same as the structure of the convolution unit in the predetermined network model. For the structure of the convolution unit, references may be made to the description of the structure of the convolution unit in the predetermined network model. The processing performed by the convolution unit of the image processing model on the to-be-processed image may be the same as the processing performed by the convolution unit in the predetermined network model on the first image. Thus, for a specific execution process of process A2012, references may be made to process S112.

Further, in some embodiments, the transformation module may include a segmentation unit and a transformation unit. Correspondingly, inputting the guidance image, the bilateral grid, and the to-be-processed image into the transformation module, and generating the processed image corresponding to the to-be-processed image by the transformation module includes the following processes.

At A2021, the guidance image is input into the segmentation unit, and the bilateral grid is segmented by the segmentation unit to obtain a color transformation matrix of the pixels in the to-be-processed image.

At A2022, the to-be-processed image and the color transformation matrix of the pixels in the to-be-processed image are input into the transformation unit, and the processed image corresponding to the to-be-processed image is generated by the transformation unit.

In some embodiments, an input item of the segmentation unit may include the guidance image and the bilateral grid. An output item of the segmentation unit may include the color transformation matrix of the pixels in the to-be-processed image. An input item of the transformation unit may include the color transformation matrix of the pixels in the to-be-processed image and the to-be-processed image. An output item of the transformation unit may include the processed image. The structure of the segmentation unit may be the same as the structure of the segmentation unit in the predetermined network model. For the structure of the segmentation unit, references may be made to the description of the structure of the segmentation unit in the predetermined network model. The processing performed by the segmentation unit of the image processing model on the bilateral grid and the guidance image corresponding to the to-be-processed image may be the same as the processing performed by the down-sampling unit of the predetermined network model on the bilateral grid and the guidance image corresponding to the first image. Thus, for a specific execution process of process A2021, references may be made to process S121. Similarly, the structure of the transformation unit may be the same as the structure of the transformation unit in the predetermined network model. For the structure of the transformation unit, references may be made to the description of the structure of the transformation unit in the predetermined network model. The processing performed by the transformation unit of the image processing model on the color transformation matrix of the pixels in the to-be-processed image may be the same as the processing performed by the transformation unit in the predetermined network model on the color transformation matrix of the pixels in the first image. Thus, for a specific execution process of process A2022, references may be made to process S122.

A network structure corresponding to the image processing model during the training process may be the same as a network structure corresponding to an application process (performing color deviation removal processing). For example, during the training process, the image processing model may include a down-sampling module and a transformation module. Correspondingly, when the color deviation removal processing is performed on the to-be-processed image through the image processing model, the image processing model may also include a down-sampling module and a transformation module.

For example, during the training process, the down-sampling module of the image processing model may include a down-sampling unit and a convolution unit. The transformation module may include a segmentation unit and a transformation unit. Correspondingly, when the color deviation removal processing is performed by the image processing model on the to-be-processed image, the down-sampling module may also include a down-sampling unit and a convolution unit, and the transformation module may include a segmentation unit and a transformation unit. In an application process, an operation principle of each layer may be the same as an operation principle of each layer in the training process. Therefore, for an input/output situation of each layer of neural network in the application process of the image processing model, references may be made to the related description in the training process of the image processing model, which is not repeated here.

Compared with the existing technology, the present disclosure provides a generation method and a processing method of an image processing model. The generation method may include inputting a first image in a predetermined training image set into a predetermined network model and performing training on a predetermined model by using the generated image generated by the predetermined network model and a second image corresponding to the first image to obtain an image processing model. The image processing model may be obtained by performing deep learning on a color deviation removal process of a training image set having a plurality of training image groups. Each training image group may include a first image and a second image. The first image may be a color deviation image corresponding to the second image. In the present disclosure, the trained image processing model may be obtained by performing the deep learning based on the training image set to perform the color deviation removal processing. Thus, a color deviation adjustment may be quickly performed on an image, that is color deviation correction. The color quality of the image may be improved, and the image quality may be improved.

Further, in order to further improve the image quality of the image processing model, after the processed image output by the image processing model is obtained, post-processing may be performed on the processed image. The post-processing may include sharpening processing and noise reduction processing. Correspondingly, performing the color deviation removal processing on the to-be-processed image through the image processing model to obtain the processed image corresponding to the to-be-processed image further includes performing sharpening and noise reduction processing on the processed image, and using the image after the sharpening and noise reduction processing as the processed image corresponding to the to-be-processed image.

In some embodiments, the sharpening processing may include compensating a contour of the processed image and enhancing an edge of the processed image and a portion of a gray scale jump to improve the image quality of the processed image. The sharpening processing may be an existing sharpening processing method, for example, a high-pass filtering method. The noise reduction processing may include removing noise in the image to improve a signal-to-noise ratio of the image. The noise reduction processing may adopt an existing noise reduction algorithm or a trained noise reduction network model. For example, the noise reduction processing may include a Gaussian low-pass filtering method, etc.

Figure 34:
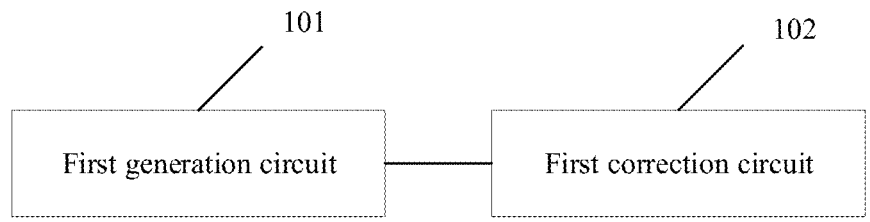
FIG. 34 is a schematic structural diagram of a generation device of an image processing model according to some embodiments of the present disclosure.

Based on the generation method of the image processing model, as shown in FIG. 34, embodiments of the present disclosure provide a generation device of an image processing model. The generation device of the image processing model includes a first generation circuit 101, a first correction circuit 102.

The first generation circuit may be configured to generate the generated image corresponding to the first image according to the first image in the training image set by using a predetermined network model. The training image set may include a plurality of training image groups. Each training image group may include a first image and a second image. The first image is a color deviation image corresponding to a second image.

The first correction circuit 102 may be configured to correct a model parameter according to the second image corresponding to the first image and the generated image corresponding to the first image by using the predetermined network model, correct the model parameter, and continue to execute the process of generating a generated image corresponding to the first image according to the first image in a next training image group in the training image set until the training condition of the predetermined network model satisfies the predetermined condition to obtain the image processing model.

In some embodiments, a quantity of the first target pixels satisfying a predetermined color deviation condition in the first image may satisfy a predetermined quantity condition. The predetermined color deviation condition may include an error between a display parameter of a first target pixel in the first image and a display parameter of a second target pixel in the second image may satisfy a predetermined error condition. The first target pixel may have a one-to-one correspondence with the second target pixel.

In some embodiments, the first target pixel may be any one pixel in the first image or any one pixel in a target region of the first image.

In some embodiments, the training image set may include a plurality of training image sub-sets. Each training image sub-set may include a plurality of training sample image groups. Exposure degrees of the first images in any two training sample image groups of the plurality of training sample image groups may be the same. An exposure degree of the second image in each training sample image group in the plurality of training sample image groups may be within a predetermined range. The exposure degrees of the first images of any two training image sub-sets may be different.

In some embodiments, the image processing model may correspond to a plurality of model parameters. Each model parameter may be obtained by training according to one training image sub-set in the training image set. The training image sub-sets corresponding, respectively, to any two model parameters may be different from each other.

In some embodiments, the predetermined network model may include a down-sampling module and a transformation module. The first generation circuit may be configured to input the first image of the training image set into the down-sampling module, obtain a bilateral grid corresponding to the first image and a guidance image corresponding to the first image through the down-sampling module, and input the guidance image, the bilateral grid, and the first image into the transformation module, and generate the generated image corresponding to the first image through the transformation module. The resolution of the guidance image may be the same as the resolution of the first image.

In some embodiments, the down-sampling module may include a down-sampling unit and a convolution unit. The first generation circuit may be configured to input the first image of the training image set into the down-sampling unit and the convolution unit, obtain the bilateral grid corresponding to the first image through the down-sampling unit, and obtain the guidance image corresponding to the first image through the convolution unit.

In some embodiments, the transformation module may include a segmentation unit and a transformation unit. The first generation circuit may be configured to input the guidance image into the segmentation unit, segment the bilateral grid through the segmentation unit to obtain a color transformation matrix of pixels in the first image, input the first image and the color transformation matrix of the pixels in the first image into the transformation unit, and generate the generated image corresponding to the first image through the transformation unit.

In some embodiments, the first image may be an image captured by an under-screen imaging system.

In some embodiments, the under-screen imaging system may include an under-screen camera.

In some embodiments, the generation device of the image processing model may further include a first alignment circuit.

The first alignment circuit may be configured to perform alignment processing on the first image of the training image group and the second image corresponding to the first image for each training image group in the training image set to obtain an aligned image aligned with the second image, and use the aligned image as a first image.

In some embodiments, the first alignment circuit may be configured to, for each training image group in the training image set, obtain a pixel deviation amount between the first image of the training image group and the second image corresponding to the first image, determine an alignment manner corresponding to the first image according to the pixel deviation amount, perform alignment processing on the first image and the second image by using the alignment manner to obtain an aligned image aligned with the second image, and use the aligned image as a first image.

In some embodiments, the first alignment circuit may be configured to, when the pixel deviation amount is less than or equal to a predetermined deviation amount threshold, perform alignment processing on the first image by using the second image as a reference according to mutual information of the first image and the second image.

When the pixel deviation amount is greater than the predetermined deviation amount threshold, a first pixel set of the first image and a second pixel set of the second image may be extracted. The first pixel set may include a plurality of first pixels of the first image, and the second pixel set may include a plurality of second pixels of the second image. The second pixel of the second pixel set may have a one-to-one correspondence with the first pixel of the first pixel set. For each first pixel of the first pixel set, a coordinate difference between the first pixel and a corresponding second pixel may be calculated. Position transformation may be performed on the first pixel according to the coordinate difference corresponding to the first pixel to align the first pixel with the second pixel corresponding to the first pixel.

Figure 35:
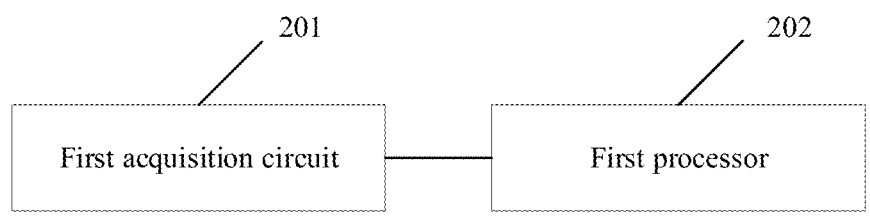
FIG. 35 is a schematic structural diagram of an image processing device according to some embodiments of the present disclosure.

Based on the image processing method of embodiments of the present disclosure, as shown in FIG. 35, embodiments of the present disclosure provide an image processing device. The image processing device may be configured to implement the generation method of the image processing model and include the image processing mode generated by the generation device. The image processing device includes a first acquisition circuit 201 and a first processor 202.

The first acquisition circuit 201 may be configured to obtain a to-be-processed image and input the to-be-processed image to the image processing model.

The first processor 202 may be configured to perform color deviation removal processing on the to-be-processed image by using the image processing model to obtain a processed image corresponding to the to-be-processed image.

The image processing model may correspond to a plurality of model parameters. Each model parameter may be obtained by training according to one training image sub-set. Training image sub-sets, respectively, corresponding to any two model parameters may be different from each other.

In some embodiments, the first acquisition circuit may be configured to obtain a to-be-processed image, extracting an exposure degree of the to-be-processed image, determine a model parameter corresponding to the to-be-processed image according to the exposure degree, update the model parameter of the image processing model by using the model parameter, and input the to-be-processed image into the updated image processing model.

In some embodiments, the first acquisition circuit may be configured to determine a third pixel satisfying a predetermined condition according to an R value, a G value, and a B value of each pixel in the to-be-processed image. The predetermined condition may include that at least one of the R value, the G value, or the B value is greater than the predetermined threshold value. the first acquisition circuit may be further configured to determine a highlight region of the to-be-processed image according to all third pixels satisfying the predetermined condition and determine an exposure degree of the to-be-processed image according to the highlight region.

In some embodiments, the first acquisition circuit may be further configured to obtain connected regions formed by all the third pixels satisfying the predetermined condition and select a target region satisfying a predetermined rule in all the obtained connected regions. The preset rule may include that the pixels of the R value, the G value, and/or the B value of the R value, the G value, and the B value of the third pixel in the target region belong to the same type. The first acquisition circuit may be further configured to calculate areas corresponding to the obtained target regions and select a target region with the largest area as a highlight region.

In some embodiments, the first acquisition circuit may be configured to calculate a first area of the highlight region and a second area of the to-be-processed image and determine the exposure degree corresponding to the to-be-processed image according to a ratio of the first area and the second area.

In some embodiments, the image processing model may include a down-sampling module and a transformation module. The first processor may be configured to input the to-be-processed image into the down-sampling module, obtain a bilateral grid corresponding to the to-be-processed image and a guidance image corresponding to the to-be-processed image through the down-sampling module, input the guidance image, the bilateral grid, and the to-be-processed image into the transformation module, and generate a processed image corresponding to the first image through the transformation module. The resolution of the guidance image may be the same as the resolution of the to-be-processed image.

In some embodiments, the down-sampling module may include a down-sampling unit and a convolution unit. The first processor may be configured to input the to-be-processed image into the down-sampling unit and the convolution unit, obtain the bilateral grid corresponding to the to-be-processed image through the down-sampling unit, and obtain the guidance image corresponding to the to-be-processed image through the convolution unit.

In some embodiments, the transformation module may include a segmentation unit and a transformation unit. The first processor may be configured to input the guidance image into the segmentation unit, segment the bilateral grid through the segmentation unit to obtain a color transformation matrix of pixels of the to-be-processed image, input the to-be-processed image that is inputted and the color transformation matrix of the pixels of the to-be-processed image into the transformation unit, and generate the processed image corresponding to the to-be-processed image through the transformation unit.

In some embodiments, the image processing apparatus further includes a noise reduction processing unit.

The noise reduction processing unit may be configured to perform sharpening and noise reduction processing on the processed image. The image after sharpening and noise reduction processing may be used as the processed image corresponding to the to-be-processed image.

Figure 15:
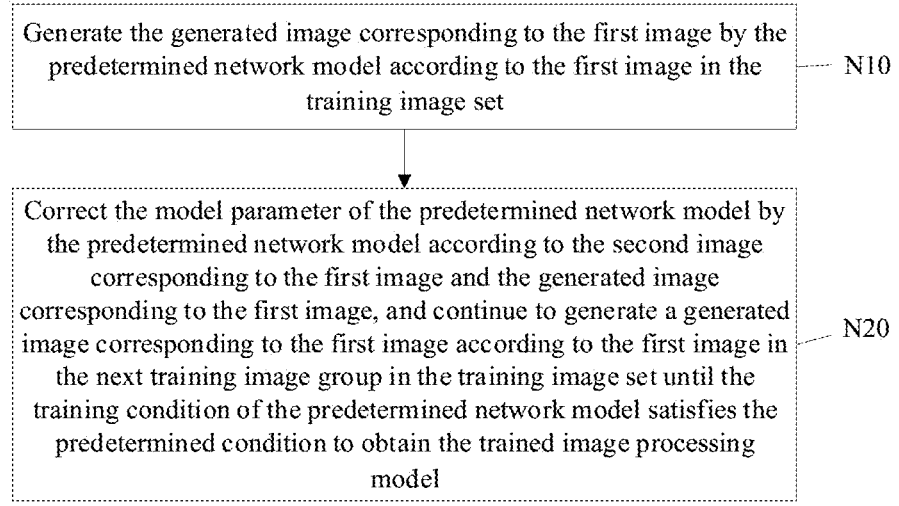
FIG. 15 is a schematic flowchart of a generation method of an image processing model according to some embodiments of the present disclosure.
Figure 16:
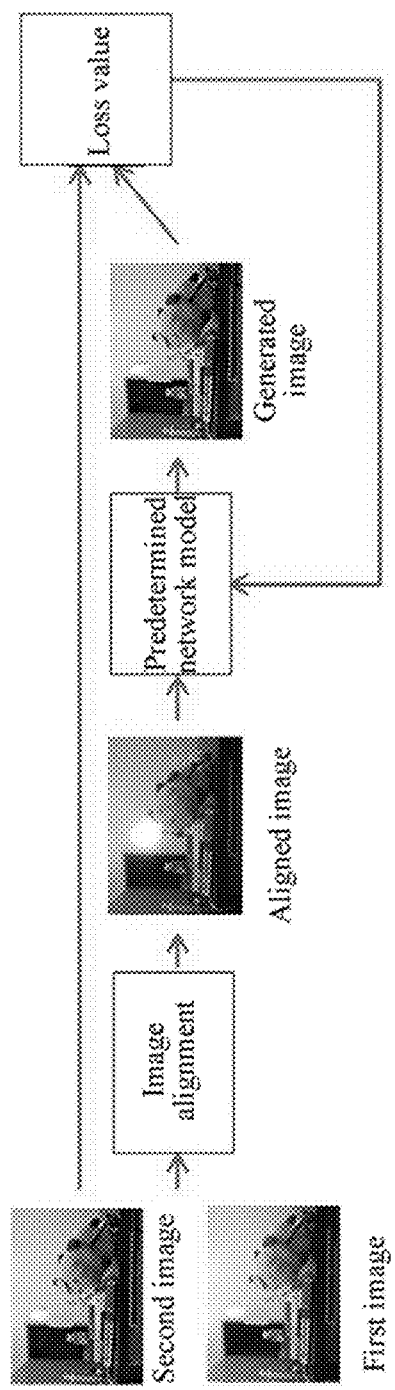
FIG. 16 is a schematic flowchart of a generation method of an image processing model according to some embodiments of the present disclosure.

Embodiments of the present disclosure provide a generation method of an image processing model. As shown in FIGS. 15 and 16, the method includes generating the generated image corresponding to the first image by the predetermined network model according to the first image in the training image set (N10).

In some embodiments, the predetermined network model may be a deep learning network model. The training image set may include a plurality of training image groups with different image contents. Each training image group may include a first image and a second image. The first image corresponds to the second image. The first image and the second image may represent the same image scene. The second image may be a normally displayed image (i.e., an original image). The image content of the first image may correspond to the image content of the second image. However, an object in the image content may have a ghost effect or a blurring effect similar to the ghost effect. The ghost effect may refer to a virtual image formed around the object in the image. For example, the ghost effect may include a situation where one or more contours or virtual images exist at an edge of the object in the image. For example, when the object in the image has a double image (i.e., a contour or a virtual image appears at the edge of the object), a column of images with a smaller pixel value may be understood as a real image of the object, and another column of images with a larger pixel value may be understood as a contour or a virtual image of the object.

The first image and the second image may correspond to the same image scene. The first image and the second image corresponding to the same image scene may indicate that a similarity degree between the image content of the first image and the image content of the second image may reach a predetermined threshold. The image size of the first image may be the same as the image size of the second image. Thus, when the first image and the second image coincide, a coverage rate of the object of the first image on the object of the second image that corresponds to the object of the first image may reach a predetermined condition. The predetermined threshold may be 99%. The predetermined condition may be 99.5%.

In addition, in some embodiments, in order to reduce the impact of an image difference between the first image and the second image on the training of the predetermined network model, the image content of the first image and the image content of the second image may be completely the same. For example, the first image may be an image having a ghost effect with an image size of 600×800. The image content of the first image may be square. Positions of four vertices of the square in the first image may be (200, 300), (200, 400), (300, 400), and (300, 300). Then, the image size of the second image may be 600×800. The image content of the second image may be square. Positions of four vertexes of the square in the second image may be (200, 300), (200, 400), (300, 400), and (300, 300). When the first image is placed on the second image and coincides with the second image, the first image may cover the second image, and the square in the first image may overlap with the square of the second image.

Further, the second image may be an image that is normally captured. For example, the second image may be an image captured by the under-screen camera after the display panel in the under-screen imaging system is removed, or an image captured by the under-screen camera by using a display panel, which is experimentally prepared without a light-shielding structure such a data line and a scan line for replacing the actual display panel, as the display panel of the under-screen imaging system, an image obtained by a network (e.g., Baidu), or an image sent by another external device (e.g., a smartphone). The first image may be captured by the under-screen imaging system (for example, an under-screen camera), or may be obtained by processing the second image. Processing the second image may refer to forming a ghost effect on the second image. In some embodiments, the image size and the image content of the second image may remain unchanged during the processing.

Figure 17:
FIG. 17 is a schematic diagram of a first image according to some embodiments of the present disclosure.
Figure 18:
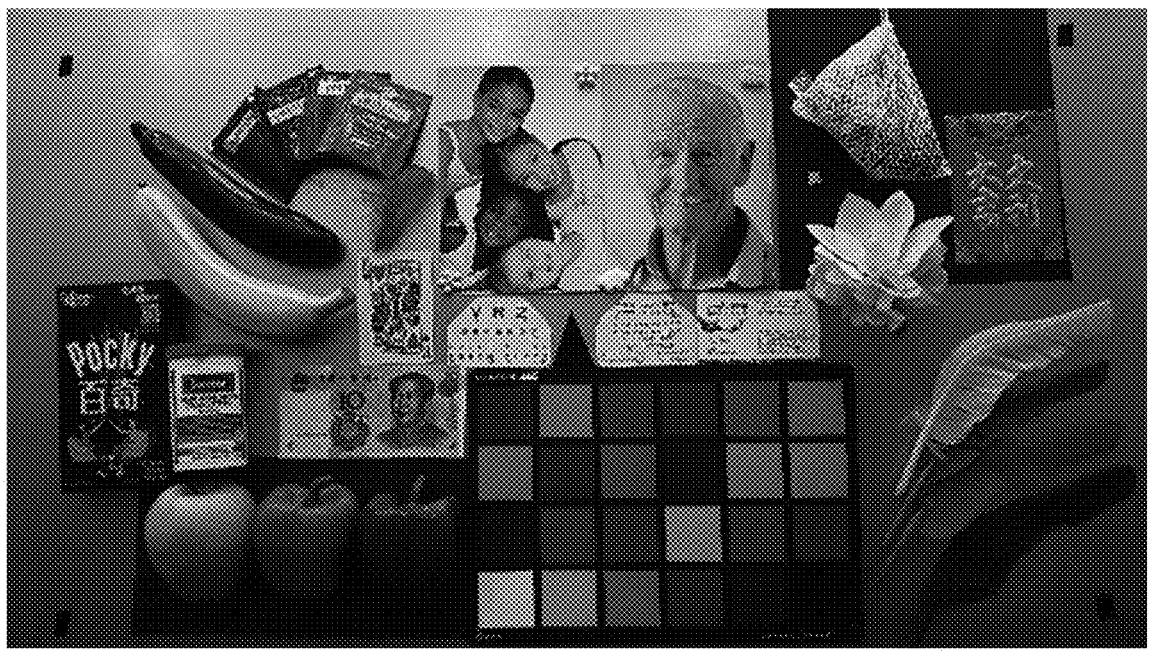
FIG. 18 is a schematic diagram of a second image according to some embodiments of the present disclosure.

In some embodiments, the first image may be captured by the under-screen imaging system. Photographing parameters of the first image and the second image may be the same. A photographing scene corresponding to the first image may be the same as a photographing scene of the second image. For example, the first image is an image as shown in FIG. 17, and the image content is blurred due to the impact of the light-shielding structure in the display panel. The second image is a normal display image as shown in FIG. 18. Further, in some embodiments, the photographing parameter may include an exposure parameter of the imaging system. The exposure parameter may include an aperture, a door opening speed, a sensitivity, a focus, a white balance, etc. In some embodiments, the photographing parameter may further include ambient light, a photographing angle, and a photographing range.

Further, the first image may be an image captured by the under-screen imaging system. Since the first image and the second image are captured by two different imaging systems, when the imaging system is switched, a photographing position or a photographing angle may be changed. Thus, before generating the generated image corresponding to the first image by the predetermined network model according to the first image in the training image set, the method further includes, for each training image group in the training image set, performing aligning processing on the first image in the training image group and the second image corresponding to the first image to obtain the aligned image aligned with the second image, and use the aligned image as a first image.

In some embodiments, processing for each training image group in the training image set may refer to performing the alignment processing on each training image group in the training image set. The alignment processing may include performing the alignment processing on each training image group after the training image set is obtained to obtain an aligned training image group. After all the training image groups are aligned, the first image of each training image group may be input to the predetermined network model. Before the first image in each training image group is input into the predetermined network model, the alignment processing may be performed on the training image group to obtain an aligned training image group corresponding to the training image group. Then, the first image in the aligned training image group may be input into the predetermined network model. In some embodiments, after the training image set is obtained, the alignment processing may be performed on each training image group. After the alignment processing is performed on all the training image groups, the first image in the training image set may be input into the predetermined network model.

Further, performing the alignment processing on the first image in the training image group with the second image corresponding to the first image may include using the second image as a reference and aligning the pixels of the first image with the pixels of the second image that correspond to the pixels of the first image to cause an alignment rate of the pixels of the first image and the pixels of the second image to reach the predetermined value, for example, 99%. Aligning the pixels of the first image with the corresponding pixels in the second image may indicate that, for a first pixel of the first image and a second pixel of the second image corresponding to the first pixel, if a pixel coordinate corresponding to the first pixel is the same as a pixel coordinate corresponding to the second pixel, the first pixel is aligned with the second pixel. If the pixel coordinate corresponding to the first pixel is different from the pixel coordinate corresponding to the second pixel, the first pixel may not be aligned with the second pixel. The aligned image may refer to the image obtained by performing the alignment processing on the first image. Pixel coordinates of each pixel in the aligned image and the corresponding pixel in the second image may be the same. In addition, after the aligned image is obtained, the aligned image may be used to replace the corresponding first image to update the training image group. Thus, the first image and the second image in the updated training image group may be spatially aligned.

Further, since alignment degrees of the first images and the second images of different training image groups are different, based on achieving alignment, different alignment manners may be used for the first image and the second image with different alignment degrees. Thus, each training image group may be aligned in a low-complexity alignment manner. Therefore, in some embodiments, performing the alignment processing on the first image of the training image group with the second image corresponding to the first image includes obtaining a pixel deviation amount between the first image in the training image group and the second image corresponding to the first image (P11), and determining an alignment manner corresponding to the first image according to the pixel deviation amount and performing the alignment processing on the first image and the second image by using the alignment manner (P12).

In some embodiments, the pixel deviation amount may refer to a quantity of first pixels in the first image that are not aligned with the second pixels in the second image that corresponds to the first pixels. The pixel deviation amount may be obtained through the following processes. A first coordinate of each first pixel in the first image and a second coordinate of each second pixel in the second image may be obtained. Then, the first coordinate of the first pixel may be compared with the second coordinate of the corresponding second pixel. If the first coordinate is the same as the second coordinate, the first pixel may be determined to be aligned with the corresponding second pixel. If the first coordinate is different from the second coordinate, the first pixel may be determined to be not aligned with the corresponding second pixel. Then, the quantity of all first pixels that are not aligned may be obtained to obtain the pixel deviation amount. For example, when the first coordinate of the first pixel in the first image is (100, 100), and the second coordinate of the second pixel corresponding to the first pixel in the second image is (101, 100), the first pixel may not be aligned with the second pixel. The quantity of the first pixels that are not aligned may be increased by 1. When the first coordinate of the first pixel in the first image is (100, 100), and the second coordinate of the second pixel corresponding to the first pixel in the second image is (100, 100), the first pixel may be aligned with the second pixel. The quantity of the first pixels that are not aligned may remain unchanged.

Further, in order to determine the correspondence between the pixel deviation amount and the alignment manner, a deviation amount threshold may need to be set. When the pixel deviation amount of the first image is obtained, the alignment manner corresponds to the pixel deviation amount by comparing the pixel deviation amount with the predetermined deviation amount threshold. Thus, in some embodiments, determining the alignment manner corresponding to the first image according to the pixel deviation amount and performing the alignment processing on the first image with the second image by using the alignment manner includes the following processes.

At P121, when the pixel deviation amount is less than or equal to the predetermined deviation amount threshold, the alignment processing is performed on the first image by using the second image as the reference according to the mutual information of the first image and the second image.

At P122, when the pixel deviation amount is greater than the predetermined deviation amount threshold, the first pixel set of the first image and the second pixel set of the second image are extracted. The first pixel set includes a plurality of first pixels of the first image, and the second pixel set includes a plurality of second pixels of the second image. the second pixels of the second pixel set may have a one-to-one correspondence with the first pixels of the first pixel set. For each first pixel in the first pixel set, a coordinate difference value of the first pixel and the second pixel corresponding to the first pixel is calculated. Position adjustment is performed on the first pixel according to the coordinate difference value corresponding to the first pixel to align the first pixel with the second pixel corresponding to the first pixel.

In some embodiments, the predetermined deviation amount threshold may be set in advance. For example, the predetermined deviation amount threshold may be 20. The pixel deviation amount less than or equal to the predetermined deviation amount threshold may indicate that, when the pixel deviation amount is compared to the predetermined deviation amount threshold, the pixel deviation amount may be less than or equal to the predetermined deviation amount threshold. When the pixel deviation amount is less than or equal to the predetermined deviation amount threshold, a deviation of the first image and the second image in space may be small. Thus, the first image and the second image may be aligned according to the mutual information of the first image and the second image. In some embodiments, the first image and the second image may be aligned with the mutual information between the first image and the corresponding second image by using an image registration method. The image registration method may include using the mutual information as a metric criterion, iterating and optimizing the metric criterion by an optimizer to obtain an alignment parameter, and aligning the first image with the second image by a register that is configured to register the alignment parameter. Thus, the alignment effect of the first image with the second image may be ensured, the complexity of the alignment between the first image and the second image may be reduced, and the alignment efficiency may be improved. In some embodiments, the optimizer may mainly be configured to optimize the metric criterion through the translation and rotation transformation.

Further, the pixel deviation amount may be greater than the predetermined deviation threshold, which indicates that a non-aligned degree of the first image and the second image may be relatively high. Thus, the first image and the second image may be aligned by selecting the first pixel set of the first image and the second pixel set of the second image. The first pixels in the first pixel set may have a one-to-one correspondence with the second pixels in the second pixel set. Thus, for any one first pixel in the first pixel set, a second pixel may exist in the second pixel set. The position of the second pixel in the second image may correspond to the position of the first pixel in the first image. In addition, after the first pixel set/the second pixel set is obtained, the first pixel set and the second pixel set may be determined according to a correspondence between the first pixel and the second pixel. For example, the first pixel set may be generated by randomly selecting a plurality of first pixels in the first image, and the second pixel set may be determined according to each first pixel included in the first pixel set.

In embodiments of the present disclosure, the first pixel set and the second pixel set may be obtained by a scale-invariant feature transform (sift) manner. That is, the first pixel in the first pixel set may be a first sift feature point in the first image, and the second pixel in the second pixel set may be a second sift feature point of the second image. Correspondingly, calculating the coordinate difference between the first pixel and the corresponding second pixel may include performing point-to-point matching on the first sift feature point in the first pixel set and the second sift feature point in the second pixel set to obtain a coordinate difference between the first sift feature point and the corresponding second sift feature point and performing position transformation on the first sift feature point according to the coordinate difference corresponding to the first sift feature point to align the first sift feature point and the second sift feature point corresponding to the first sift feature point. Thus, the position of the first sift feature point in the first image and the position of the second sift feature point in the second image may be the same, and the first image may be aligned with the second image.

Further, in some embodiments, the first image may be an image having a ghost effect obtained by pre-processing the second image. The image sizes and the image contents of the first image and the second image may be the same. Thus, the similarity between a scene and an imaging parameter corresponding to the first image and a scene and an imaging parameter corresponding to the second image may be improved. The predetermined network model may be trained by using the training image group with high scene similarity. Thus, the training speed of the predetermined network model and the processing effect of the trained image processing model may be improved.

Further, pre-processing the second image may include generating a grayscale image according to the light-shielding structure, generating a point spread function (PSF) according to the grayscale image, and then generating a first image according to the point spread function and the second image. That is, the first image may be generated according to the second image and the point spread function. The point spread function may be generated according to the grayscale image generated according to the light-shielding structure. The point spread function may be used to describe a response of an imaging system to a point light source or a point object. The point spread function is formed in a spatial domain of an optical transfer function of the imaging system.

Figure 19:
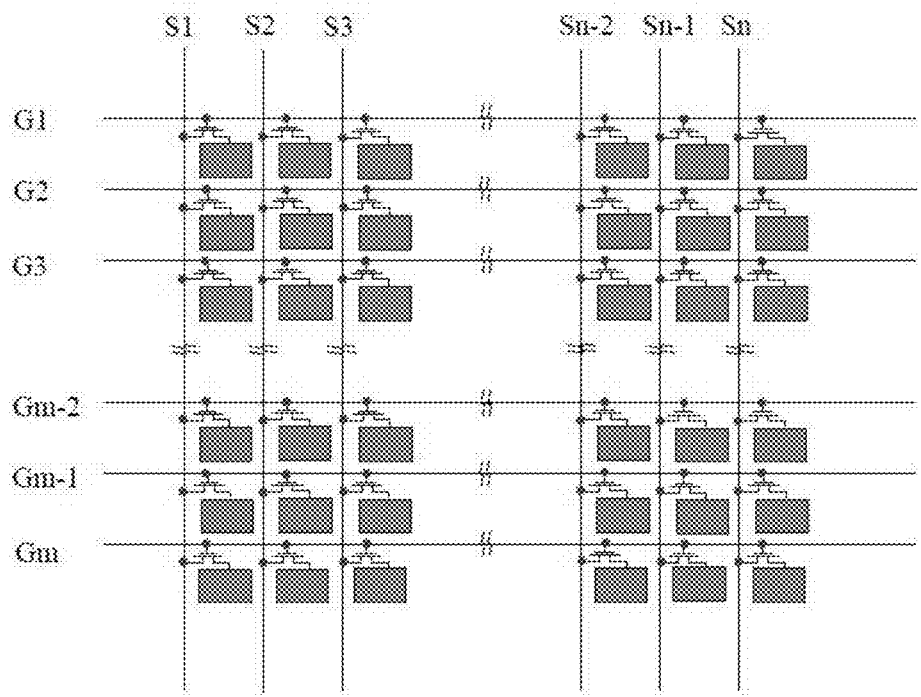
FIG. 19 is a schematic diagram of a signal line of a generation method of an image processing model is a schematic diagram of a first image according to some embodiments of the present disclosure.

Further, as shown in FIG. 19, the light-shielding structure includes a signal line, a capacitance line, and a power line of a display panel of a terminal. The signal line may include a plurality of data lines (e.g., S1, S2, . . . Sn, n being a positive integer) and a plurality of scan lines (e.g., G1, G2, . . . , Gm, m being a positive integer). The plurality of data lines are arranged in a staggered arrangement with the plurality of scan lines to form a plurality of grids. The plurality of grids formed by the signal lines may correspond to a plurality of pixels configured with the display panel. When light passes through the display panel, the light may be transmitted through each pixel, and may not be transmitted through the light-shielding structure. Thus, the light irradiated at the light-shielding structure may be diffracted. When the imaging system is arranged under the display panel, the plurality of light-shielding structures and pixels in the display panel located above the imaging system may appear in a photographing region. When the imaging system performs photographing, the light-shielding structures located above the imaging system may cause blurring of the captured image such as the ghost effect of the captured image. Therefore, when the second image is processed, the second image may be processed according to the point spread function corresponding to the grayscale image generated by the light-shielding structure to generate the first image having the ghost effect corresponding to the second image. Thus, the image content and the imaging parameter corresponding to the first image may be ensured to be the same as the image content and the imaging parameter corresponding to the second image. The training speed of the image processing model and the processing effect of the trained image processing model may be improved. The image sizes of the first image and the second image may also have a certain error range. That is, the image sizes of the first image and the second image may also be different. The image contents of the two images being the same may only indicate that objects (such as a person, an object, and a background in the image) included, respectively, in the two images are the same, which, however, cannot indicate that image quality of the objects in the two images are the same. That is, the image contents being the same may indicate that the objects (such as a person, an object, and a background in the image) in the two images may be the same, which, however, cannot indicate that the image quality of the objects in the two images are the same.

Figure 20:
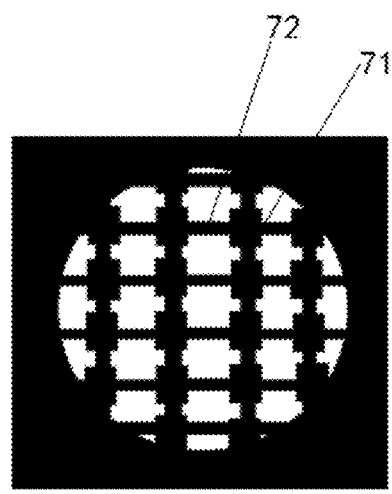
FIG. 20 is a schematic diagram of a grayscale image of a generation method of an image processing model is a schematic diagram of a first image according to some embodiments of the present disclosure.

For example, the on-screen imaging system may be the terminal having the on-screen camera. The light-shielding structure (e.g., a signal line) of the terminal is shown in FIG. 19. Assume that the under-screen imaging system is arranged under the display panel corresponding to the light-shielding structure. According to the grayscale image corresponding to the light-shielding structure (e.g., the signal lines), FIG. 20 shows a partial region of the grayscale image corresponding to the light-shielding structure. A first black line 71 corresponds to a data line in the signal line, and a second black line 72 corresponds to a scan line in the signal line. In some embodiments, all the light-shielding structures corresponding to the display panel may be directly obtained, or a partial region of the light-shielding structure corresponding to the display panel may also be obtained, and then, all the light-shielding structures of the display panel may be simulated according to the partial region, as long as the light-shielding structures may be obtained.

Further, when the first image is the image obtained by pre-processing the second image, obtaining the training image group may include first obtaining a signal line of the terminal display panel, selecting a signal line region in the signal line, then determining a grayscale image corresponding to the signal line region, and generating a point spread function according to the grayscale image and a Fraunhofer diffraction formula. Obtaining the training image group may further include capturing the second image through the on-screen imaging system, performing convolution on the second image and the point spread function to obtain the first image corresponding to the second image, and then associating the second image with the first image generated according to the second image to obtain the training image group. In some embodiments, when the second image is captured by the on-screen imaging system, a plurality of second images may be obtained. Then, the convolution may be performed on each of the second images with the point spread function in sequence to obtain the first image corresponding to each of second images to obtain a plurality of training image groups. Thus, after the second images required by all the training image groups are captured, the first image corresponding to each second image may be calculated to improve an acquisition speed of the training image groups.

In addition, in some embodiments, since grid dimensions of the signal lines corresponding to different display panels are different, when the grayscale image is generated, the signal lines of the plurality of display panels may be obtained. The second image may be obtained by selecting a grayscale image from a plurality of generated grayscale images. The second image may be processed by the point spread function corresponding to the selected grayscale image to obtain the first image corresponding to the second image. Thus, the ghost removal effect of the image processing model may be improved.

Figure 21:
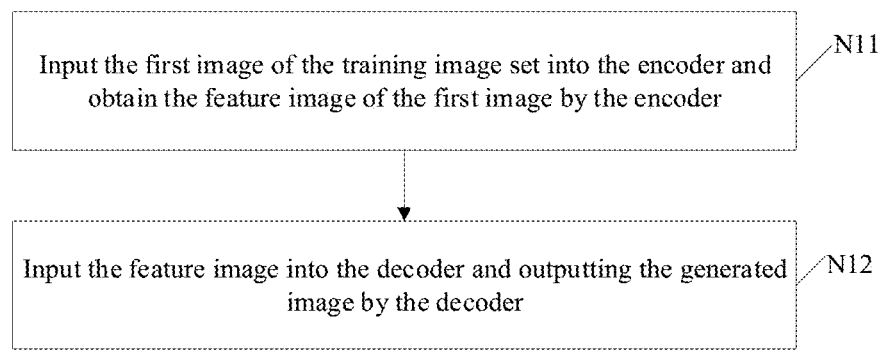
FIG. 21 is a schematic flowchart of step N10 of a generation method of an image processing model according to some embodiments of the present disclosure.
Figure 22:
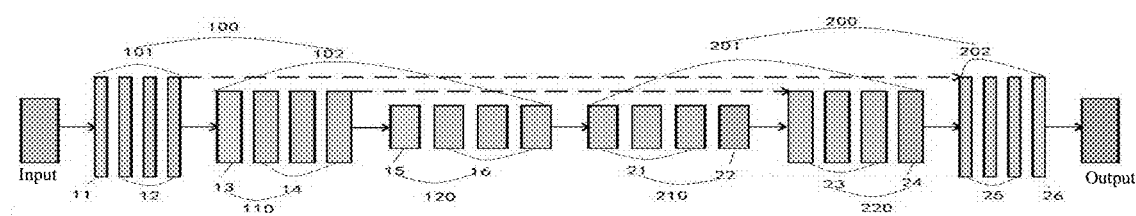
FIG. 22 is a schematic structural diagram of a predetermined network model of a generation method of an image processing model according to some embodiments of the present disclosure.

Further, in some embodiments, as shown in FIGS. 21 and 22, the predetermined network model includes an encoder and a decoder. Generating the generated image corresponding to the first image by the predetermined network model according to the first image in the training image set includes inputting the first image of the training image set into the encoder and obtaining the feature image of the first image by the encoder (N11) and inputting the feature image into the decoder and outputting the generated image by the decoder (N12). The image size of the feature image is smaller than the image size of the first image. The image size of the generated image is equal to the image size of the first image.

In some embodiments, the predetermined network model may have a decoding-encoding structure. The decoding-encoding structure may be a convolutional neural network (CNN) structure. The encoder 100 may be configured to convert an input image into a feature image having an image space size smaller than the input image and more channels than the input image. The decoder 200 may be configured to convert the feature image into the generated image having the same image size as the input image. In some embodiments, the encoder may include a first redundant learning layer 101 and a down-sampling layer 102. The first image in the training image group may be input to the first redundant learning layer 101. The first feature image having the same image size as the first image may be output by the first redundant learning layer 101. The first feature image may be input to the down-sampling layer 102 as an input item of the down-sampling layer 102. The first feature image may be downsampled by the down-sampling layer 102 to output a second feature image corresponding to the first image (the second feature image being a feature image of the first image generated by the encoder). The image size of the second feature image may be smaller than the image size of the first image. The decoder 200 includes an up-sampling layer 201 and a second redundant learning layer 202 that are sequentially arranged. The feature image output by the encoder 100 may be input to the up-sampling layer 201. A third feature image may be output after the feature image is upsampled by the up-sampling layer 201. The third feature image may be input to the second redundant learning layer 202. The generated image may be output by the second redundant learning layer 202. The image size of the generated image may be the same as the image size of the first image. In some embodiments, by using an encoder-decoder structure, multi-scale training may be performed on the predetermined network model. Thus, the ghost removal effect of the trained image processing model may be improved.

Further, as shown in FIG. 22, the first redundant learning layer 101 includes a first convolutional layer 11 and a first redundant learning circuit 12. The down-sampling layer 102 includes a first encoding redundant learning circuit 110 and a second encoding redundant learning circuit 120. The first encoding redundant learning circuit 110 includes a first down-sampling convolutional layer 13 and a second redundant learning circuit 14. The second encoding redundant learning circuit 120 includes a second down-sampling convolutional layer 15 and a third redundant learning circuit 16. An input item of the first convolutional layer 11 may include a first image. The first image may be sampled to obtain a first feature image. The first feature image may be input to the first redundant learning circuit 12 for feature extraction. The first feature image of the first redundant learning circuit 12 may be downsampled sequentially by the first down-sampling convolutional layer, the second redundant learning circuit 14, the second down-sampling convolutional layer 15, and the third redundant learning circuit 16 to obtain the second feature image. The first convolutional layer 11 may perform sampling on the first image. The first down-sampling convolutional layer 13 and the second down-sampling convolutional layer 15 may be both configured to perform down-sampling on the feature images inputted thereto. The first redundant learning circuit 12, the second redundant learning circuit 14, and the third redundant learning circuit 16 may be configured to extract image features. In addition, in some embodiments, the first down-sampling convolutional layer 13 and the second down-sampling convolutional layer 15 may both be a convolutional layer with a step size of 2. The first redundant learning circuit 12, the second redundant learning circuit 14, and the third redundant learning circuit 16 may each include three redundant learning blocks arranged in sequence. The three redundant learning blocks may be configured to sequentially extract image features of the input image.

For example, assume that the first image may be an image of 256×256. The first image may be input into the first redundant learning layer 101 through the input layer. The first feature image of 256×256 may be output after passing through the first redundant learning layer 101. The first feature image may be input to the first down-sampling convolution layer 13 of the first encoding redundant learning circuit 110. A fourth feature image with the image size of 128×128 may be output through the first down-sampling convolutional layer 13. Feature extraction may be performed on the fourth feature image by the first redundant learning circuit 12 of the first encoding redundant learning circuit 110. The fourth feature image passing through the first redundant learning circuit 12 may be input to the second down-sampling convolutional layer 15 of the second coding redundancy learning circuit 120. The second feature image having the image size of 64×64 may be output through the second down-sampling convolutional layer 15. The feature extraction may be performed on the second feature image by the second redundant learning circuit 16 of the second encoding redundant learning circuit 120.

Further, as shown in FIG. 22, the up-sampling layer 201 includes a first decoding redundant learning circuit 210 and a second decoding redundant learning circuit 220. The first decoding redundant learning circuit 210 includes a fourth redundant learning circuit 21 and a first up-sampling convolution layer 22. The second decoding redundant learning circuit 220 includes a fifth redundant learning circuit 23 and a second up-sampling convolutional layer 24. The second redundant learning layer 202 includes a sixth redundant learning circuit 25 and a second convolutional layer 26. An input item of the first up-sampling convolutional layer 22 may be the first feature image. The first feature image may be sequentially upsampled by the fourth redundant learning circuit 21, the first up-sampling convolutional layer 22, the fifth redundant learning circuit 23, and the second up-sampling convolutional layer 24 to obtain a third feature image. The third feature image may be input to the sixth redundant learning circuit 25. The third feature image after the feature extraction is performed by the sixth redundant learning circuit 25 may be input to the second convolutional layer 26 to obtain the generated image by the second convolutional layer 26. The first up-sampling convolutional layer 22 and the second up-sampling convolutional layer 24 may be configured to perform up-sampling on a feature image inputted thereto. The fourth redundant learning circuit 21, the fifth redundant learning circuit 23, and the sixth redundant learning circuit 25 may be configured to extract image features. The second convolutional layer 26 may be configured to perform sampling on a feature image input into the second convolutional layer 26. In some embodiments, the first up-sampling convolutional layer 22 and the second up-sampling convolutional layer 24 may both be a deconvolution layer with a step of 2. The fourth redundant learning circuit 21, the fifth redundant learning circuit 23, and the sixth redundant learning circuit 25 each may include three redundant learning blocks. The three redundant learning blocks may be configured to sequentially extract image features of the input image. In addition, a third redundant learning block of the redundant learning circuit in the first redundant learning layer 101 may be in a skip connection with a first redundant learning block of the redundant learning circuit in the second redundant learning layer 202. A third redundant learning block of the redundant learning circuit in the first encoding redundant learning circuit 110 may be in a skip connected with the first redundant learning block of the redundant learning circuit in the second decoding redundancy learning circuit 220.

For example, assume that the second feature image of 64×64 may be obtained by passing the first image of 256×256 through the encoder 100. The second feature image of 64×64 may be input to the fourth redundant learning circuit 21 of the first decoding redundant learning circuit 210 for feature extraction. The second feature image of 64×64 after the feature extraction may be input to the first up-sampling convolution layer 22 of the first decoding redundancy learning circuit 210. A fifth feature image with an image size of 128×128 may be outputted by the first up-sampling convolution layer 22. The feature extraction may be performed on the fifth feature image by the fifth redundant learning circuit 23 of the second decoding redundant learning circuit 220. The fifth feature image after the fifth redundant learning circuit 23 may be input to the second up-sampling convolution layer 24 of the second decoding redundant learning circuit 220. The image output by the second up-sampling convolution layer 24 may be a third feature image with an image size of 256×256. The third feature image may be input to the second redundant learning layer 202. Then, a generated image of 256×256 may be output after passing through the second redundant learning layer 202.

Further, the first convolutional layer, the second convolutional layer, the first up-sampling convolutional layer, the second up-sampling convolutional layer, the first down-sampling convolutional layer, the second down-sampling convolutional layer, and the convolutional layers of all the redundant learning circuits included in the encoder and the decoder may use a linear rectification function as an activation function. All convolution kernels may be 5×5. Thus, a gradient transmission efficiency of the layers may be improved. A gradient amplitude change may be small after a plurality of inverted transmissions, which improves the accuracy of the trained generator and improve the receptive field of the network.

At N20, the predetermined network model is configured to correct the model parameter of the predetermined network model according to the second image corresponding to the first image and the generated image corresponding to the first image, and continue to generate a generated image corresponding to the first image according to the first image in the next training image group in the training image set until the training condition of the predetermined network model satisfies the predetermined condition to obtain the trained image processing model.

In some embodiments, correcting the predetermined network model may include correcting the model parameter of the predetermined network model until the model parameter satisfies the predetermined condition. The predetermined condition may include that a loss function value satisfies the predetermined requirement, or a quantity of times of training reaches a predetermined quantity. The predetermined requirement may be determined according to the precision of the image processing model, which is not described in detail here. The predetermined quantity of times may be the maximum number of times of training of the predetermined network model, for example, 4000 times, etc. Thus, the predetermined network model may output the generated image. The loss function value of the predetermined network model may be calculated according to the generated image and the second image. After the loss function value is calculated, whether the loss function value satisfies the preset requirement may be determined. If the loss function value meets the predetermined requirement, the training may be ended. If the loss function value does not meet the predetermined requirement, whether the quantity of training times of the predetermined network model reaches the predetermined quantity of times may be determined. If the quantity of training times does not meet the predetermined quantity of times, the network parameter of the predetermined network model may be corrected according to the loss function value. If the quantity of training times reaches the predetermined quantity of times, the training may be ended. Thus, whether the training of the predetermined network model ends may be determined by the loss function value and the quantity of training times. Thus, the training of the predetermined network model may be avoided from entering the infinite loop due to the fact that the loss function value cannot reach the predetermined requirement.

Further, since the network parameter of the predetermined network model is modified when the training condition of the predetermined network model does not satisfy the predetermined condition (for example, the loss function value does not meet the predetermined requirement and the quantity of training times does not reach the predetermined quantity of times), the network model may need to be continuously trained after the network parameter of the predetermined network model is corrected according to the loss function value. That is, the first image in the training image set may be continuously input into the predetermined network model. The first image in the training image set that is continuously input to the predetermined network model may be a first image that is not input to the predetermined network mode as the input item. For example, all the first images in the training image set have unique image identifiers (e.g., image numbers). An image identifier of the first image that is input to the predetermined network model in the first training may be different from an image identifier of the first image that is input predetermined network model in the second training. For example, the image identifier of the first image that is input to the predetermined network model in the first training may be 1. The image identifier of the first image that is input predetermined network model in the second training may be 2. An image number of the first image that is input predetermined network model in the N-th training may be N. In some embodiments, since the quantity of the first images in the training image set is limited, in order to improve the training effect of the image processing model, the first images of the training image set may be sequentially input to the predetermined network model to train the predetermined network model. After all the first images in the training image set are input to the predetermined network model, the first images of the training image set may be continuously input to the predetermined network model. Thus, the training image groups of the training image set may be input into the predetermined network model in a loop. In a process of inputting the first image into the predetermined network model, the first images may be sequentially input to the predetermined network model according to the image identifiers of the first images, or the first images may be input to the predetermined network model without according to the image identifiers. The same first image may be repeatedly used to train the predetermined network model, or the same first image may not be repeatedly used to train the predetermined network model. In some embodiments, an implementation of continuously inputting the first image of the training image set into the predetermined network model may not be limited.

Figure 23:
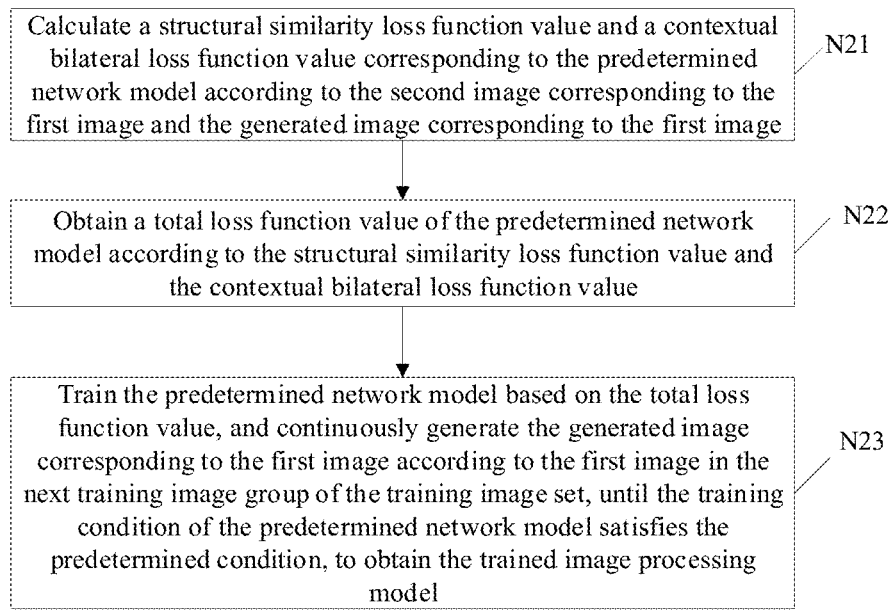
FIG. 23 is a schematic flowchart of step N20 of a generation method of an image processing model according to some embodiments of the present disclosure.

Further, in some embodiments, the loss function value may be calculated through a structural similarity loss function and a contextual bilateral loss function. Correspondingly, as shown in FIG. 23, the predetermined network model is configured to correct the model parameter of the predetermined network model according to the second image corresponding to the first image and the generated image corresponding to the first image, and continue to generate the generated image corresponding to the first image according to the first image in the next training image group of the training image set until the training condition of the predetermined network model satisfies the predetermined condition to obtain the trained image processing model. The method includes the following processes.

At N21, a structural similarity loss function value and a contextual bilateral loss function value corresponding to the predetermined network model are calculated according to the second image corresponding to the first image and the generated image corresponding to the first image.

At N22, a total loss function value of the predetermined network model is obtained according to the structural similarity loss function value and the contextual bilateral loss function value.

At N23, the predetermined network model is trained based on the total loss function value, and the generated image corresponding to the first image is continuously generated according to the first image in the next training image group of the training image set, until the training condition of the predetermined network model satisfies the predetermined condition, to obtain the trained image processing model.

In some embodiments, the predetermined network model may use a combination of a structural similarity index (SSIM) loss function and a contextual bilateral loss (CoBi) loss function for extracting the feature based on a visual data geometry index (VGG Network) as the loss function. Then, when the loss function value of the predetermined network model is calculated, the structural similarity loss function value and the contextual bilateral loss function value may be calculated, respectively, and then the loss function value of the predetermined network model may be calculated according to the structural similarity loss function value and the contextual bilateral loss function value. In some embodiments, the total loss function value of the predetermined network model=a×structural similarity loss function value+b×contextual bilateral loss function value, and a and b may be weight coefficients. For example, the weight coefficient a and the weight coefficient b may be 1. The total loss function value of the predetermined network model=the structural similarity loss function value+the contextual bilateral loss function value. In addition, in some embodiments, when the predetermined network model is trained by using the total loss function value, the predetermined network model may be trained by using a stochastic gradient descent method. A trained initial network parameter may be set to 0.0001. The network parameter may be modified in an exponential decay manner during correction.

Further, the structural similarity loss function value may be used to measure the similarity between the generated image and the second image. The greater the structural similarity loss function value is, the higher the similarity between the generated image and the second image is. On the contrary, the smaller the structural similarity loss function value is, the lower the similarity between the generated image and the second image is. Therefore, the structural similarity loss function value may be sensitive to the local structure change and may be closer to a human eye perception system. Thus, the accuracy of the predetermined network model may be improved. In some embodiments, an equation of the structural similarity loss function corresponding to the structural similarity loss function value is $$SSIM(x, y) = \frac{(2\mu_x\mu_y + C_1)(2\sigma_{xy} + C_2)}{(\mu_x^2 + \mu_y^2 + C_1)(\sigma_x^2 + \sigma_y^2 + C_2)}$$

where $\mu_x$ denotes an average value of the pixel values of all pixels in the generated image, $\mu_y$ denotes an average value of the pixel values of all pixels in the second image, $\sigma_x$ denotes a variance of the pixel values of all pixels in the generated image, $\sigma_y$ denotes a variance of the pixel values of all the pixels in the second image, and $\sigma_{xy}$ denotes the covariance of the generated image and the second image.

Further, the contextual bilateral loss function value may be calculated through the CoBi loss function based on the VGG feature. A plurality of groups of VGG features may be extracted from the generated image and the second image by the CoBi loss function based on the VGG feature. For each first VGG feature of the generated image, a second VGG feature close to the first VGG feature may be searched in the second VGG features of the second image. Then, a distance between each first VGG feature and the second VGG feature matching the first VGG feature may be calculated to obtain the contextual bilateral loss function value. Thus, the bilateral distance may be searched through the contextual bilateral loss function, and the loss of the first VGG feature and the second VGG feature matched with the first VGG feature may be considered in space to obtain the contextual bilateral loss function value. Therefore, the impact that the first image is not completely aligned with the second image may be avoided. A speed and accuracy of the training of the predetermined network model may be improved. In addition, when the second VGG feature matching with the first VGG feature is searched, the contextual bilateral loss function value may be determined according to the distance and the positional relationship between the first VGG feature and the second VGG feature, which may improve matching accuracy and further reduce the impact of misalignment of the first image and the second image on the training of the predetermined network model. In some embodiments, the equation of the contextual bilateral loss function is $$CoBi_{VGG}(x, y) = \frac{1}{N}\sum_{i}^{N} \min_{j=1,\ldots,M}(D_{x_i,y_i} + \omega_s D'_{x_i,y_i})$$

where D denotes a cosine distance between the VVG feature of the generated image and the VVG feature of the second image, D' denotes a spatial position distance between the VVG feature of the generated image and the VVG feature of the second image, N denotes a feature quantity of the VVG features of the generated images. $\omega_s$ denotes a weight coefficient.

Figure 24:
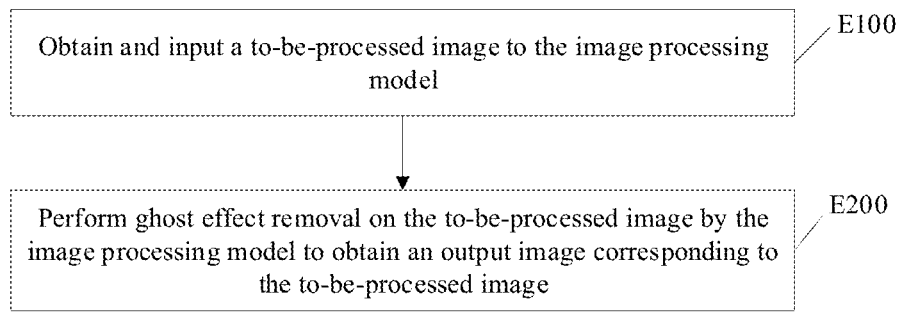
FIG. 24 is a schematic flowchart of an image processing method according to some embodiments of the present disclosure.

Based on the generation method of the image processing model, the present disclosure further provides an image processing method. The method adopts the generation method of the image processing model of embodiments of the present disclosure to obtain a trained image processing model. As shown in FIG. 24, the image processing method includes the following processes.

At E100, a to-be-processed image is obtained and input to the image processing model.

In some embodiments, the to-be-processed image may be an image captured by the under-screen imaging system, or may be a predetermined image, or may be an image determined according to a received selection operation. In some embodiments, the to-be-processed image is the image captured by the under-screen imaging system. For example, the to-be-processed image may be a people image captured by a mobile phone configured with an under-screen imaging system.

At E200, ghost effect removal is performed on the to-be-processed image by the image processing model to obtain an output image corresponding to the to-be-processed image.

Figure 25:
FIG. 25 is a schematic diagram of an image that is to be processed according to some embodiments of the present disclosure.
Figure 26:
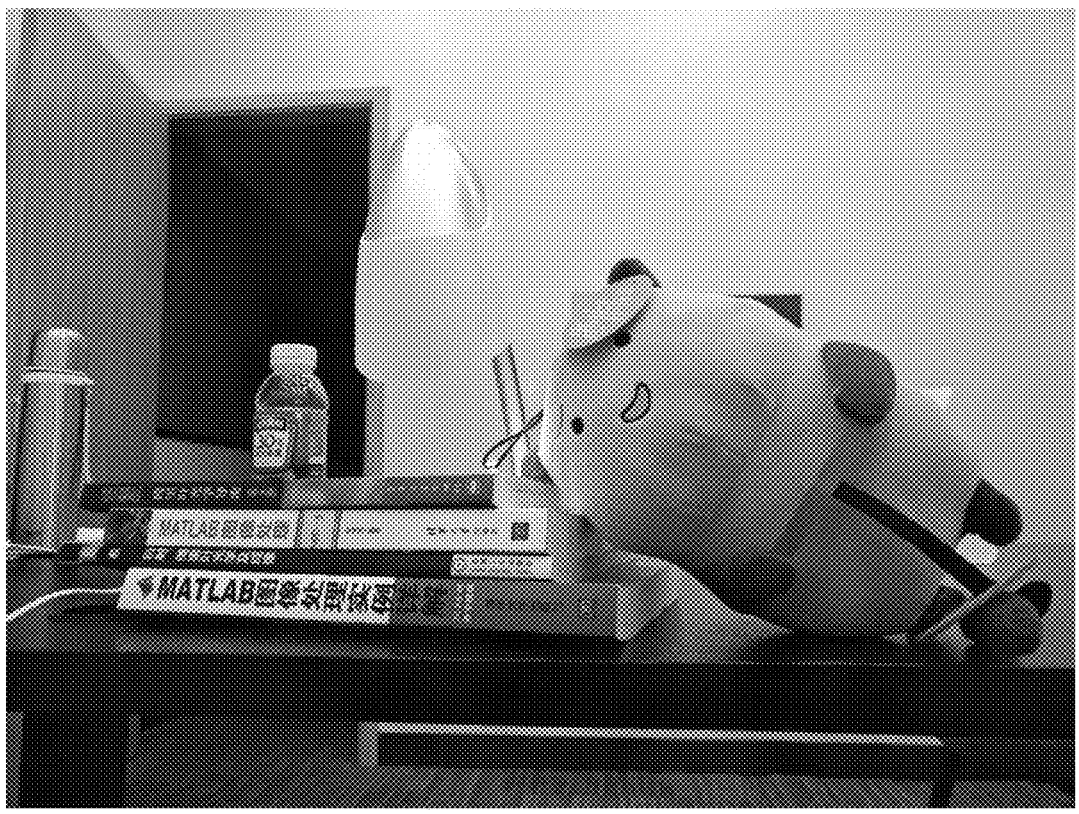
FIG. 26 is an example diagram of an output image corresponding to an image that is to be processed according to some embodiments of the present disclosure.

In some embodiments, performing ghost effect removal on the to-be-processed image by the image processing model may include inputting the to-be-processed image as an input item of the image processing model into the image processing model, and removing the ghost effect of the to-be-processed image through the image processing model to obtain the output image. The output image may be an image obtained by performing ghost effect removal processing on the to-be-processed image. The to-be-processed image may be an image with the ghost effect corresponding to the output image. That is, the output image corresponds to the to-be-processed image. The to-be-processed image and the output image may represent the same image scene. The output image may be a normally displayed image. The image content of the to-be-processed image may correspond to the output image, but an object in the image content of the to-be-processed image may have a ghost effect or a blurring effect similar to the ghost effect. For example, as shown in FIG. 25, the ghost effect removal is performed on the to-be-processed image to obtain the output image as shown in FIG. 26.

Further, according to the training process of the image processing model, the image processing model may include an encoder and a decoder. Thus, when the to-be-processed image is processed by the image processing model, the to-be-processed image may need to be processed by the encoder and the decoder. Correspondingly, performing the ghost effect removal on the to-be-processed image by using the image processing model to obtain the output image corresponding to the to-be-processed image includes the following processes.

At E201, the to-be-processed image is input into the encoder. A feature image of the to-be-processed image is obtained by the encoder. The image size of the feature image is less than the image size of the to-be-processed image.

At E202, the feature image is input into the decoder. The output image corresponding to the to-be-processed image is output by the decoder. The image size of the output image is equal to the image size of the to-be-processed image.

In some embodiments, the encoder may be configured to convert the input to-be-processed image into the feature image having the image space size smaller than the input image and more channel numbers than the input image and input the feature image to the decoder. The decoder may be configured to convert the input feature image into the generated image having the same image size as the to-be-processed image. The structure of the encoder may be the same as the structure of the encoder in the predetermined network model. For the structure of the encoder, references may be made to the description of the structure of the encoder in the predetermined network model. The processing performed by the encoder of the image processing model on the to-be-processed image may be the same as the processing performed by the encoder in the predetermined network model on the first image. For an execution process of process E201, references may be made to process N11. Similarly, the structure of the decoder may be the same as the structure of the decoder in the predetermined network model. For the structure of the decoder, references may be made to the description of the structure of the decoder in the predetermined network model. The processing performed by the decoder of the image processing model on the feature image corresponding to the to-be-processed image may be the same as the processing performed by the decoder in the predetermined network model on the feature image corresponding to the first image. Thus, for the execution process of process E202, references may be made to process N12.

The network structure corresponding to the image processing model in the training process may be the same as the network structure in the application process (removing the ghost effect of the output image). For example, in the training process, the image processing model may include the encoder and the encoder. Correspondingly, when the ghost effect of the output image is removed by the image processing model, the image processing model may also include the encoder and the encoder.

Further, for example, in the training process, the encoder of the image processing model may include a first redundant learning layer and a down-sampling layer. The decoder may include an up-sampling layer and a second redundant learning layer. Correspondingly, when the ghost effect of the output image is removed by the image processing model, the encoder may also include the first redundant learning layer and the down-sampling layer, and the decoder may include the up-sampling layer and the second redundant learning layer. In the application process, an operation principle of each layer may be the same as an operation principle of each layer in the training process. Therefore, for an input/output situation of each layer of a neural network of the image processing model in the application process, references may be made to related descriptions of the image processing model in the training process, which is not repeated here again.

Further, in order to further improve the image quality of the output image, after the output image output by the image processing model is obtained, post-processing may be performed on the output image. The post-processing may include sharpening processing and noise reduction processing. Correspondingly, performing the ghost effect removal processing on the to-be-processed image by using the image processing model to obtain the output image corresponding to the to-be-processed image includes performing sharpening processing and noise reduction processing on the output image and using the output image after the sharpening processing and the noise reduction processing as the output image corresponding to the to-be-processed image.

In some embodiments, the sharpening processing may refer to compensating the contour of the output image, enhancing the edge of the output image and the portion with the gray jump to improve the image quality of the output image. The sharpening processing may include an existing sharpening processing method, for example, a high-pass filtering method. The noise reduction processing may refer to removing the noise in the image and improving a signal-to-noise ratio of the image. The noise reduction processing may include an existing noise reduction algorithm or a trained noise reduction network model. For example, the noise reduction processing may adopt a Gaussian low-pass filtering method.

Figure 36:
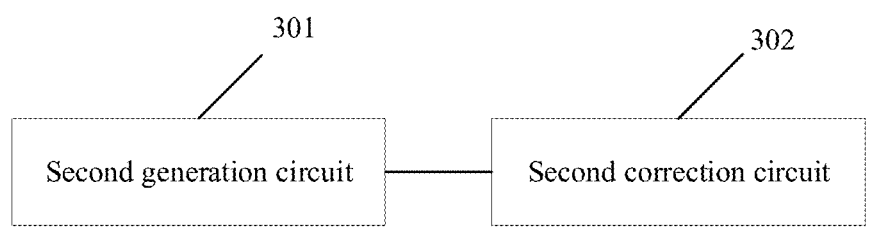
FIG. 36 is a schematic structural diagram of a generation device of an image processing model according to some embodiments of the present disclosure.

Based on the generation method of the image processing model generation method, as shown in FIG. 36, embodiments of the present disclosure provide a generator of the image processing model. The generator of the image processing model includes a second generation circuit 301 and a second correction circuit 302.

The second generation circuit 301 may be configured to generate the generated image corresponding to the first image according to the first image in the training image set by using the predetermined network model. The training image set may include a plurality of training image groups. Each training image group may include the first image and the second image. The first image may be an image with a ghost effect corresponding to the second image.

The second correction circuit 302 may be configured to correct the model parameter of the predetermined network model according to the second image corresponding to the first image and the generated image corresponding to the first image by using the predetermined network model, and continue to generate the generated image corresponding to the first image according to the first image in the next training image group in the training image set until the training condition of the predetermined network model satisfies the predetermined condition to obtain the trained image processing model.

In some embodiments, the predetermined network model may include the encoder and the decoder. The second generation circuit may be configured to input the first image in the training image set into the encoder to obtain the feature image of the first image through the encoder and input the feature image into the decoder to output the generated image through the decoder. The image size of the feature image may be smaller than the image size of the first image. The image size of the generated image may be equal to the image size of the first image.

In some embodiments, the second correction circuit may be configured to calculate the structural similarity loss function value and the contextual bilateral loss function value corresponding to the predetermined network model according to the second image corresponding to the first image and the generated image corresponding to the first image, obtain the total loss function value of the predetermined network model according to the structural similarity loss function value and the contextual bilateral loss function value, train the predetermined network model based on the total loss function value, and continue to generate the image corresponding to the first image according to the first image in the next training image group in the training image set until the training condition of the predetermined network model meets the predetermined condition to obtain the trained image processing model.

In some embodiments, the first image may be generated according to the second image and the point spread function. The point spread function may be generated according to the grayscale image generated by the light-shielding structure in the under-screen imaging system.

In some embodiments, the first image may be an image captured by the under-screen imaging system.

In some embodiments, the under-screen imaging system is an under-screen camera.

In some embodiments, the generator of the image processing model may further include a second alignment circuit. The second alignment circuit may be configured to perform the alignment processing on the first image and the second image corresponding to the first image in the training image group for each training image group in the training image set to obtain the aligned image aligned with the second image, and use the aligned image as a first image.

In some embodiments, the second alignment circuit may be configured to, for each training image group in the training image set, obtain a pixel deviation amount between the first image and a second image corresponding to the first image in the training image group, determine an alignment manner corresponding to the first image according to the pixel deviation amount, perform alignment processing on the first image and the second image by using the alignment manner to obtain the aligned image aligned with the second image, and use the aligned image as the first image.

In some embodiments, the second alignment circuit may be configured to, when the pixel deviation amount is less than or equal to the predetermined deviation amount threshold, perform the alignment processing on the first image by using the second image as the reference according to the mutual information of the first image and the second image.

In some embodiments, the second alignment circuit may be further configured to, when the pixel deviation amount is greater than the predetermined deviation amount threshold, extract a first pixel set of the first image and a second pixel set of the second image. The first pixel set may include a plurality of first pixels in the first image, and the second pixel set may include a plurality of second pixels in the second image. The second pixels in the second pixel set may have a one-to-one correspondence with the first pixels in the first pixel set. In some embodiments, the second alignment circuit may be further configured to, for each first pixel in the first pixel set, calculate a coordinate difference of the first pixel and the second pixel corresponding to the first pixel, and perform position adjustment on the first pixel according to the coordinate difference value corresponding to the first pixel to align the first pixel with a second pixel corresponding to the first pixel.

Figure 37:
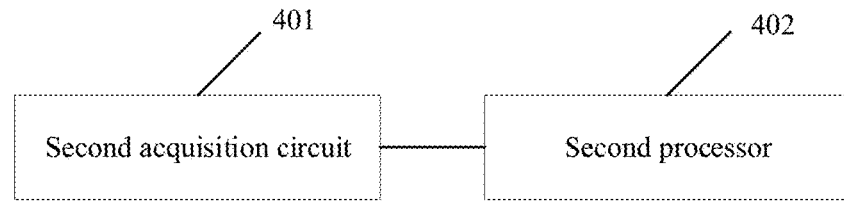
FIG. 37 is a schematic structural diagram of an image processing device according to some embodiments of the present disclosure.

Based on the above image processing method, as shown in FIG. 37, embodiments of the present disclosure provide an image processing device. The image processing device includes a second acquisition circuit 401 and a second processor 402.

The second acquisition circuit 401 may be configured to obtain the to-be-processed image and input the to-be-processed image to the image processing model.

The second processor 402 may be configured to perform ghost effect removal processing on the to-be-processed image through the image processing model to obtain the output image corresponding to the to-be-processed image.

In some embodiments, the image processing model may include the encoder and the decoder. The second processor may be configured to input the to-be-processed image into the encoder to obtain the feature image of the to-be-processed image through the encoder and input the feature image into the decoder to output the generated image corresponding to the to-be-processed image through the decoder. The image size of the feature image may be smaller than the image size of the to-be-processed image. The image size of the generated image may be equal to the image size of the to-be-processed image.

In some embodiments, the image processing apparatus further includes a sharpening circuit. The sharpening circuit may be configured to perform sharpening processing and noise reduction processing on the output image, and use the output image after the sharpening processing and noise reduction processing as the output image corresponding to the to-be-processed image.

Figure 27:
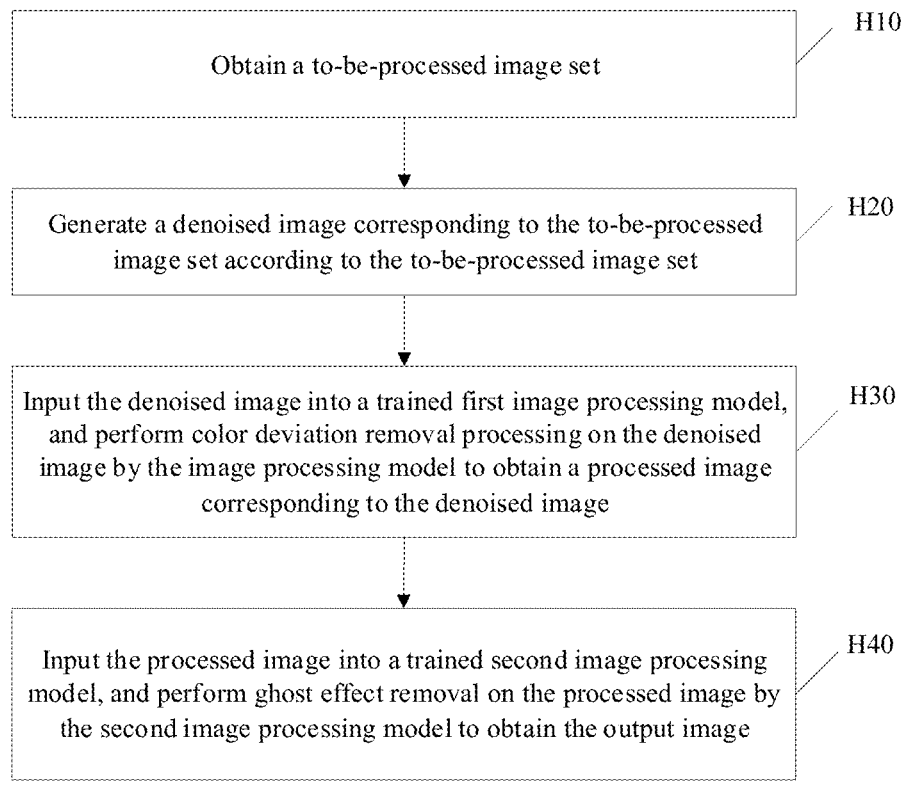
FIG. 27 is a schematic flowchart of an image processing method according to some embodiments of the present disclosure.

Embodiments of the present disclosure provide an image processing method. As shown in FIG. 27, the method includes the following processes.

At H10, a to-be-processed image set is obtained.

In some embodiments, the to-be-processed image set may include at least two images. The images in the to-be-processed image set may include captured by an imaging system (e.g., an under-screen camera, etc.), sent by an external apparatus (e.g., a smartphone, etc.), and obtained through a network (e.g., Baidu, etc.). In some embodiments, the images included in the to-be-processed image set may be low exposure images. The denoised images in the to-be-processed image set may be captured by an imaging system (e.g., a camera, a recorder, an under-screen camera, etc.). The denoised images may belong to a same color space (e.g., an RGB color space and a YUV color space, etc.). For example, the de-noised images may be captured by the under-screen camera. A base image and a neighboring image may belong to the RGB color space.

Further, the photographing scenes corresponding to the to-be-processed images in the to-be-processed image set may be the same. The photographing parameters of the to-be-processed images may also be the same. The photographing parameters may include an ambient illuminance and an exposure parameter. The exposure parameter may include an aperture, a shutter opening speed, a sensitivity, a focus, and a white balance. In some embodiments, the photographing parameters may further include a photographing angle and a photographing range, etc.

Further, since a noise level of the image captured by the imaging system may be different under different ambient illuminance. For example, when the ambient illuminance is low, the image captured by the imaging system may have relatively much noise. When the ambient illuminance is high, the image captured by the imaging system may have relatively little noise. In particular, for the under-screen imaging system, the display panel has different absorption strengths for different light intensities. The light absorption strength of the display panel may have a non-linear relationship with the light intensity (for example, when the ambient illuminance is low, and the light intensity is low, the light absorbed by the display panel has a high ratio, and when the ambient illuminance is high, and the light intensity is high, and the light absorbed by the display panel has a low ratio). Thus, image A captured by the under-screen imaging system may have a higher noise intensity than image B. The ambient light intensity corresponding to image A may be less than the ambient light intensity corresponding to image B. Thus, for images with different noise intensities, different numbers of images may be used for fusion. For example, the image with a high noise intensity may need more images than the image with low noise intensity. Correspondingly, an image number of the denoised images included in the to-be-processed image set may be determined according to the photographing parameter corresponding to the to-be-processed image set. The photographing parameter at least may include the ambient illuminance.

In addition, in order to determine the image number of the to-be-processed image according to the ambient illuminance, a correspondence between an ambient illuminance interval and the image number of the to-be-processed image may be determined first. Then, the image number of the to-be-processed images corresponding to the ambient illuminance interval may be obtained according to the correspondence. For example, the correspondence between the ambient illumination interval and the image number of the to-be-processed image may include that, when the ambient illumination interval is [0.5, 1), the image number of the to-be-processed image may be 8, when the ambient illuminance interval is [1, 3), the image number of the to-be-processed image may be 7, when the ambient illuminance interval is [3, 10), the image number of the to-be-processed image may be 6, when the ambient illuminance interval is [10, 75), the image number of the to-be-processed image may be 5, when the ambient illuminance interval is [75, 300), the image number of the to-be-processed image may be 4, when the ambient illuminance interval is [300, 1000), the image number of the to-be-processed image may be 3, and when the ambient illuminance is [1000, 5000), the image number of the to-be-processed image may be 2.

Further, in some embodiments, the to-be-processed image set may be captured by the under-screen imaging system, and the image number of the to-be-processed images included in the to-be-processed image set may be determined according to the ambient illuminance when the under-screen imaging system performs photographing. The ambient illuminance may be obtained when the under-screen imaging system is started or may be obtained according to a first frame of the image obtained by photographing, or may be determined by pre-photographing a predetermined number of images and then according to any image in the predetermined number of the images obtained by photographing.

In some embodiments, the ambient illuminance may be obtained when the under-screen imaging system is started. Correspondingly, obtaining the to-be-processed image set may include, when the under-screen imaging system is started, obtaining the ambient illuminance, determining a first image number of the images included in the to-be-processed image set according to the obtained ambient illuminance, and continuously obtaining the first image number of images through the under-screen imaging system to obtain the to-be-processed image set. The first image number may be determined according to the correspondence between the predetermined ambient illuminance and the image number of the to-be-processed image.

In some embodiments, the ambient illuminance may be obtained according to a first frame image obtained by photographing. Correspondingly, obtaining the to-be-processed image set may include first obtaining the first frame image by the under-screen imaging system, then, obtaining an ISO value of the first frame image, determining the ambient illuminance corresponding to the first frame image according to the ISO value, then, determining a second predetermine image number of images included in the to-be-processed image set according to the obtained ambient illuminance, and continuously obtaining a second image number minus 1 of images by the under-screen imaging system to obtain the to-be-processed image set.

In some embodiments, the predetermined image number of images may be obtained by pre-photographing, and the ambient illuminance may be determined according to any image of the predetermined image number of images obtained by photographing. Obtaining the to-be-processed image set may include obtaining the predetermined image number of images by the under-screen imaging system in advance, randomly selecting a third predetermined image in the obtained images, obtaining an ISO value of the third predetermined image, determining an ambient illuminance corresponding to the third predetermined image according to the ISO value, and determining the image number of images (i.e., the third image number of images) included in the to-be-processed image set according to the obtained ambient illuminance. In addition, since the predetermined image number of images are obtained, the predetermined number may be compared with the third image number. If the predetermined number is smaller than the third image number, a fourth image number of images may be continuously obtained by the under-screen imaging system. The fourth image number may be equal to the third image number minus the predetermined number. If the predetermined number is equal to the third image number, an acquisition operation of the to-be-processed image set may be completed. If the predetermined number is greater than the third image number, a third image number of images may be randomly selected in the predetermined number of images to obtain the to-be-processed image set.

Further, in some embodiments, the predetermined number may be greater than the third image number. In order to cause the to-be-processed image set to include the third predetermined images, the third predetermined images may be added to the to-be-processed image set, and then the third image number minus 1 of images may be selected in the obtained images. Further, in order to make the images in the to-be-processed image set be consistent with the third predetermined images, the images included in the to-be-processed image set may be selected according to a photographing sequence.

For example, assume that the predetermined number is 5, 5 images may be marked as image A, image B, image C, image D, and image E according to the photographing sequence, respectively. The third image may be 3. The third predetermined image may be image C with a photographing time sequence of 3. Thus, the images that are selected according to the photographing sequence may be image B and image D. Therefore, the to-be-processed image set may include image B, image C, and image D. In some embodiments, the images may be selected from the third predetermined image forward in sequence according to the photographing sequence. When a quantity of images in front of the third predetermined image is insufficient, the images may be selected from the third predetermined image backward in sequence according to the photographing sequence. The images may be selected backward first, when a number of images backward is not sufficient, the images may be selected forward. The images may be selected in another method, which is not limited here, as long as the fourth image number of images may be selected.

At H20, a denoised image corresponding to the to-be-processed image set is generated according to the to-be-processed image set.

In some embodiments, the to-be-processed image set may include a base image and at least a neighboring image. The base image may be an image reference of the to-be-processed images in the to-be-processed image set. The neighboring image may be fused with the base image by using the base image as a reference. Therefore, before the de-noising image is generated according to the to-be-processed image set, an image may need to be selected as a base image in the to-be-processed image set, and all the images except the base image in the to-be-processed image set may be used as the neighboring images of the base image.

Further, the to-be-processed image set includes the base image and at least one neighboring image. The base image may need to be selected from the obtained images. The base image may be an image at a first position in an acquisition sequence, or any image in the to-be-processed image set, or an image with the highest definition in the to-be-processed image set. In some embodiments, the base image may be a picture with the highest definition of the to-be-processed image set. That is, the definition of the base image may be greater than or equal to the definition of any one of the neighboring images.

Further, in some embodiments, determining the base image may include obtaining the definition of the images after obtaining all the images included in the to-be-processed image set, comparing the obtained definition to select an image with the highest definition, and using the selected image as the base image. The definition of the image may be understood as a difference between a pixel value of a pixel on a ground object boundary (or an object boundary) in the image and a pixel value of a pixel neighboring to the ground object boundary (or the object boundary). When the difference between the pixel value of the pixel on the ground object boundary (or the object boundary) in the image and the pixel value of the pixel neighboring to the ground object boundary (or the object boundary) is larger, the definition of the image may be higher. On the contrary, when the difference between the pixel value of the pixel on the ground object boundary (or the object boundary) in the image and the pixel value of the pixel neighboring to the ground object boundary (or the object boundary) is smaller, the definition of the image may be lower. That is, the definition of the base image may be higher than the definition of the neighboring images. For each neighboring image, the difference between the pixel value of the pixel on the ground object boundary (or the object boundary) in the base image and the pixel value of the pixel neighboring to the ground object boundary (or the object boundary) may be greater than the difference value between the pixel value of the pixel on the ground object boundary (or the object boundary) in the neighboring image and the pixel value of the pixel neighboring to the ground object boundary (or the object boundary).

To facilitate understanding, an example is taken to describe the definition of the base image is higher than the definition of the neighboring image. Assume that the to-be-processed image set may include image A and image B. Image A and image B may have identical image content. Both image A and image B may include pixel a and pixel b. Pixel a may be a pixel on a ground object boundary (or object boundary) in the image. Pixel b may be a pixel neighboring to the ground object boundary (or object boundary). If a difference between a pixel value of pixel a and a pixel value of pixel b in image A is 10, and a difference between a pixel value of pixel a and a pixel value of pixel b in image B is 30, the definition of image B may be determined to be higher than the definition of training image A. Therefore, image A may be used as a base image in the to-be-processed image set, and image B may be used as a neighboring image in the to-be-processed image set.

Further, in some embodiments, when the base image is selected from the to-be-processed image set according to the definition, the to-be-processed image set may include a plurality of images with the same definition (i.e., image C). The definition of each image C may not be less than the definition of any image in the to-be-processed image set. The plurality of images C may be used as the base image. Thus, one image C may be randomly selected from the plurality of images C as the base image, or the image C located at the first position may be selected as the base image in the plurality of images C according to the photographing sequence, or the image C located at the last position may be selected as the base image in the plurality of images C according to the photographing sequence.

Figure 28:
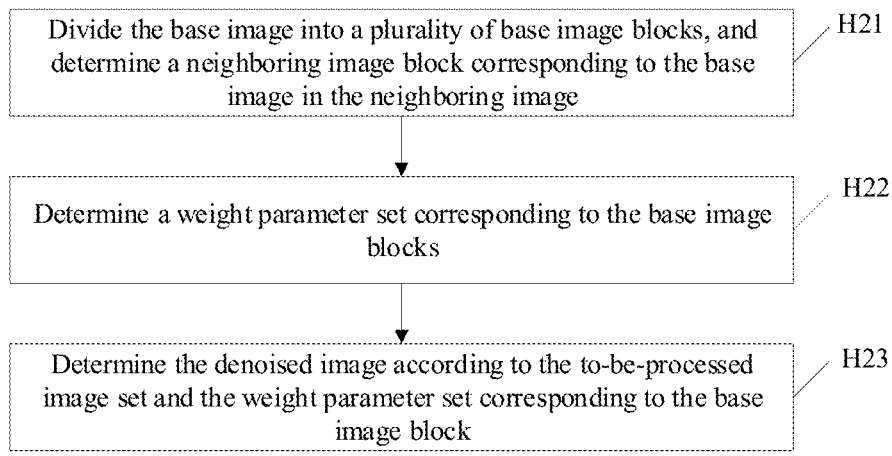
FIG. 28 is a schematic flowchart of step H20 of an image processing method according to some embodiments of the present disclosure.

Further, in some embodiments, as shown in FIG. 28, generating the denoised image corresponding to the to-be-processed image set according to the to-be-processed image set includes the following processes.

At H21, the base image is divided into a plurality of base image blocks, and a neighboring image block corresponding to the base image is determined in the neighboring image.

At H22, a weight parameter set corresponding to the base image blocks is determined. The weight parameter set corresponding to the base image block includes a first weight parameter and a second weight parameter. The first weight parameter is a weight parameter of the base image block. The second weight parameter is a weight parameter of a neighboring image block corresponding to the base image block in the neighboring image.

At H23, the denoised image is determined according to the to-be-processed image set and the weight parameter set corresponding to the base image block.

In some embodiments, in process H21, the base image block may be a part of the image region of the base image, and the base image may be formed after combining the plurality of base image blocks. Dividing the base image into the plurality of base image blocks may include using the base image as a region and dividing the region into a plurality of sub-regions. An image region corresponding to each sub-region may be a base image block. Dividing the region into the plurality of sub-regions may include dividing the region into a plurality of regions. For example, the base image of 8×8 may be divided into 4 base image blocks of 4×4. In some embodiments, the method of dividing the base image into the plurality of base image blocks may be flexibly selected according to specific scenes, as long as the base image may be divided into the plurality of base image blocks. The neighboring image block may be an image block corresponding to the base image in the neighboring image. The size of the image block of the neighboring image block may be the same as the size of the base image block corresponding to the neighboring image block. The image content of the neighboring image block may be the same as the image content of the base image block. Determining the neighboring image block corresponding to the base image block in each neighboring image may include selecting the image block having the highest similarity with the base image in the determined region of the neighboring image block. The determined region may be determined according to the region in the base image where the base image is located.

Figure 29:
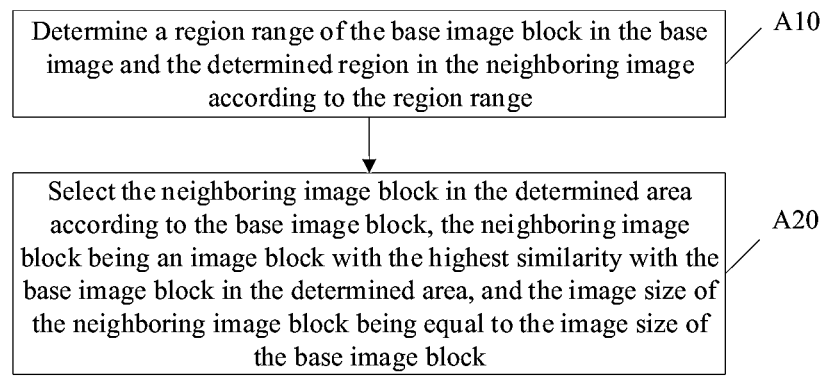
FIG. 29 is a schematic flowchart of an acquisition process of a neighboring image block of an image processing method according to some embodiments of the present disclosure.

Further, in some embodiments, as shown in FIG. 29, determining the neighboring image block corresponding to the base image in the neighboring image includes the following processes.

At A10, a region range of the base image block is determined in the base image, and the determined region in the neighboring image is determined according to the region range.

At A20, the neighboring image block is selected in the determined area according to the base image block. The neighboring image block is an image block with the highest similarity with the base image block in the determined area. The image size of the neighboring image block is equal to the image size of the base image block.

In some embodiments, the region range may refer to a coordinate point set formed by pixel coordinates of region boundary pixels in the base image block in the base image. For example, the base image block may be a square region in the base image. Coordinate points of four vertices of the base image block may be (10, 10), (10, 20), (20, 10), and (20, 20). Thus, the region range corresponding to the base image block may be {(10, 10), (10, 20), (20, 10), and (20, 20)}.

Figure 30:
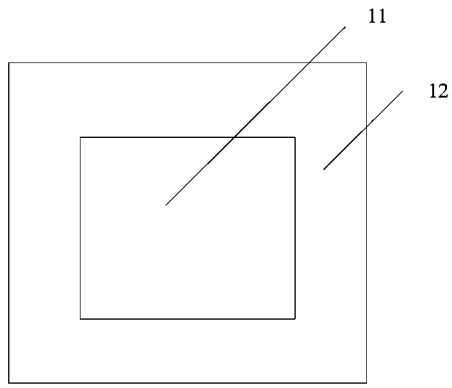
FIG. 30 is a schematic diagram of a designated area of an image processing method according to some embodiments of the present disclosure.

The determined region may be an image region in a neighboring image. The region range corresponding to the base image block may correspond to the region range corresponding to the determined region. That is, when a mapping is established between the neighboring image and the base image, the region range corresponding to the determined region may correspond to the region range corresponding to the base image block. For example, in the base image, the region range corresponding to the base image block may be {(10, 10), (10, 20), (20, 10), and (20, 20)}. In the neighboring image, the region range corresponding to the determined region may be {(10, 10), (10, 20), (20, 10), and (20, 20)}. Thus, the region range corresponding to the base image block may correspond to the region range corresponding to the determined region. In addition, the region range corresponding to the base image block may also correspond to the region range corresponding to a sub-region of the determined region. That is, when a mapping is established between the neighboring image and the base image, a sub-region may exist in the region range corresponding to the determined region. The region range of the sub-region may correspond to the region range corresponding to the base image block. For example, the region range corresponding to the base image block in the image region occupied in the base image may be {(10, 10), (10, 20), (20, 10), and (20, 20)}. As shown in FIG. 30, the region range corresponding to the image region 12 occupied by the determined region in the neighboring image may be {(9,9), (9,21), (21, 9), and (21, 21)}. Thus, the determined region includes a sub-region 11. The region range of the sub-region 11 may be {(10, 10), (10, 20), (20, 10), and (20, 20)}. The region range corresponding to the sub-region 11 may correspond to the region range corresponding to the base image block.

Further, in some embodiments, the region range corresponding to the base image block may also correspond to a region range corresponding to the sub-region of the determined region. The determined region may be obtained by translating the coordinate points in the coordinate point set corresponding to the region range in a direction away from the region range by a predetermined value. The region range may be a region range corresponding to the base image block. For example, when the region range corresponding to the base image block may be {(10, 10), (10, 20), (20, 10), and (20, 20)}, and the predetermined value is 5, the region range of the determined region may be {(5, 5), (5, 25), (25, 5), and (25, 25)}. In addition, the predetermined values corresponding to different neighboring images may be different, and the predetermined values corresponding to the neighboring images may be determined according to the displacement of the neighboring images relative to the base image. Determining the predetermined value may include, for each neighboring image, calculating projections of the base image and the neighboring image in a row and column direction, determining the displacement of the neighboring image on the row and column relative to the base image according to the projection corresponding to the neighboring image and the projection corresponding to the base image, and using the displacement as a predetermined value corresponding to the neighboring image. The displacement may be calculated by using a sum of absolute differences (SAD) algorithm.

Further, in process H22, a quantity of second weight parameters in the weight parameter set is the same as a quantity of the neighboring images in the to-be-processed image set. The second weight parameter in the weight parameter set may have a one-to-one correspondence with the neighboring image in the to-be-processed image set. Each neighboring image may include at least one neighboring image block corresponding to the base image block. Each neighboring image block may correspond to a second weight parameter. Thus, the weight parameter set may include a first weight parameter and at least one second weight parameter. Each second weight parameter may correspond to a neighboring image block in a neighboring image corresponding to the base image block. The first weight parameter may be predetermined and used to indicate a similarity degree between the base image block and itself. The second weight parameter may be obtained according to the neighboring image corresponding to the base image block.

Therefore, in some embodiments, determining the weight parameter set corresponding to the base image blocks may include, for each base image block, determining the second weight parameter of each neighboring image block corresponding to the base image block, and obtaining the first weight parameter corresponding to the base image block to obtain the weight parameter set corresponding to the base image block.

Figure 31:
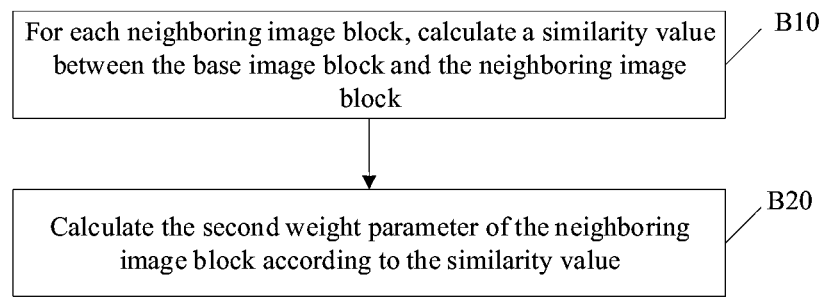
FIG. 31 is a schematic flowchart of a calculation process of a second weight parameter of an image processing method according to some embodiments of the present disclosure.

In some embodiments, each base image block may correspond to at least one neighboring image block. The quantity of the neighboring image blocks corresponding to the base image may be equal to the quantity of neighboring image blocks corresponding to the base image. For each neighboring image block corresponding to the base image, the neighboring image block may correspond to the second weight parameter. Thus, the quantity of the second weight parameters corresponding to the base image block may be equal to the quantity of the neighboring image in the to-be-processed image set. In addition, the second weight parameter may be obtained by calculating a similarity degree between the base image block and the neighboring image block. Correspondingly, in some embodiments, as shown in FIG. 31, determining the second weight parameters of the neighboring image blocks corresponding to the base image block includes, for each neighboring image block, calculating a similarity value between the base image block and the neighboring image block (B10) and calculating the second weight parameter of the neighboring image block according to the similarity value (B20).

In some embodiments, the similarity degree may refer to the similarity degree between the base image block and the neighboring image block. The neighboring image block may be determined according to the base image block in the neighboring image. The image size of the neighboring image block may be the same as the image size of the base image block. Thus, the pixels included in the base image block may have a one-to-one correspondence with the pixels included in the neighboring image block. For each pixel in the base image block, a pixel corresponding to the pixel may be found in the neighboring image block. Thus, the similarity degree may be calculated according to the pixel values of the pixels included in the base image block and the pixel values of the pixels included in the neighboring image block.

Calculating the similarity degree according to the pixel values of the pixels included in the base image block and the pixel values of the pixels included in the neighboring image block may include reading first pixel values corresponding to the pixels included in the base image block and second pixel values corresponding to the pixels included in the neighboring image block, for each first pixel value, calculating differences between the first pixel values and the second pixel values corresponding to the first pixel values, and calculating the similarity degree of the base image block and the neighboring image block according to all the calculated differences. The similarity degree may be a mean value of an absolute value of each calculated difference. For example, a difference between first pixel value A and second pixel value A may be calculated. A difference between first pixel value B and second pixel value B may be calculated. The similarity degree between the base image block and the neighboring image block may be determined according to the difference between first pixel value A and second pixel value A and the difference between first pixel value B and second pixel value B. In some embodiments, the similarity value may be a mean value of an absolute value of the difference between first pixel value A and second pixel value A and an absolute value of the difference between first pixel value B and second pixel value B. Thus, the larger the similarity degree is, the similarity between the base image block and the neighboring image block is lower, otherwise, the smaller the similarity degree is, the similarity between the base image block and the neighboring image block is higher.

In some embodiments, for each base image block $v_i^r$ and the neighboring image block $v_i^n$ corresponding to the base image block. The similarity degree $d_i$ of $v_i^r$ and $v_i^n$ is calculated by the following formula:

$$d_i = \frac{\sum_{j=1}^{M} |v_{i,j}^r - v_{i,j}^n|}{M}$$

where j denotes a pixel index, j=1, 2, . . . , M. M denotes a quantity of pixels included in the base image block (the neighboring image block and the base image block have the same quantity of the pixels), $v_{i,j}^r$ denotes a pixel value of a j-th pixel in the base image block, $v_{i,j}^n$ denotes a pixel value of the pixel corresponding to the j-th pixel in the neighboring image block and the base image block, and i denotes the i-th base image block, i=1, 2, . . . , N, N being the quantity of the base image blocks.

Further, according to the calculation formula of the similarity value, the similarity value may be related to the image noise intensity of the image in the to-be-processed image set, and the difference between the image content of the base image block and the image content of the neighboring image block. In some embodiments, when the image noise is high or the difference between the image content of the base image block and the image content of the neighboring image block is large, the similarity degree may be large. On the contrary, when the image noise intensity is low and the difference between the image content of the base image block and the image content of the neighboring image block is small, the similarity degree may be small. Thus, a subsequent fusion operation is performed on the neighboring image block with a large similarity degree, a fusion effect may be poor. Therefore, by obtaining the similarity degree of the base image block and the neighboring image blocks, a second weight parameter may be configured for the neighboring image blocks according to the similarity degrees corresponding to the neighboring image blocks. The second weight parameter may be negatively correlated to the similarity degree. That is, the larger the similarity degree is, the smaller the second weight parameter is. On the contrary, the smaller the similarity degree is, the greater the second weight parameter is. Thus, by assigning a low weight value to the neighboring image with a low similarity degree, a distortion problem such as a ghost effect after fusion may be prevented.

Exemplarily, in some embodiments, calculating the second weight parameter of the neighboring image block according to the similarity degree may include the following processes.

At C10, when the similarity degree is less than or equal to a first threshold, the first predetermined parameter is used as the second weight parameter of the neighboring image block.

At C20, when the similarity degree is greater than the first threshold and less than or equal to a second threshold, the second weight parameter of the neighboring image block is calculated according to the similarity degree, the first threshold, and the second threshold.

At C30, when the similarity degree is greater than the second threshold, the second predetermined parameter is used as the second weight parameter of the neighboring image block.

In some embodiments, process B20 may include any one, any two, or all of process C10, process C20, and process C30. That is, in some embodiments, process B20 may include C10 and/or C20 and/or C30.

In some embodiments, the first threshold and the second threshold may be both used to measure the similarity degree between the base image block and the neighboring image block. The second threshold may be greater than the first threshold. When the similarity degree is smaller than the first threshold, the similarity degree between the base image block and the neighboring image block may be high according to the relationship between the similarity degrees. Thus, the second weight parameter corresponding to the neighboring image block may be large. When the similarity degree is greater than the second threshold, the similarity degree between the base image block and the neighboring image block may be low according to the relationship between the similarity degrees. Thus, the second weight parameter value corresponding to the neighboring image block may be small. Therefore, the first predetermined parameter may be greater than the second predetermined parameter. The third parameter of the neighboring image block may be calculated according to the similarity degree, the first threshold, and the second threshold, and the third parameter is between the first predetermined parameter and the second predetermined parameter.

Further, in some embodiments, calculating the third parameter may include first calculating a first difference between the similarity degree and the second threshold, then calculating a second difference between the first threshold and the second threshold, then calculating a ratio of the first difference and the second difference, and using the ratio as the second weight parameter of the neighboring image block. In addition, according to a calculation process of the third parameter, the third parameter may range from 0 to 1. The first predetermined parameter may be greater than the third parameter, and the second predetermined parameter may be less than the third parameter. Thus, the first predetermined parameter may be set to 1, and the second predetermined parameter is set to 0. Therefore, the correspondence between the second weight parameter and the similarity degree may be:

$$w_i = \begin{cases} 1, & d_i \le t_1 \\ \frac{d_i - t_2}{t_1 - t_2}, & t_1 < d_i \le t_2 \\ 0, & d_i > t_2 \end{cases}$$

where $w_i$ denotes the second weight parameter, $t_1$ denotes the first threshold, $t_2$ denotes the second threshold, $d_i$ denotes the similarity degree, i denotes the i-th base image block, i=1, 2, . . . , N, and N being the quantity of the base image blocks.

The similarity degree may be positively correlated with a weight coefficient. That is, the higher the similarity degree between the base image and the neighboring image is, the greater the weight coefficient corresponding to the neighboring image block is. On the contrary, the lower the similarity degree between the base image and the neighboring image is, the lower the weight coefficient corresponding to the neighboring image block is. For the base image block, the similarity degree of the base image block may be determined by comparing the base image block to the base image block itself. Thus, the similarity degree of the base image block compared with itself may be greater than or equal to the similarity degree between the neighboring image block and the base image block. Correspondingly, the first weight parameter may be greater than or equal to the second weight coefficient. Further, according to the calculation formula of the second weight parameter, the second weight coefficient may have a maximum value of 1. In some embodiments, the first weight coefficient corresponding to the base image block may be equal to the maximum value of the second weight parameter. That is, the first weight parameter may be 1.

Further, the first threshold and the second threshold may be predetermined or may be determined according to the similarity degree of the base image block corresponding to the neighboring image block. In some embodiments, the first threshold and the second threshold may be determined according to the similarity degree of the base image block corresponding to the neighboring image blocks. Determining the first threshold and the second threshold may include obtaining the similarity degrees of the neighboring image blocks, calculating a mean value and a standard deviation of the similarity values, and calculating the first threshold and the second threshold according to the mean value and the standard deviation. Thus, the first threshold and the second threshold may be determined according to the similarity degrees of the neighboring image blocks. Thus, the first threshold and the second threshold may be adaptively adjusted according to the similarity degrees of the neighboring images. Thus, the first threshold and the second threshold may be adaptively adjusted according to the noise intensity of the neighboring images. As such, a poor image denoising effect due to the excessive first threshold and the excessive second threshold may be avoided, and the image blurring due to the first threshold and the second threshold being too small may be avoided. Thus, the definition of the image may be improved by ensuring the image denoising effect.

Further, in some embodiments, calculation formulas of the first threshold $t_1$ and the second threshold $t_2$ are as follows.

$$t_1 = \mu + s_{min} \times \sigma$$

$$t_2 = \mu + s_{max} \times \sigma$$

$$\mu = \frac{\sum_{i=1}^{L} d_i}{L} \quad d_i < d_{max}$$

$$\sigma = \sqrt{\frac{\sum_{i=1}^{L} (d_i - \mu)^2}{L-1}} \quad d_i < d_{max}$$

where $S_{min}$ and $S_{max}$ are constants, $d_{max}$ is a constant, L denotes that a quantity of neighboring image blocks with $d_i < d_{max}$, i=1, 2, . . . , L.

In addition, in the impact of the image noise intensity of the image in the to-be-processed image set and the accuracy of the selection of the neighboring image block on the similarity degree, the accuracy of the selection of the neighboring image block may cause a substantial change in the similarity degree. Thus, when the similarity degree between the neighboring image block and the base image block is greater than the predetermined value $d_{max}$ a difference between the image content of the base image block and the image content of the neighboring image block may be considered too large by default. The neighboring image block may be used as an invalid neighboring image block (i.e., the invalid neighboring image block is discarded and not taken as the neighboring image block of the base image block). Therefore, for a neighboring image block $d_i \geq d_{max}$, the difference between the image content of the base image block and the image content of the neighboring image block may be considered too large. Thus, the first threshold and the second threshold corresponding to the neighboring image block may not need to be determined, which improves the calculation speed of the weight parameter set corresponding to the base image block. Further, in the neighboring image block with a large difference in the image content compared to the image content of the base image block, the ghost effect generated when the neighboring image block with the large difference in the image content during fusion may be avoided, and the problem of distortion of the output image may be avoided.

Further, in process S23, the output image may be obtained by combining a plurality of output image blocks. The output image block may be calculated according to the base image block, the neighboring image block corresponding to the base image block, and the weight parameter set corresponding to the base image block. For example, for each pixel in the base image block, the first pixel value of the pixel and the second pixel value of the pixel corresponding to the pixel in each neighboring image block may be obtained. Then, the second weight parameter corresponding the neighboring image blocks and the first weight parameter corresponding to the base image may be used as the weight coefficient. The first pixel and the second pixels may be weighted to obtain the pixel value of each pixel in the output image block. Therefore, when the output image is determined according to the to-be-processed image set and the weight parameter set corresponding to the base image blocks, for each base image block, the neighboring image blocks corresponding the base image block may be weighted to obtain the output image block corresponding to the base image block. In weighting the base image block and the neighboring image blocks, the weight coefficient of the base image block may be the first weight coefficient in the weight parameter set, and the weight coefficient of the neighboring image blocks may be the second weight parameters corresponding to the neighboring image blocks in the weight parameter set. In addition, after calculating the output image blocks, the output image may be generated according to the calculated output image blocks. generating the output image according to the output image blocks may include replacing the bae image blocks corresponding to the output image blocks in the base image, or combining the output image blocks to obtain the output image.

For example, assume that the to-be-processed image set may include a base image and four neighboring images. For each base image block, the base image block may correspond to four neighboring image blocks being marked as a first neighboring image block, a second neighboring image block, a third neighboring image block, and a fourth neighboring image block. When determining the output image blocks corresponding to the base image block, for each pixel in the base image block, a pixel value of the pixel is A, a pixel value of a pixel corresponding to the pixel in the first neighboring image block is B, a pixel value of a pixel corresponding to the pixel in the second neighboring image block is C, a pixel value of a pixel corresponding to the pixel in the third neighboring image block is D, a pixel value of a pixel corresponding to the pixel in the fourth neighboring image block is E, the first weight parameter corresponding to the base image block is a, a second weight parameter corresponding to the first neighboring image block is b, a second weight parameter corresponding to the second neighboring image block is c, a second weight parameter corresponding to the third neighboring image block is d, a second weight parameter corresponding to the first neighboring image block is e, the pixel value of the output pixel corresponding to the pixel is (A×a+B×b+C×c+D×d+E×e)/5.

At H30, the denoised image is input into a trained first image processing model, and color deviation removal processing is performed on the denoised image by the image processing model to obtain a processed image corresponding to the denoised image.

In some embodiments, the denoised image may be generated according to the to-be-processed image set. The first image processing model may be pre-trained by an imaging apparatus for processing the denoised image (e.g., a mobile phone configured with an under-screen camera), or may be a file corresponding to the first image processing model trained by another apparatus that is moved to the imaging apparatus. In addition, the imaging apparatus may use the first image processing model as an image processing functional circuit. When the imaging apparatus obtains the denoised image, the image processing functional circuit may be started to input the denoised image to the first image processing model.

Further, the first image processing model may be obtained by training the training image set. Training the first image processing model includes the following processes.

At Q10, the first predetermined network model is configured to generate the generated image corresponding to the first image. The training image set includes a plurality of training image groups. Each training image group includes a first image and a second image. The first image is a color deviation image corresponding to the second image.

At Q20, the first predetermined network model is configured to correct the model parameter according to the second image corresponding to the first image and the generated image corresponding to the first image, and continue to generate an image corresponding to the first image according to the first image in the next training image group in the training image set until the training condition of the first predetermined network model satisfies the predetermined condition.

In some embodiments, in process Q10, the first predetermined network model may adopt a deep network learning model. The training image set may include the plurality of training image groups having different image contents. Each training image group may include the first image and the second image. The first image may be the color deviation image corresponding to the second image. The first image being the color deviation image corresponding to the second image may mean that the first image may correspond to the second image. The first image and the second image may represent the same image scene. The quantity of the first target pixels satisfying the predetermined color deviation condition in the first image may satisfy the predetermined quantity condition. The second image may be a normal display image. A plurality of first target pixels satisfying the predetermined color deviation condition may exist in the first image. The quantity of the plurality of first target pixels may satisfy the predetermined quantity condition. For example, the second image is the image as shown in FIG. 6.

The first image is the image as shown in FIG. 5. The image content of the first image may be the same as the image content of the second image. However, the color presented in the apple in the first image is different from the color presented in the apple in the second image. For example, in FIG. 5, the color of the apple in the first image is bluish green. In FIG. 6, the color of the apple in the second image is dark green.

Further, the predetermined color deviation condition may include that an error between a display parameter of the first target pixel of the first image and a display parameter of a second target pixel of the second image satisfies a predetermined error condition. The first target pixel may have a one-to-one correspondence with the second target pixel. The display parameter may be a parameter that reflects a color corresponding to a pixel. For example, the display parameter may be an RGB value of a pixel. An R value may be a red channel value, a G value may be a green channel value, and a value B may be a blue channel value. In some other embodiments, the display parameter may also be a hsl value of the pixel. An h value may be a hue value, an l value may be a brightness value, and an s value may be a saturation value. In addition, when the display parameter is the RGB value of the pixel, the display parameter of any pixel of the first image and the second image may include three display parameter values of the R value, the G value, and the B value. When the display parameter is the hsl value of the pixel, the display parameter of any pixel of the first image and the second image may include three display parameter values of the h value, the l value, and the s value.

The predetermined error condition may be used to measure whether the first target pixel is a pixel that satisfies the predetermined color deviation condition. The predetermined error condition may include a predetermined error threshold. When the error satisfies the predetermined error condition, the error may be greater than or equal to the predetermined error threshold. In addition, the display parameter may include a plurality of display parameters. For example, the display parameter may include an RGB value of a pixel. The display parameter may include three display parameter values of the R value, the G value, and the B value. When the display parameter is the hsl value of the pixel, the display parameter may include three display parameter values, such as the h value, the l value, and the s value. Therefore, the error may be an error maximum value of the display parameter values of the display parameter, or an error minimum value of the display parameter values of the display parameter, or an error average value of the display parameter values. For example, the display parameter may be the RGB value of the pixel, and description may be made below. The display parameter of the first target pixel may be (55, 86, 108), and the display parameter of the second target pixel may be (58, 95, 120). Thus, error values of the display parameter values may include 3, 9, and 12. When the error between the first target pixel and the second target pixel is the error maximum value of the display parameter values, the error is 12. When the error between the first target pixel and the second target pixel is the error minimum value of the display parameter values, the error is 3. When the error between the first target pixel and the second target pixel is the error average value of the display parameter values, the error is 8. In a possible implementation manner, an error of only one parameter (e.g., R, G, or B) in RGB or errors of any two parameters may be considered. When the display parameter is the hsl value of the pixel, the same procedure may be included.

Further, the second target pixel that is used to calculate the error with the first target pixel may have a one-to-one correspondence with the first second target pixel. For the first target pixel, a unique second target pixel that corresponds to the first target pixel may exist in the second image. The first target pixel corresponding to the second target pixel may indicate that a pixel position of the first target pixel in the first image may correspond to a pixel position of the second target pixel in the second image. For example, the pixel position of the first target pixel in the first image may be (5, 6), and the pixel position of the second target pixel in the second image may be (5, 6). In addition, the first target pixel may be any pixel in the first image, or may be any pixel in a target region in the first image. The target region may be a region where an item is located in the first image. The region where the item is located may be a region corresponding to a person or an object in the image. For example, as shown in FIG. 5, the target region is a region where the apple is located in the first image. That is, all the pixels in the first image may have the color deviation when compared with the second image. That is, all the pixels in the first image may be the first target pixels. In some embodiments, only some of the pixels may have the color deviation when compared with the second image. That is, some of the pixels in the first image may be the first target pixels. For example, when only a partial region (e.g., an area corresponding to the apple in the figure) in an image has the color deviation compared with the second image, the image may also be understood as a color deviation image corresponding to the second image, i.e., the first image.

Further, the first image corresponding to the second image may indicate that the first image and the second image may have the same image size and correspond to the same image scene. The first image and the second image corresponding to the same image scene may indicate that a similarity between the image content of the first image and the image content of the second image may reach a predetermined threshold. Since the first image and the second image have the same image size, when the first image and the second image coincide, a coverage rate of an item of the first image over a corresponding item of the second image may reach a predetermined condition. The predetermined threshold may be 99%, and the predetermined condition may be 99.5%. In an actual application, the first image may be captured through the under-screen imaging system. The second image may be captured by a normal on-screen imaging system (e.g., an on-screen camera), or may be obtained through a network (e.g., Baidu), or sent by another external apparatus (e.g., a smartphone).

In some embodiments of the present disclosure, the second image may be captured by a normal on-screen imaging system. The second image and the first image may have the same photographing parameter. The photographing parameter may include an exposure parameter of the imaging system. The exposure parameter may include an aperture, a shutter speed, sensitivity, focus, and a white balance. In an actual application, the photographing parameter may further include ambient light, a photographing angle, and a photographing range. For example, the first image is the image obtained by capturing a scene through the under-screen camera as shown in FIG. 5. The second image is the image obtained by capturing the scene through the on-screen camera as shown in FIG. 6.

Further, in embodiments of the present disclosure, in order to reduce an effect of an image difference between the first image and the second image on the training of the predetermined network model, the image content of the first image and the image content of the second image may be completely the same. That is, the first image and the second image having the same image content may indicate that an item content of the first image may be the same as an item content of the second image. The image size of the first image may be the same as the image size of the second image. When the first image and the second image coincide, the item in the first image may cover the object corresponding item in the second image.

For example, the image size of the first image may be 400×400. The image content of the first image may be a circle. A position of a circle center of the circle in the first image may be (200, 200), and a radius length may be 50 pixels. Then, the image size of the second image may be 400×400. The image content of the second image may be also a circle. A position of a circle center of the circle in the second image may be (200, 200). A radius length may be 50 pixels. When the first image is placed over the second image and coincides with the second image, the first image may cover the second image, and the circle in the first image may overlap with the circle in the second image.

Further, when the second image is captured by the normal on-screen imaging system, since the first image and the second image is captured by two different imaging systems, when the imaging system is switched, a photographing angle and/or a photographing position of the on-screen imaging system and a photographing angle and/or a photographing position of the under-screen imaging system may be changed. Thus, the first image and the second image may not be aligned in space. Thus, in some embodiments, when the second image is captured by the on-screen imaging system and the first image is captured by the under-screen imaging system, the on-screen imaging system and the under-screen imaging system may be arranged at a same fixing frame. The on-screen imaging system and the under-screen imaging system may be arranged at the fixing frame side by side. The on-screen imaging system may be kept in contact with the under-screen imaging system. Meanwhile, the on-screen imaging system and the under-screen imaging system may be connected to a wireless setting (e.g., a Bluetooth watch). Shutters of the on-screen imaging system and the under-screen imaging system may be triggered by the wireless setting. The position change of the on-screen imaging system and the under-screen imaging system may be reduced in a photographing process, and the alignment of the first image and the second image may be improved in space. Of course, photographing time and a photographing range of the on-screen imaging system may be same as photographing time and a photographing range of the under-screen imaging system.

In addition, in the photographing process of the first image and the second image, the photographing positions, the photographing angles, the photographing time, the exposure coefficients of the under-screen imaging system and the on-screen imaging system may be fixed. However, due to an environmental parameter (e.g., light intensity, wind blowing the imaging system, etc.), the first image captured by the under-screen imaging system and the second image captured by the on-screen imaging system may also not be aligned in space. Therefore, before the first image in the training image set is input into the predetermined network model, the first image and the second image in each training image group of the training image set may be aligned. Thus, in some embodiments, before the predetermined network model generates the generated image corresponding to the first image according to the first image of the training image set, the method may further include the following process.

At F100, for each training image group of the training image set, alignment processing is performed on the first image and the second image corresponding to the first image in the training image group to obtain an aligned image aligned with the second image, and the aligned image is used as the first image.

In some embodiments, processing for each training image group in the training image set may indicate that the alignment processing is performed on each training image group in the training image set. The alignment processing may be performed on each training image group, after the training image set is obtained, to obtain an aligned training image group. After each training image group is aligned, the first image of each training image group may be input into the predetermined network model. In some other embodiments, before the first image of each training image group is input into the predetermined network model, the alignment processing may be performed on the training image group to obtain the aligned training image group corresponding to the training image group. Then, the first image in the aligned training image group may be input into the predetermined network model. In some embodiments, after the training image set is obtained, the alignment processing may be performed on each training image group. After all the training image groups are aligned, the first image in the training image set may be input into the predetermined network model.

Further, in performing corresponding processing on the first image and the second image, the first image may be used as a reference image, and the second image may be used as a benchmark image. Alignment may be performed by using the benchmark image as a basis. Performing the alignment processing on the reference image in the training image group and the benchmark image corresponding to the reference image may include performing the alignment processing on the reference image in the training image group and the benchmark image corresponding to the reference image by using the benchmark image as the basis and aligning the pixels in the reference image with the pixels in the benchmark image corresponding to the pixels to cause the alignment rate of the pixels in the reference image and the pixels in the benchmark image to reach the predetermined value, e.g., 99%. The alignment of the pixel in the reference image and the corresponding pixel in the benchmark image may indicate that, for the reference pixel in the reference image and the benchmark pixel corresponding to the reference pixel in the benchmark image, if a pixel coordinate corresponding to the reference pixel is the same as a pixel coordinate corresponding to the benchmark pixel, the reference pixel is aligned with the benchmark pixel. If the pixel coordinate corresponding to the reference pixel is different from the pixel coordinate corresponding to the benchmark pixel, the reference pixel is not aligned with the benchmark pixel. The aligned image may refer to an image obtained by aligning the reference image. The pixel coordinate of each pixel in the aligned image may be the same as the pixel coordinate of the corresponding pixel in the benchmark image. In addition, after the aligned image is obtained, the aligned image may be used to replace the corresponding reference image to update the training image group. Thus, the reference image and the benchmark image in the updated training image group may be aligned in space.

Further, since alignment degrees of the reference images and the benchmark images in different training image groups are different, on the basis of achieving alignment, the reference images and the benchmark images with different alignment degrees may be aligned in different alignment manners. Thus, the training image groups may be aligned in an alignment manner with low complexity. Therefore, in some embodiments, aligning the reference image with the benchmark image corresponding to the reference image in the training image group includes obtaining a pixel deviation amount between the reference image and the benchmark image corresponding to the reference image in the training image group (F11), and determining an alignment manner corresponding to the reference image according to the pixel deviation amount and performing the alignment processing on the reference image and the benchmark image by using the alignment manner (F12).

In some embodiments, the pixel deviation amount may refer to a total quantity of first pixels in the reference image that are not aligned with the second pixels corresponding to the first pixels in the reference image. The pixel deviation amount may be obtained by obtaining a reference coordinate of a reference pixel in the reference image and a benchmark coordinate of a benchmark pixel in the benchmark image, and then comparing the reference coordinate of the reference pixel with the benchmark coordinate of the corresponding benchmark pixel. If the reference coordinate is the same as the benchmark coordinate, the reference pixel may be determined to be aligned with the corresponding benchmark pixel. If the reference coordinate is different from the benchmark coordinate, the reference pixel may be determined to not be aligned with the corresponding benchmark pixel. Then, the total number of all the reference pixels that are not aligned to obtain the pixel deviation amount. For example, when the reference coordinate of the reference pixel in the reference image is (200, 200), the benchmark coordinate of the benchmark pixel corresponding to the reference pixel in the benchmark image is (201, 200), the reference pixel is not aligned with the benchmark pixel, and the total number of the reference pixels that are not aligned may be added by one. When the reference coordinate of the reference pixel in the reference image is (200, 200), and the benchmark coordinate of the benchmark pixel corresponding to the reference pixel in the benchmark image is (200, 200), the reference pixel is aligned with the benchmark pixel, and the total number of the reference pixels that are not aligned may remain the same.

Further, in order to determine a correspondence between the pixel deviation amount and the alignment manner, a deviation amount threshold may need to be set. When the pixel deviation amount of the reference image is obtained, the alignment manner corresponding to the pixel deviation amount may be determined by comparing the obtained pixel deviation amount with a predetermined deviation amount threshold. Therefore, in some embodiments, determining the alignment manner corresponding to the reference image according to the pixel deviation amount and aligning the reference image with the benchmark image by using the alignment manner includes, when the pixel deviation amount is less than or equal to the predetermined deviation amount threshold, performing the alignment processing on the reference image by using the benchmark image as the basis according to mutual information of the reference image and the benchmark image (F121).

Determining the alignment manner corresponding to the reference image according to the pixel deviation amount and aligning the reference image with the benchmark image by using the alignment manner includes further includes, when the pixel deviation amount is greater than the predetermined deviation amount threshold, extracting a reference pixel set of the reference image and a benchmark pixel set of the benchmark image, calculating a coordinate difference between the reference pixel and the corresponding benchmark pixel for each reference pixel in the reference pixel set, and performing position adjustment on the reference pixel according to the coordinate difference corresponding to the reference pixel to align the reference pixel with the benchmark pixel corresponding to the reference pixel (M122). The reference pixel set may include a plurality of reference pixels in the reference image. The benchmark pixel set may include a plurality of benchmark pixels in the benchmark image. The benchmark pixels in the benchmark pixel set may have a one-to-one correspondence with the reference pixels in the reference pixel set.

In some embodiments, the predetermined deviation amount threshold may be set in advance. For example, the predetermined deviation amount threshold may be 20. The pixel deviation amount being less than or equal to the predetermined deviation amount threshold may indicate that, when the pixel deviation amount is compared to the predetermined deviation amount threshold, the pixel deviation amount may be less than or equal to the predetermined deviation amount threshold. When the pixel deviation amount is less than or equal to the predetermined deviation amount threshold, the deviation of the reference image and the benchmark image in space may be relatively small. Thus, the reference image and the benchmark image may be aligned according to the mutual information of the reference image and the benchmark image. In some embodiments, a process of aligning the reference image and the benchmark image with the mutual information between the reference image and the corresponding benchmark image may adopt an image registration method. In the image registration method, the mutual information may be used as a measurement criterion. An alignment parameter may be obtained by iteratively optimizing the measurement criterion by an optimizer. The reference image may be aligned with the benchmark image by the optimizer registering with the alignment parameter, which ensures an alignment effect of the reference image and the benchmark image, reduces the alignment complexity of the reference image and the benchmark image and improves the alignment efficiency. In embodiments of the present disclosure, the optimizer may be mainly configured to optimize the measurement criterion with translation and rotation transformation.

Further, the pixel deviation amount being greater than the predetermined deviation threshold may indicate that the reference image and the benchmark image are not aligned in space to a relatively high degree. Thus, the alignment effect may need to be focused on. Therefore, the reference image and the benchmark image may be aligned by selecting the reference pixel set in the reference image and the benchmark pixel set in the benchmark image. The reference pixels of the reference pixel set may have a one-to-one correspondence with the benchmark pixels in the benchmark pixel set. Thus, for any reference pixel in the reference pixel set, a benchmark pixel may be found in the benchmark pixel set, and the position of the benchmark pixel in the benchmark image may correspond to the position of the reference pixel in the reference image. In addition, after the reference pixel set/the benchmark pixel set are obtained, the reference pixel set and the benchmark pixel set may be determined according to a correspondence between the reference pixel and the benchmark pixel. For example, the reference pixel set may be generated by randomly selecting a plurality of reference pixels in the reference image. The benchmark pixel may be determined according to the reference pixels included in the reference pixel set.

Meanwhile, in embodiments of the present disclosure, the reference pixel set and the benchmark pixel set may be obtained in a scale-invariant feature transform (sift) manner. That is, the reference pixel in the reference pixel set may be a first sift feature point in the reference image, and the benchmark pixel in the benchmark pixel set may be a second sift feature point of the benchmark image. Correspondingly, calculating the coordinate difference between the reference pixel and the corresponding benchmark pixel may include performing point-to-point matching on the first sift feature point in the reference pixel set and the second sift feature point in the benchmark pixel set to obtain a coordinate difference between the first sift feature point and the corresponding second sift feature point and performing position transformation on the first sift feature point according to the coordinate difference corresponding to the first sift feature point to align the first sift feature point and the second sift feature point corresponding to the first sift feature point. Thus, the position of the first sift feature point in the reference image and the position of the second sift feature point in the benchmark image may be the same, and the reference image may be aligned with the benchmark image.

Further, in embodiments of the present disclosure, as shown in FIGS. 3, 4, and 8, the first predetermined network model includes a down-sampling module 100 and a transformation module 200. Correspondingly, the first predetermined network model generating a generated image corresponding to the first image according to the first image in the training image set includes the following processes.

At Q11, the first image in the training image set is input into the down-sampling module, and a bilateral grid corresponding to the first image and a guidance image corresponding to the first image are obtained by the down-sampling module. Resolution of the guidance image is the same as resolution of the first image.

At Q12, the guidance image, the bilateral grid, and the first image are input into the transformation module, and the generated image corresponding to the first image is generated by the transformation module.

In some embodiments, the bilateral grid 10 may be a three-dimensional bilateral grid obtained by adding a dimension that represents pixel intensity in the pixel coordinate of the two-dimensional image. Three dimensions of the three-dimensional bilateral grid may include a horizontal axis and a longitudinal axis in the pixel coordinate of the two-dimensional image, and the added dimension that represents the pixel intensity. The guidance image may be obtained by performing a pixel-level operation on the first image. The resolution of the guidance image 50 may be the same as the resolution of the first image. For example, the guidance image 50 may be a grayscale image corresponding to the first image.

Further, since the down-sampling module 100 is configured to output the bilateral grid 10 and the guidance image 50, the down-sampling module 100 may include a down-sampling unit 70 and a convolution unit 30. The down-sampling unit 70 may be configured to output the bilateral grid 10 corresponding to the first image. The convolution unit 30 may be configured to output the guidance image 50 corresponding to the first image. Correspondingly, as shown in FIGS. 3, 4, and 9, the first image in the training image set is input into the down-sampling module. Obtaining the bilateral grid corresponding to the first image and the guidance image corresponding to the first image through the down-sampling module includes inputting the first image of the training image set into the down-sampling unit and the convolution unit (Q111) and obtaining the bilateral grid corresponding to the first image through the down-sampling unit and obtaining the guidance image corresponding to the first image through the convolution unit (Q112).

In some embodiments, the down-sampling unit 70 may be configured to down-sample the first image to obtain a feature image corresponding to the first image and generate the bilateral grid corresponding to the first image according to the feature image. A quantity of spatial channels of the feature image may be greater than a quantity of spatial channels of the first image. The bilateral grid may be generated according to a local feature and a global feature of the feature image. The local feature may include a feature extracted from a local region of the image, for example, an edge, an angular point, a line, a curve, an attribute region, etc. In embodiments of the present disclosure, the local feature may include a regional color feature. The global feature may refer to a feature that represents an attribute of an entire image, e.g., a color feature, a texture feature, and a shape feature. In embodiments of the present disclosure, the global feature may include the color feature of the entire image.

Further, in some embodiments, the down-sampling unit 70 may include a down-sampling layer, a local feature extraction layer, a global feature extraction layer, and a fully connected layer. The local feature extraction layer may be connected between the down-sampling layer and the fully connected layer. The global feature extraction layer may be connected between the down-sampling layer and the fully connected layer. The global feature extraction layer may be connected in parallel to the local feature extraction layer. The first image may be input to the down-sampling layer as an input item, and the feature image may be output through the down-sampling layer. The feature image of the down-sampling layer may be input to the local feature extraction layer and the global feature extraction layer. The local feature extraction layer may be configured to extract a local feature of the feature image. The global feature extraction layer may be configured to extract a global feature of the feature image. The local feature output by the local feature extraction layer and the global feature output by the global feature extraction layer may be input to the fully connected layer. Thus, the bilateral grid corresponding to the first image may be output by the full connection layer. In addition, in some embodiments, the down-sampling layer may include a down-sampling convolutional layer and four first convolutional layers. A convolution kernel of a first convolutional layer may be 1×1, and a step size of the first convolutional layer may be 1. The local feature extraction layer may include two second convolutional layers. A convolution kernel of each second convolutional layer may be 3×3, and a step size of each second convolutional layer may be 1. The global feature extraction layer may include two third convolutional layers and three fully connected layers. A convolution kernel of each third convolutional layer may be 3×3, and a step size of each third convolutional layer may be 2.

Further, the convolution unit 30 may include a fourth convolutional layer. The first image may be input to the fourth convolutional layer. The guidance image may be output by the fourth convolutional layer. The guidance image may have the same resolution as the first image. For example, the first image may be a color image. The fourth convolutional layer may be configured to perform a pixel-level operation on the first image to cause the guidance image to be a gray scale image of the first image.

For example, the first image I may be input to the down-sampling convolutional layer. A three-channel low-resolution image with a size of 256×256 may be output through the down-sampling convolutional layer. A 64-channel feature image with a size of 16×16 may be obtained by passing the three-channel low-resolution image with a size of 256×256 sequentially through the four first convolutional layers. A local feature L may be obtained by inputting the 64-channel feature image with the size of 16×16 into the local feature extraction layer. A global feature may be obtained by inputting the 64-channel feature image with the size of 16×16 into the global feature extraction layer. The local feature and the global feature may be input into the fully connected layer. The bilateral grid may be output by the fully connected layer. In addition, the first image may be input to the convolution unit. The guidance image corresponding to the first image may be output by the convolution unit.

Further, in some embodiments, the transformation module 200 may include a segmentation unit 40 and a transformation unit 60. Correspondingly, as shown in FIGS. 3, 4, and 10, inputting the guidance image, the bilateral grid, and the first image into the transformation module, and generating the generated image corresponding to the first image by the transformation module includes inputting the guidance image into the segmentation unit and segmenting the bilateral grid by the segmentation unit to obtain a color transformation matrix of the pixels in the first image (Q121) and inputting the first image and the color transformation matrix of the pixels in the first image into the transformation unit and generating the generated image corresponding to the first image by the transformation unit (Q122).

In some embodiments, the segmentation unit 40 may include an up-sampling layer. Input items of the up-sampling layer may include the guidance image and the bilateral grid. The color transformation matrix of the pixels in the first image may be obtained by up-sampling the bilateral grid through the guidance image. An up-sampling process of the up-sampling layer may include up-sampling the bilateral grid with reference to the guidance image to obtain the color transformation matrix of the pixels in the first image. In addition, input items of the transformation unit 60 may include the color transformation matrix of the pixels and the first image. The generated image corresponding to the first image may be obtained by transforming the colors of the corresponding pixels in the first image through the color transformation matrix of the pixels.

In process Q20, the predetermined network model is configured to correct the model parameters according to the second image corresponding to the first image and the generated image corresponding to the first image, and continue to execute the step of generating a generated image corresponding to the first image according to the first image in the training image set until the training condition of the predetermined network model satisfies the predetermined condition to obtain the image processing model.

In some embodiments, the predetermined condition may include a loss function value satisfying a predetermined requirement or a number of times of training reaching a predetermined number of times. The predetermined requirement may be determined according to the precision of the image processing model, which is not described in detail here. The predetermined number of times may be a maximum number of times of the training of the predetermined network model, e.g., 5000 times. Therefore, after the predetermined network model outputs the generated image, the loss function value of the predetermined network model may be calculated according to the generated image and the second image. After the loss function value is calculated, whether the loss function value satisfies the predetermined requirement or not may be determined. If the loss function value satisfies the predetermined requirement, the training may be ended. If the loss function value does not satisfy the predetermined requirement, whether the number of times of the training of the predetermined network model reaches the predetermined number of times may be determined. If the number of times of the training does not reach the predetermined number of times, the network parameters of the predetermined network model may be corrected according to the loss function value. If the number of times of the training reaches the preset number of times, the training may be ended. Thus, whether the training of the predetermined network model is ended may be determined according to the loss function value and the number of times of the training, which may avoid the training of the predetermined network model from entering an infinite loop due to the reason that the loss function value cannot reach the predetermined requirement.

Further, since the network parameter of the first predetermined network model is modified when the training condition of the first predetermined network model does not satisfy the predetermined condition (i.e., the loss function value does not meet the predetermined requirement and the number of times of the training does not reach the predetermined number of times), the network model may need to be continuously trained after the network parameter of the first predetermined network model is corrected according to the loss function value. That is, the step of inputting the first image in the training image set into the first predetermined network model may continue to be executed. The first image may continue to be input to the first predetermined network model as the input item of the first predetermined network model. For example, each of the first images in the training image set may have a unique image identifier (e.g., image number). An image identifier of a first image that is input in the first training may be different from an image identifier of a first image that is input in the second training. For example, an image number of the first image that is input in the first training may be 1, an image number of the first image that is input in the second training may be 2, and an image number of the first image that is input in an n-th training may be N. In an actual application, since a quantity of the first images in the training image set may be limited, in order to improve the training effect of the image processing model, the first images in the training image set may be sequentially input to the first predetermined network model to train the first predetermined network model. After all the first images in the training image set are input to the first predetermined network model, the operation of inputting the first image in the training image set to the first predetermined network model may continue to be executed to input the training image groups in the training image set into the first predetermined network model in a loop.

In addition, diffusion degrees of a highlight portion of an image captured at different exposure degrees may be different. Thus, diffusion degrees of the highlight portion of the image captured by the under-screen imaging system at different light intensities may be different. As such, the image quality of the images captured by the under-screen imaging system may be different. Therefore, when the image processing model is trained, a plurality of training image sets may be obtained. Each training image set may correspond to a different exposure degree. Each training image set may be used to train the first predetermined network model to obtain a model parameter corresponding to each training image set. Thus, by using the first images with the same exposure degree as the training sample image, the training speed of the network model may be improved. Meanwhile, different exposure degrees may correspond to different model parameters. When the image processing model is used to process the to-be-processed image with the color deviation, the corresponding model parameter may be selected according to the exposure degree corresponding to the to-be-processed image. Thus, the diffusion of the highlight portion of the image under the exposure degrees may be inhibited to improve the image quality of the processed image corresponding to the to-be-processed image.

Further, in some embodiments, the training image set may include a plurality of training image sub-sets. Each training image sub-set may include a plurality of training sample image groups. Exposure degrees of the first images in any two training sample image groups in the plurality of training sample image groups may be the same (i.e., for each training sample image group, exposure degrees of first images of the plurality of training image groups are the same). If exposure degrees of the second images in each training sample image group in the plurality of training sample image groups are all within a predetermined range, exposure degrees of the first images in any two training sample image sub-sets may be different. The predetermined range of the exposure degree of the second image may be determined according to exposure time and ISO (an aperture of the existing mobile phone is a fixed value). The predetermined range of the exposure degree may represent an exposure degree of photographing an image without exposure compensation. The second image captured by the on-screen camera at the first exposure degree within the predetermined range of the exposure degree may be a normal exposure image. By using the normal exposure image as the second image, the image output by the image processing model that is trained according to the training image set may have the normal exposure degree. Thus, the image processing model may have a brightness enhancement function. For example, when image A that is input to the image processor is an image with a low exposure degree, after image A is processed by the image processing model, the exposure degree of processed image A may be a normal exposure degree. Thus, the image brightness of image A may be improved.

For example, assume that the exposure degree of the image may include 5 levels, which may be denoted as 0, −1, −2, −3, and −4, respectively. The exposure degree may be increased as the exposure level is reduced. For example, an exposure degree corresponding to exposure level 0 may be lower than an exposure degree corresponding to exposure level −4. The training image set may include five training image sub-sets, which may be denoted as a first training image sub-set, a second training image sub-set, a third training image sub-set, a fourth training image sub-set, and a fifth training image sub-set, respectively. An exposure degree of a first image in each training image group included in the first training image sub-set may correspond to level 0. A second image may be an image with an exposure degree within a predetermined range. An exposure degree of a first image in each training image group included in the second training image sub-set may correspond to level −1. A second image may be an image with an exposure degree within the predetermined range. An exposure degree of a first image in each training image group included in the third training image sub-set may correspond to level −2. A second image may be an image with an exposure degree within the predetermined range. An exposure degree of a first image in each training image group included in the fourth training image sub-set may correspond to level −3. A second image may be an image with an exposure degree within the predetermined range. An exposure degree of a first image in each training image group included in the fifth training image sub-set may correspond to level −4. A second image may be an image with an exposure degree within the predetermined range. A quantity of the training image groups included in the first training image sub-set, a quantity of the training image groups included in the second training image sub-set, a quantity of the training image groups included in the third training image sub-set, a quantity of the training image groups included in the fourth training image sub-set, and a quantity of the training image groups included in the fifth training image sub-set may be the same or different. For example, the first training image sub-set, the second training image sub-set, the third training image sub-set, the fourth training image sub-set, and the fifth training image sub-set may each include 5000 training image groups.

In addition, for each training image sub-set, the training image sub-set may include a training image set of a first predetermined network model. The first predetermined network model may be trained by using the training image sub-set to obtain a model parameter corresponding to the training image sub-set. The process of training the first predetermined network model by using the training image sub-set as the training image set may include generating, by the first predetermined network model, a generated image corresponding to the first image according to the first image in the training image sub-set and correcting the model parameter according to the second image corresponding to the first image and the generated image corresponding to the first image. The process may further include continuing to execute the step of generating, by the first predetermined network model, a generated image corresponding to the first image according to the first image in the training image sub-set until the training condition of the first predetermined network model satisfies the predetermined condition to obtain the model parameter corresponding to the training sub-image. For specific description, references may be made to step M10 and step Q20, which are not repeated here.

Further, a training process of each training image sub-set for the first predetermined network model may be independent. That is, the first predetermined network model may be trained individually by using each training image sub-set. Meanwhile, by training the first predetermined network model using the training image sub-sets, a plurality of model parameters may be obtained. Each model parameter may be trained and obtained according to a training image sub-set. Training image sub-sets corresponding to any two model parameters may be different from each other. Thus, the image processing model may correspond to the plurality of model parameters, and the plurality of model parameters may have a one-to-one correspondence with the plurality of training image sub-sets.

For example, the training sample image may include a first training image sub-set, a second training image sub-set, a third training image sub-set, a fourth training image sub-set, and a fifth training image sub-set. Thus, the image processing model may include five model parameters, which may be denoted as a first model parameter, a second model parameter, a third model parameter, a fourth model parameter, and a fifth model parameter, respectively. The first model parameter may correspond to the first training image sub-set. The second model parameter may correspond to the second training image sub-set. The third model parameter may correspond to the third training image sub-set. The fourth model parameter may correspond to the fourth training image sub-set. The fifth model parameter may correspond to the fifth training image sub-set.

Further, when the training image set includes a plurality of training image sub-sets, the first predetermined network model may be trained according to each training image sub-set. For example, the training image set may include five training image sub-sets, which are used for description. A process of training the first predetermined network model by using the first training image sub-set, the second training image sub-set, the third training image sub-set, the fourth training image sub-set, and the fifth training image sub-set may include training the first predetermined network model by using the first training image sub-set to obtain the first model parameter corresponding to the first training image sub-set, and then training the first predetermined network model by using the second training image sub-set to obtain the second model parameter corresponding to the second training image sub-set, so on and so as to obtain the fifth model parameter corresponding to the fifth training image sub-set.

In addition, when the plurality of training image sub-sets are trained by using the same first predetermined network model, the training image sub-sets may affect the model parameter of the first predetermined network model. For example, assume that training image sub-set A may include 1000 training image groups, and training image sub-set B may include 200 training image groups. Thus, the first predetermined network model may be trained by using training image sub-set A. Subsequently, the first predetermined network model may be trained by using training image sub-set B. Then, a model parameter corresponding to training image sub-set B may be obtained. The model parameter may be different from a model parameter corresponding to training image sub-set B obtained by training the first predetermined network model by using only training image sub-set B.

Therefore, in some embodiments, after the first predetermined network model trains the training image sub-set, the first predetermined network model may be first initialized, and then the initialized first predetermined network model may be configured to perform training on a next training image sub-set. For example, after the first model parameter corresponding to the first training image sub-set is obtained by training the first training image sub-set through the first predetermined network model, the first predetermined network model may be initialized. Thus, an initial model parameter and a model structure of the first predetermined network model that is configured to train the second model parameter may be the same as the first predetermined network model that is configured to train the first model parameter. Before the third model parameter, the fourth model parameter, and the fifth model parameter are trained, the first predetermined network model may be initialized. Thus, the initial model parameter and the model structure of the first predetermined network model corresponding to each training image sub-set may be the same. In an actual application, after the first model parameter corresponding to the first training image sub-set is obtained by training the first predetermined network model according to the first training image sub-set, the second training image sub-set may be directly trained by using the first predetermined network model (configured with the first model parameter) that is trained base on the first training image sub-set to obtain the second model parameter corresponding to the second training image sub-set. The step of training the first predetermined network model (configured with the second model parameter) according to the third training image sub-set may continue to be performed until the fifth model parameter corresponding to the fifth training image sub-set is obtained by training the fifth training image sub-set is.

In addition, the first training image sub-set, the second training image sub-set, the third training image sub-set, the fourth training image sub-set, and the fifth training image sub-set each may include a certain number of training image groups. Thus, each training sub-image group may satisfy a training requirement of the first predetermined network model. In an actual application, when the first predetermined network model is trained based on each training image sub-set, the training image groups of the training image sub-set may be input to the first predetermined network model in a loop to train the first predetermined network model to cause the first predetermined network model to satisfy the predetermined requirement.

Further, in some embodiments, a process of obtaining training samples including the training image sub-sets may include setting a first exposure degree for the under-screen imaging system, obtaining a first image in the first training image sub-set through the under-screen imaging system, and obtaining a second image corresponding to the first image in the first training image sub-set through the on-screen imaging system. The process may further include, after the first training image sub-set is obtained, setting a second exposure degree for the under-screen imaging system, and obtaining a first image and a second image corresponding to the first image in the second training image sub-set through the under-screen imaging system and the on-screen imaging system. The process may further include, after the second training image sub-set is obtained, continuing to execute the step of setting the exposure degree of the under-screen imaging system and obtaining the training image sub-set until all the training image sub-sets included in the training image set are obtained. A quantity of the training image groups included in each training image sub-set included in the training image set may be the same or different. In some embodiments, the quantity of the training image groups included in each training image sub-set included in the training image set may be the same. For example, the quantity of the training image groups included in each training image sub-set may be 5000.

Further, since the training image sub-sets correspond to different exposure degrees, after the model parameter corresponding to each training image sub-set is obtained, for each training image sub-set, the model parameter corresponding to the training image sub-set may be associated with the exposure degree corresponding to the training image sub-set to establish a correspondence between the exposure degree and the model parameter. As such, when the image processing model is configured to process the image that is to be processed, an exposure degree of the image that is to be processed may be obtained first, and then the model parameter corresponding to the image that is to be processed may be determined according to the exposure degree. Then, the model parameter corresponding to the image that is to be processed may be configured to the first predetermined network model to obtain the image processing model corresponding to the image that is to be processed. Thus, the image processing model may be configured to process the image that is to be processed. Therefore, the image processing models configured with different model parameters may be determined for the image that is to be processed with different exposure degrees. The image processing model corresponding to the image that is to be processed may be configured to process the image that is to be processed to avoid an influence of the exposure degree on the color deviation, which can improve the effect of removing the color deviation of the image that is to be processed. In addition, the second image may have a normal exposure degree. Thus, the processed image output by the image processing model may have a normal exposure degree, which can improve the brightness of the image that is to be processed.

Further, in some embodiments, according to a generation process of the first image processing model, the first image processing model may include a plurality of model parameters Each model parameter may correspond to an exposure degree. Therefore, in some embodiments, after the denoised image is obtained, a quantity of the model parameters included in the first image processing model may be detected first. When the quantity of the model parameter is one, the denoised image may be directly input into the first image processing model to process the denoised image through the image processing. When the quantity of the model parameters is more than 1, the exposure degree of the denoised image may be obtained first, and then the model parameter corresponding to the denoised image may be determined according to the exposure degree. The model parameter corresponding to the denoised image may be configured to the first image processing model to update the model parameter configured for the image processing parameter. The denoised image may be input into the updated first image processing model.

Further, in some embodiments, the first image processing model may correspond to the plurality of model parameters. Each model parameter may be trained and obtained according to a training image sub-set. The training image sub-sets corresponding to any two model parameters may be different from each other (for example, the training image sub-set corresponding to model parameter A is different from the training image sub-set corresponding to model parameter B). Correspondingly, inputting the denoised image into the first image processing model includes the following processes.

At F101, the exposure degree of the denoised image is extracted.

In some embodiments, the exposure degree may be a degree of light irradiation of the photosensitive element of an image acquisition device and be used to reflect the exposure degree during imaging. The denoised image may be an RGB three-channel image. The exposure degree of the denoised image may be determined according to a highlight region of the denoised image. At least one of an R (i.e., a red channel) value, a G (i.e., a green channel) value, or a B (i.e., a blue channel) value of each pixel included in the highlight region may be greater than a predetermined threshold. In an actual application, the denoised image may also be a Y-channel image or a Bell format image. When the denoised image is a Y-channel image or a Bell format image (RAW format), before the denoised image is extracted, the Y-channel image or the Bell format image may need to be converted into an RGB three-channel image. Thus, the highlight region of the denoised image may be determined according to the red channel R value, the green channel G value, and the blue channel B value of the denoised image.

Further, in some embodiments, extracting the exposure degree of the denoised image may include determining a third pixel satisfying the predetermined condition according to the red channel R value, the green channel G value, and the blue channel B value of each pixel in the denoised image (G10), and determining the highlight region of the denoised image according to all third pixels satisfying the predetermined condition and determining the exposure degree of the denoised image according to the highlight region (G20). The predetermined condition may include that at least one of the R value, the G value, or the B value is greater than a predetermined threshold.

In some embodiments, the denoised image may be an RGB three-channel image. Thus, for each pixel in the denoised image, the pixel may include a red channel R value, a green channel G value, and a blue channel B value. That is, for each pixel in the denoised image, the red channel R value, the green channel G value, and the blue channel B value of the pixel may be obtained. Therefore, in a process of extracting the exposure degree of the denoised image, firstly, for each pixel of each denoised image, a red channel R value, a green channel G value, and a blue channel B value of the pixel may be obtained. Then, the R value, the G value, and the B value of each pixel may be compared with the predetermined threshold to obtain a third pixel that satisfies the predetermined condition in the denoised image. The predetermined condition may include that at least one of the R value, the G value, or the B value may be greater than the predetermined threshold. The third pixel satisfying the predetermined condition may indicate that the R value of the third pixel may be greater than the predetermined threshold, the G value of the third pixel may be greater than the predetermined threshold, the value B of the third pixel may be greater than the predetermined threshold, the R value and the G value of the third pixel may both be greater than the predetermined threshold, the R value and the B value of the third pixel may both be greater than the predetermined threshold, the G value and the B value of the third pixel may both be greater than the predetermined threshold, or the R value, the B value, and the G value of the third pixel may be greater than the predetermined threshold.

Further, after all the third pixels that satisfy the predetermined condition are obtained, all the third pixels that are obtained may be denoted as a third pixel set. The third pixel set may include neighboring pixels and non-neighboring pixels. The pixels that are neighboring to each other may indicate that the positions of the pixels are neighboring to each other in the denoised image. The pixels that are not neighboring to each other may indicate that the positions of the pixels are neighboring to each other in the denoised image. The positions that are neighboring to each other may indicate that, in a coordinate of the denoised image, abscissas or ordinates of the two neighboring pixels may be the same. For example, the third pixel set may include a pixel (100, 101), a pixel (100, 100), a pixel (101, 101), and a pixel (200, 200). Thus, the pixel (100, 101) and the pixel (100, 100) may be neighboring pixels. The pixel (100, 101) and the pixel (101, 101) may be neighboring pixels. The pixel (100, 100), the pixel (101, 101), and the pixel (200, 200) may not be neighboring pixels.

Further, the highlight region may be a connected region formed by the neighboring pixels in the third pixel set. That is, a pixel value of each third pixel included in the highlight region may satisfy the predetermined condition. Therefore, in some embodiments, determining the highlight region of the denoised image according to all the third pixels satisfying the predetermined condition may include the following processes.

At L10, the connected region formed by all the third pixels that satisfy the predetermined condition is obtained. A target region that satisfies the predetermined rule is selected in all the obtained connected regions. The predetermined rule includes that pixels of the R value, the G value, and/or the B value that are greater than the predetermined threshold of the R value, the G value, and the B value of the third pixel in the target region belong to the same type.

At L20, areas corresponding to the target regions that are selected are calculated, and a target region with a maximum area is used as the highlight region.

In some embodiments, the connected region may be a closed region formed by all the neighboring third pixels in the third pixel set. Each pixel included in the connected region may be a third pixel. At least a third pixel B in the connected region may be neighboring to a third pixel A for each third pixel A in the connected region. Meanwhile, for each third pixel C besides the third pixels included in the connected region in the third pixel set, the third pixel C may not be neighboring to any third pixel A in the connected region. For example, the third pixel set may include a pixel (100, 101), a pixel (100, 100), a pixel (101, 100), a pixel (101, 101), a pixel (100, 102), and a pixel (200, 200). Then, the pixel (100, 101), the pixel (100, 100), the pixel (101, 100), the pixel (101, 101), and the pixel (100, 102) may form a connected region.

In addition, since the connected region of the denoised image may be formed by a light source, the light source may generate light with a same color. After all the connected regions of the denoised image are obtained, the connected regions may be selected according to region colors corresponding to the connected regions. Therefore, after the connected region of the denoised image is obtained, whether the pixels of the R value, the G value, and the value B that are greater than the predetermined threshold of the R value, the G value, and the B value of the third pixel in the connected region belong to the same type may be determined to determine whether the connected region satisfies the predetermined rule. The pixels belonging to the same type may indicate that for two third pixels, pixel A and pixel B, if the R value of pixel A is greater than the predetermined threshold, only the R value of pixel B may be greater than the predetermined threshold. If the R value and the G value of pixel A are greater than the predetermined threshold, only the R value and the G value of pixel B may be greater than the predetermined threshold. If the R value, the G value, and the B value of pixel A are greater than the predetermined threshold, the R value, the G value, and the B value of pixel B may be greater than the predetermined threshold. The pixels belonging to different types may indicate that, for two third pixels, pixel C and pixel D, if the V value (one of the R value, the G value, and the B value) of the pixel C is greater than the predetermined threshold, the V value of pixel D is less than or equal to the predetermined threshold value, or the V value of pixel D may be greater than the predetermined threshold and at least an M value (one of the two values of the R value, the G value, and the B value except the V value) may be greater than the predetermined threshold. For example, if the R value of pixel C is greater than the predetermined threshold, and the R value of pixel D may be less than or equal to the predetermined threshold, the types of pixel C and pixel D may be different. If the R value of pixel C is greater than the predetermined threshold, the R value of pixel D is greater than the predetermined threshold, and the G value of pixel D is greater than the predetermined threshold, the types of pixel C and pixel D may be different. In some embodiments, the predetermined rule may include that the pixels of the R value, the G value, and/or the B value that are greater than the predetermined threshold of the R value, the G value, and the B value of the third pixel in the connected regions belong to the same type.

Further, the denoised image may include a plurality of target regions. After the target regions are obtained, the highlight region may be obtained by selecting the target regions according to the areas of the target regions. An area of a target region may refer to an area of a region where the target region is located in the denoised image. The area may be calculated in the pixel coordinate system of the denoised image. After the areas of the target regions are obtained, the areas of the target regions may be compared with each other. The target region with the largest area may be selected. The target region may be used as the highlight region. As such, the target region with the largest area in the denoised image may be used as the highlight region. Thus, the region with the largest brightness area may be obtained in the denoised image. The exposure degree may be determined according to the region with the largest brightness area, which may improve the accuracy of the exposure degree.

Further, in some embodiments, determining the exposure degree of the denoised image according to the highlight region includes calculating a first area of the highlight region and a second area of the denoised image (J10) and determining the exposure degree corresponding to the denoised image according to a ratio of the first area and the second area (J20).

In some embodiments, the second area of the denoised image may be calculated according to the image size of the denoised image. For example, if the image size of the denoised image is 400×400, the image area of the denoised image may be 400×400=160000. The first area of the highlight region may be a region area of the highlight region in the pixel coordinate system of the denoised image. For example, the highlight region may be a square region with a side length of 20. Thus, the first area of the highlight region may be 20×20=400.

Further, in order to determine the exposure degree according to the ratio of the first area to the second area, a correspondence between a ratio interval and the exposure degree may be predetermined. After the ratio is obtained, a ratio interval at which the ratio is located may be obtained. Then, the exposure degree corresponding to the ratio interval may be determined according to the correspondence to obtain the exposure degree of the denoised image. For example, the correspondence between the ratio interval and the exposure degree may include that when the interval is [0, 1/100), the exposure degree may correspond to level 0, when the interval is [1/100, 1/50), the exposure degree may correspond to level −1, when the interval is [1/50, 1/20), the exposure degree may correspond to level −2, when the interval is [1/20, 1/50), the exposure degree may correspond to level −3, and when the interval is [1/20, 1], the exposure degree may correspond to level −4. Thus, when the ratio of the first area to the second area is 1/10, the ratio is located in the interval [1/20, 1]. Therefore, the exposure degree corresponding to the denoised image may be level −4.

At F102, the model parameter corresponding to the denoised image is determined according to the exposure degree, and the model parameter is used to update the model parameter of the first image processing model.

In some embodiments, the correspondence of the exposure degree and the model parameter may be established when the first image processing model is trained. Thus, after the exposure degree of the denoised image is obtained, the model parameter corresponding to the exposure degree may be determined according to the correspondence between the exposure degree and the model parameter. The exposure degree may refer to an exposure level. That is, the correspondence between the exposure degree and the model parameter may be a correspondence between the exposure level and the model parameter. In addition, each exposure level may correspond to a ratio interval. Thus, after the denoised image is obtained, a ratio of the region area of the highlight region and the image area in the denoised image may be obtained. The ratio interval where the ratio is located may be determined. The exposure level corresponding to the denoised image may be determined according to the ratio interval. Then, the model parameter corresponding to the denoised image may be determined according to the exposure level to obtain the model parameter corresponding to the denoised image. In addition, after the model parameter corresponding to the exposure degree is obtained, the obtained model parameter may be used to update the model parameter configured to the first image processing model to update the first image processing model, that is, the first image processing model corresponding to the obtained model parameter.

At F103, the denoised image is input into the updated first image processing model.

In some embodiments, the denoised image may be used as an input item of the updated first image processing model. The denoised image may be input to the updated first image processing model to process the denoised image. The model parameter of the first image processing model corresponding to the denoised image may be the model parameter determined according to the exposure degree of the denoised image. The model parameter may be the model parameter obtained by training the predetermined network model. Thus, the processing accuracy of the updated first image processing model on the denoised image may be ensured.

Figure 14:
FIG. 14 is a schematic diagram of a processed image corresponding to an image that is to be processed according to some embodiments of the present disclosure.

Further, in some embodiments, generating the output image corresponding to the denoised image according to the first image processing model may include inputting the denoised image as the input item of the first image processing model into the first image processing model, and removing the color deviation of the denoised image through the first image processing model to obtain the output image. The output image may be an image after the color deviation removal corresponding to the to-be-denoised image. For example, the denoised image as shown in FIG. 13 is processed by the first image processing model to obtain the output image as shown in FIG. 14.

Further, according to the training process of the first image processing model, the first image processing model may include a down-sampling module and a transformation module. Thus, when the first image processing model processes the denoised image, the denoised image may be processed through the down-sampling module and the transformation module in sequence. Correspondingly, performing, by the first image processing model, the color deviation removal processing on the denoised image to obtain the output image corresponding to the denoised image includes the following processes.

At F201, the denoised image is input into the down-sampling module, and a bilateral grid corresponding to the denoised image and a guidance image corresponding to the denoised image are obtained through the down-sampling module. The resolution of the guidance image is the same as the resolution of the denoised image.

At F202, the guidance image, the bilateral grid, and the denoised image are input into the transformation module, and the output image corresponding to the denoised image is obtained through the transformation module.

In some embodiments, an input item of the down-sampling module may include the denoised image, and an output item of the down-sampling module may include a bilateral grid corresponding to the denoised image and a guidance image. An input item of the transformation module may include the guidance image, the bilateral grid, and the denoised image, and an output item of the transformation module may include the output image. The structure of the down-sampling module may be the same as the structure of the down-sampling module in the first predetermined network model. For the structure of the down-sampling module, references may be made to the description of the structure of the down-sampling module in the first predetermined network model. The processing performed by the down-sampling module of the first image processing model on the denoised image may be the same as the processing performed by the down-sampling module in the first predetermined network model on the first image. Thus, for a specific execution process of process F201, references may be made to process Q11. Similarly, the structure of the transformation module may be the same as the structure of the transformation module in the first predetermined network model. For the structure of the transformation module, references may be made to the description of the structure of the transformation module in the first predetermined network model. The processing performed by the transformation module of the first image processing model on the denoised image may be the same as the processing performed by the transformation module in the first predetermined network model on the first image. Thus, for a specific execution process of process F202, references may be made to process Q12.

Further, in some embodiments, the down-sampling module may include a down-sampling unit and a convolution unit. Correspondingly, inputting the denoised image into the down-sampling module, and obtaining the bilateral grid corresponding to the denoised image and the guidance image corresponding to the denoised image through the down-sampling module includes inputting the denoised image into the down-sampling unit and the convolution unit (F2011), and obtaining the bilateral grid corresponding to the denoised image by the down-sampling unit and obtaining the guidance image corresponding to the denoised image by the convolution unit (F2012).

In some embodiments, an input item of the down-sampling unit may include the denoised image, an output item of the down-sampling unit may include the bilateral grid. An input item of the convolution unit may include the denoised image, and an output item of the convolution unit may include the guidance image. The structure of the down-sampling unit may be the same as the structure of the down-sampling unit in the first predetermined network model. For the structure of the down-sampling unit, references may be made to the description of the structure of the down-sampling unit in the first predetermined network model. The processing performed by the down-sampling unit of the first image processing model on the denoised image may be the same as the processing performed by the down-sampling unit in the first predetermined network model on the first image. Thus, for a specific execution process of process F2011, references may be made to process Q111. Similarly, the structure of the convolution unit may be the same as the structure of the convolution unit in the first predetermined network model. For the structure of the convolution unit, references may be made to the description of the structure of the convolution unit in the first predetermined network model. The processing performed by the convolution unit of the first image processing model on the denoised image may be the same as the processing performed by the convolution unit in the first predetermined network model on the first image. Thus, for a specific execution process of process F2012, references may be made to process Q112.

Further, in some embodiments, the transformation module may include a segmentation unit and a transformation unit. Correspondingly, inputting the guidance image, the bilateral grid, and the to-be-processed image into the transformation module, and generating the processed image corresponding to the denoised image by the transformation module includes the following processes.

At A2021, the guidance image is input into the segmentation unit, and the bilateral grid is segmented by the segmentation unit to obtain a color transformation matrix of the pixels in the to-be-processed image.

At A2022, the denoised image and the color transformation matrix of the pixels in the to-be-processed image are input into the transformation unit, and the output image corresponding to the denoised image is generated by the transformation unit.

In some embodiments, an input item of the segmentation unit may include the guidance image and the bilateral grid. An output item of the segmentation unit may include the color transformation matrix of the pixels in the to-be-processed image. An input item of the transformation unit may include the color transformation matrix of the pixels in the denoised image and the denoised image. An output item of the transformation unit may include the output image. The structure of the segmentation unit may be the same as the structure of the segmentation unit in the first predetermined network model. For the structure of the segmentation unit, references may be made to the description of the structure of the segmentation unit in the first predetermined network model. The processing performed by the segmentation unit of the first image processing model on the bilateral grid and the guidance image corresponding to the to-be-processed image may be the same as the processing performed by the down-sampling unit of the first predetermined network model on the bilateral grid and the guidance image corresponding to the first image. Thus, for a specific execution process of process F2021, references may be made to process Q121. Similarly, the structure of the transformation unit may be the same as the structure of the transformation unit in the first predetermined network model. For the structure of the transformation unit, references may be made to the description of the structure of the transformation unit in the first predetermined network model. The processing performed by the transformation unit of the first image processing model on the color transformation matrix of the pixels in the to-be-processed image may be the same as the processing performed by the transformation unit in the first predetermined network model on the color transformation matrix of the pixels in the first image. Thus, for a specific execution process of process F2022, references may be made to process Q122.

A network structure corresponding to the first image processing model during the training process may be the same as a network structure corresponding to an application process (performing color deviation removal processing). For example, during the training process, the first image processing model may include a down-sampling module and a transformation module. Correspondingly, when the color deviation removal processing is performed on the to-be-processed image through the first image processing model, the first image processing model may also include a down-sampling module and a transformation module.

For example, during the training process, the down-sampling module of the first image processing model may include a down-sampling unit and a convolution unit. The transformation module may include a segmentation unit and a transformation unit. Correspondingly, when the color deviation removal processing is performed by the image processing model on the denoised image, the down-sampling module may also include a down-sampling unit and a convolution unit, and the transformation module may include a segmentation unit and a transformation unit. In an application process, an operation principle of each layer may be the same as an operation principle of each layer in the training process. Therefore, for an input/output situation of each layer of neural network in the application process of the first image processing model, references may be made to the related description in the training process of the first image processing model, which is not repeated here.

Compared with the existing technology, the present disclosure provides an image processing method, a storage medium, and a terminal. The image processing method may include obtaining a to-be-processed image set, generating a denoised image corresponding to the to-be-processed image set according to the to-be-processed image set, inputting the denoised image into a trained first image processing model, and generating an output image corresponding to the denoised image by the first image processing model. In the present disclosure, a plurality of images may be obtained first. A denoised image may be generated according to the plurality of images. The trained first image processing model may be obtained through deep learning based on the training image set to adjust the image color of the denoised image. Thus, the color quality and the noise quality of the output image may be improved to improve the image quality.

At H40, the processed image is input into a trained second image processing model, and ghost effect removal is performed on the processed image by the second image processing model to obtain the output image.

In some embodiments, the second image processing model may be trained in advance by the imaging apparatus (e.g., a mobile phone configured with an under-screen camera) that is configured to process the to-be-processed image set, or may be a file corresponding to the second image processing model after another training that is transferred to the imaging apparatus. In addition, the imaging apparatus may use the second image processing model as a ghost effect removal functional circuit. When the imaging apparatus obtains the processed image, the ghost effect removal functional circuit is started to input the to-be-processed image to the second image processing model.

Figure 32:
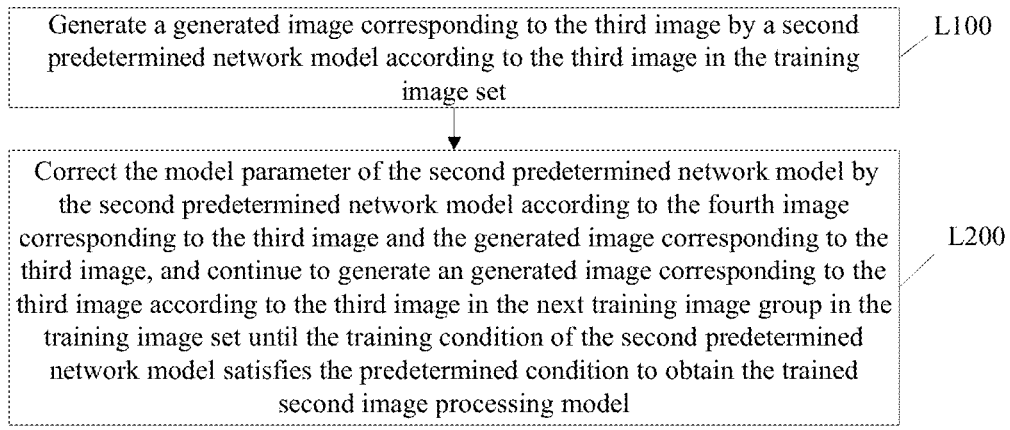
FIG. 32 is a schematic flowchart of a training process of a second image processing model of an image processing method according to some embodiments of the present disclosure.

Further, in some embodiments, as shown in FIG. 32, a training process of the second image processing model includes generating a generated image corresponding to the third image by a second predetermined network model according to the third image in the training image set (L100).

In some embodiments, the second predetermined network model may adopt a deep learning network model. The training image set may include a plurality of training image groups with different image contents. Each training image group may include a third image and a fourth image. The third image may correspond to the fourth image. The third image and the fourth image may represent a same image scene. The fourth image may be a normally displayed image (i.e., an original image). The image content of the third image may correspond to the image content of the fourth image. However, an object in the image content of the third image may have a ghost effect or a blurring effect similar to the ghost effect. The ghost effect may refer to a virtual image formed around the object in the image. For example, the ghost effect may include a situation where one or more contours or virtual images exist at an edge of the object in the image. For example, when the object in the image has a double image (i.e., a contour or a virtual image appears at the edge of the object), a column of images with a smaller pixel value may be understood as a real image of the object, and another column of images with a larger pixel value may be understood as a contour or a virtual image of the object.

Further, the third image and the fourth image may correspond to the same image scene. The third image and the fourth image corresponding to the same image scene may indicate that a similarity degree between the image content of the third image and the image content of the fourth image may reach a predetermined threshold. The image size of the third image may be the same as the image size of the fourth image. Thus, when the third image and the fourth image coincide, a coverage rate of the object of the third image on the object of the second image that corresponds to the object of the first image may reach a predetermined condition. The predetermined threshold may be 99%. The predetermined condition may be 99.5%.

In addition, in some embodiments, in order to reduce the impact of an image difference between the third image and the fourth image on the training of the predetermined network model, the image content of the third image and the image content of the fourth image may be completely the same. For example, the third image may be an image having a ghost effect with an image size of 600×800. The image content of the third image may be square. Positions of four vertices of the square in the third image may be (200, 300), (200, 400), (300, 400), and (300, 300). Then, the image size of the fourth image may be 600×800. The image content of the fourth image may be square. Positions of four vertexes of the square in the fourth image may be (200, 300), (200, 400), (300, 400), and (300, 300). When the third image is placed on the fourth image and coincides with the fourth image, the third image may cover the fourth image, and the square in the third image may overlap with the square of the fourth image.

Further, the fourth image may be an image that is normally captured. For example, the fourth image may be an image captured by the under-screen camera after the display panel in the under-screen imaging system is removed, or an image captured by the under-screen camera by using a display panel, which is experimentally prepared without a light-shielding structure such a data line and a scan line for replacing the actual display panel, as the display panel of the under-screen imaging system, an image obtained by a network (e.g., Baidu), or an image sent by another external device (e.g., a smartphone). The third image may be captured by the under-screen imaging system (for example, an under-screen camera), or may be obtained by processing the second image. Processing the fourth image may refer to forming a ghost effect on the fourth image. In some embodiments, the image size and the image content of the fourth image may remain unchanged during the processing.

In some embodiments, the third image may be captured by the under-screen imaging system. Photographing parameters of the third image and the fourth image may be the same. A photographing scene corresponding to the third image may be the same as a photographing scene of the fourth image. For example, the third image is an image as shown in FIG. 25, and the image content is blurred due to the impact of the light-shielding structure in the display panel. The fourth image is a normal display image as shown in FIG. 26. Further, in some embodiments, the photographing parameter may include an exposure parameter of the imaging system. The exposure parameter may include an aperture, a door opening speed, a sensitivity, a focus, a white balance, etc. In some embodiments, the photographing parameter may further include ambient light, a photographing angle, and a photographing range.

Further, the third image may be an image captured by the under-screen imaging system. Since the third image and the fourth image are captured by two different imaging systems, when the imaging system is switched, a photographing position or a photographing angle may be changed. Thus, the third image and the fourth image may not be aligned in space. Thus, before generating the generated image corresponding to the third image by the second predetermined network model according to the third image in the training image set, the method further includes, for each training image group in the training image set, performing aligning processing on the first image in the training image group and the second image corresponding to the first image to obtain the aligned image aligned with the second image, and use the aligned image as a first image (M10).

In some embodiments, processing for each training image group in the training image set may refer to performing the alignment processing on each training image group in the training image set. The alignment processing may include performing the alignment processing on each training image group after the training image set is obtained to obtain an aligned training image group. After all the training image groups are aligned, the third image of each training image group may be input to the second predetermined network model. In some other embodiments, before the third image in each training image group is input into the second predetermined network model, the alignment processing may be performed on the training image group to obtain an aligned training image group corresponding to the training image group. Then, the third image in the aligned training image group may be input into the second predetermined network model. In embodiments of the present disclosure, after the training image set is obtained, the alignment processing may be performed on each training image group. After the alignment processing is performed on all the training image groups, the third image in the training image set may be input into the second predetermined network model. In addition, a process of performing the alignment processing on the third image and the fourth image corresponding to the third image may be the same as the process of performing the alignment processing on the reference mage and the benchmark image. The third image may be used as the reference image, and the fourth image may be used as the benchmark image. Thus, For the process of performing the alignment processing on the third image and the fourth image, references may be made to the description of performing the alignment processing on the reference image and the benchmark image, which is not repeated here.

Further, in some embodiments, as shown in FIG. 22, the second predetermined network model includes an encoder and a decoder. Generating the generated image corresponding to the third image by the second predetermined network model according to the third image in the training image set includes the following processes.

At L101, the third image in the training image set is input into the encoder, and a feature image of the third image is obtained by the encoder. The image size of the feature image is less than the image size of the third image.

At L102, the feature image is input into the decoder, and the generated image is output by the decoder. The image size of the generated image is equal to the image size of the third image.

In some embodiments, the second predetermined network model may have a decoding-encoding structure. The decoding-encoding structure may be a convolutional neural network (CNN) structure. The encoder 1000 may be configured to convert an input image into a feature image having an image space size smaller than the input image and more channels than the input image. The decoder 2000 may be configured to convert the feature image into the generated image having the same image size as the input image. In some embodiments, the encoder may include a first redundant learning layer 101 and a down-sampling layer 102. The third image in the training image group may be input to the first redundant learning layer 101. The first feature image having the same image size as the third image may be output by the first redundant learning layer 101. The first feature image may be input to the down-sampling layer 102 as an input item of the down-sampling layer 102. The first feature image may be downsampled by the down-sampling layer 102 to output a second feature image corresponding to the third image (the second feature image being a feature image of the third image generated by the encoder). The image size of the second feature image may be smaller than the image size of the third image. The decoder 200 includes an up-sampling layer 201 and a second redundant learning layer 202 that are sequentially arranged. The feature image output by the encoder 100 may be input to the up-sampling layer 201. A third feature image may be output after the feature image is upsampled by the up-sampling layer 201. The third feature image may be input to the second redundant learning layer 202. The generated image may be output by the second redundant learning layer 202. The image size of the generated image may be the same as the image size of the third image. In some embodiments, by using an encoder-decoder structure, multi-scale training may be performed on the second predetermined network model. Thus, the ghost removal effect of the trained second image processing model may be improved.

Further, as shown in FIG. 22, the first redundant learning layer 101 includes a first convolutional layer 11 and a first redundant learning circuit 12. The down-sampling layer 102 includes a first encoding redundant learning circuit 110 and a second encoding redundant learning circuit 120. The first encoding redundant learning circuit 110 includes a first down-sampling convolutional layer 13 and a second redundant learning circuit 14. The second encoding redundant learning circuit 120 includes a second down-sampling convolutional layer 15 and a third redundant learning circuit 16. An input item of the first convolutional layer 11 may include a third image. The third image may be sampled to obtain a first feature image. The first feature image may be input to the first redundant learning circuit 12 for feature extraction. The first feature image of the first redundant learning circuit 12 may be downsampled sequentially by the first down-sampling convolutional layer, the second redundant learning circuit 14, the second down-sampling convolutional layer 15, and the third redundant learning circuit 16 to obtain the second feature image. The first convolutional layer 11 may perform sampling on the third image. The first down-sampling convolutional layer 13 and the second down-sampling convolutional layer 15 may be both configured to perform down-sampling on the feature images inputted thereto. The first redundant learning circuit 12, the second redundant learning circuit 14, and the third redundant learning circuit 16 may be configured to extract image features. In addition, in some embodiments, the first down-sampling convolutional layer 13 and the second down-sampling convolutional layer 15 may both be a convolutional layer with a step size of 2. The first redundant learning circuit 12, the second redundant learning circuit 14, and the third redundant learning circuit 16 may each include three redundant learning blocks arranged in sequence. The three redundant learning blocks may be configured to sequentially extract image features of the input image.

For example, assume that the third image may be an image of 256×256. The third image may be input into the first redundant learning layer 101 through the input layer. The first feature image of 256×256 may be output after passing through the first redundant learning layer 101. The first feature image may be input to the first down-sampling convolution layer 13 of the first encoding redundant learning circuit 110. A fourth feature image with the image size of 128×128 may be output through the first down-sampling convolutional layer 13. Feature extraction may be performed on the fourth feature image by the first redundant learning circuit 12 of the first encoding redundant learning circuit 110. The fourth feature image passing through the first redundant learning circuit 12 may be input to the second down-sampling convolutional layer 15 of the second coding redundancy learning circuit 120. The second feature image having the image size of 64×64 may be output through the second down-sampling convolutional layer 15. The feature extraction may be performed on the second feature image by the second redundant learning circuit 16 of the second encoding redundant learning circuit 120.

Further, as shown in FIG. 19, the up-sampling layer 201 includes a first decoding redundant learning circuit 210 and a second decoding redundant learning circuit 220. The first decoding redundant learning circuit 210 includes a fourth redundant learning circuit 21 and a first up-sampling convolution layer 22. The second decoding redundant learning circuit 220 includes a fifth redundant learning circuit 23 and a second up-sampling convolutional layer 24. The second redundant learning layer 202 includes a sixth redundant learning circuit 25 and a second convolutional layer 26. An input item of the first up-sampling convolutional layer 22 may be the first feature image. The first feature image may be sequentially upsampled by the fourth redundant learning circuit 21, the first up-sampling convolutional layer 22, the fifth redundant learning circuit 23, and the second up-sampling convolutional layer 24 to obtain a third feature image. The third feature image may be input to the sixth redundant learning circuit 25. The third feature image after the feature extraction is performed by the sixth redundant learning circuit 25 may be input to the second convolutional layer 26 to obtain the generated image by the second convolutional layer 26. The first up-sampling convolutional layer 22 and the second up-sampling convolutional layer 24 may be configured to perform up-sampling on a feature image inputted thereto. The fourth redundant learning circuit 21, the fifth redundant learning circuit 23, and the sixth redundant learning circuit 25 may be configured to extract image features. The second convolutional layer 26 may be configured to perform sampling on a feature image input into the second convolutional layer 26. In some embodiments, the first up-sampling convolutional layer 22 and the second up-sampling convolutional layer 24 may both be a deconvolution layer with a step of 2. The fourth redundant learning circuit 21, the fifth redundant learning circuit 23, and the sixth redundant learning circuit 25 each may include three redundant learning blocks. The three redundant learning blocks may be configured to sequentially extract image features of the input image. In addition, a third redundant learning block of the redundant learning circuit in the first redundant learning layer 101 may be in a skip connection with a first redundant learning block of the redundant learning circuit in the second redundant learning layer 202. A third redundant learning block of the redundant learning circuit in the first encoding redundant learning circuit 110 may be in a skip connected with the first redundant learning block of the redundant learning circuit in the second decoding redundancy learning circuit 220.

For example, assume that the second feature image of 64×64 may be obtained by passing the third image of 256×256 through the encoder 1000. The second feature image of 64×64 may be input to the fourth redundant learning circuit 21 of the first decoding redundant learning circuit 210 for feature extraction. The second feature image of 64×64 after the feature extraction may be input to the first up-sampling convolution layer 22 of the first decoding redundancy learning circuit 210. A fifth feature image with an image size of 128×128 may be outputted by the first up-sampling convolution layer 22. The feature extraction may be performed on the fifth feature image by the fifth redundant learning circuit 23 of the second decoding redundant learning circuit 220. The fifth feature image after the fifth redundant learning circuit 23 may be input to the second up-sampling convolution layer 24 of the second decoding redundant learning circuit 220. The image output by the second up-sampling convolution layer 24 may be a third feature image with an image size of 256×256. The third feature image may be input to the second redundant learning layer 202. Then, a generated image of 256×256 may be output after passing through the second redundant learning layer 202.

Further, the first convolutional layer, the second convolutional layer, the first up-sampling convolutional layer, the second up-sampling convolutional layer, the first down-sampling convolutional layer, the second down-sampling convolutional layer, and the convolutional layers of all the redundant learning circuits included in the encoder and the decoder may use a linear rectification function as an activation function. All convolution kernels may be 5×5. Thus, a gradient transmission efficiency of the layers may be improved. A gradient amplitude change may be small after a plurality of inverted transmissions, which improves the accuracy of the trained generator and improve the receptive field of the network.

At L200, the second predetermined network model is configured to correct the model parameter of the second predetermined network model according to the fourth image corresponding to the third image and the generated image corresponding to the third image, and continue to generate an generated image corresponding to the third image according to the third image in the next training image group in the training image set until the training condition of the second predetermined network model satisfies the predetermined condition to obtain the trained second image processing model.

In some embodiments, correcting the second predetermined network model may include correcting the model parameter of the second predetermined network model until the model parameter satisfies the predetermined condition. The predetermined condition may include that a loss function value satisfies the predetermined requirement, or a quantity of times of training reaches a predetermined quantity. The predetermined requirement may be determined according to the precision of the second image processing model, which is not described in detail here. The predetermined quantity of times may be the maximum number of times of training of the second predetermined network model, for example, 4000 times, etc. Thus, the predetermined network model may output the generated image. The loss function value of the second predetermined network model may be calculated according to the generated image and the second image. After the loss function value is calculated, whether the loss function value satisfies the preset requirement may be determined. If the loss function value meets the predetermined requirement, the training may be ended. If the loss function value does not meet the predetermined requirement, whether the quantity of training times of the second predetermined network model reaches the predetermined quantity of times may be determined. If the quantity of training times does not meet the predetermined quantity of times, the network parameter of the second predetermined network model may be corrected according to the loss function value. If the quantity of training times reaches the predetermined quantity of times, the training may be ended. Thus, whether the training of the second predetermined network model ends may be determined by the loss function value and the quantity of training times. Thus, the training of the second predetermined network model may be avoided from entering the infinite loop due to the fact that the loss function value cannot reach the predetermined requirement.

Further, since the network parameter of the second predetermined network model is modified when the training condition of the second predetermined network model does not satisfy the predetermined condition (for example, the loss function value does not meet the predetermined requirement and the quantity of training times does not reach the predetermined quantity of times), the network model may need to be continuously trained after the network parameter of the second predetermined network model is corrected according to the loss function value. That is, the third image in the training image set may be continuously input into the second predetermined network model. The third image in the training image set that is continuously input to the second predetermined network model may be a third image that is not input to the predetermined network mode as the input item. For example, all the third images in the training image set have unique image identifiers (e.g., image numbers). An image identifier of the third image that is input to the second predetermined network model in the first training may be different from an image identifier of the third image that is input second predetermined network model in the second training. For example, the image identifier of the third image that is input to the second predetermined network model in the first training may be 1. The image identifier of the third image that is input second predetermined network model in the second training may be 2. An image number of the third image that is input second predetermined network model in the N-th training may be N. In some embodiments, since the quantity of the third images in the training image set is limited, in order to improve the training effect of the second image processing model, the third images of the training image set may be sequentially input to the second predetermined network model to train the second predetermined network model. After all the third images in the training image set are input to the second predetermined network model, the third images of the training image set may be continuously input to the second predetermined network model. Thus, the training image groups of the training image set may be input into the second predetermined network model in a loop. In a process of inputting the third image into the second predetermined network model, the third images may be sequentially input to the second predetermined network model according to the image identifiers of the third images, or the third images may be input to the second predetermined network model without according to the image identifiers. The same third image may be repeatedly used to train the second predetermined network model, or the same third image may not be repeatedly used to train the second predetermined network model. In some embodiments, an implementation of continuously inputting the third image of the training image set into the second predetermined network model may not be limited.

Figure 33:
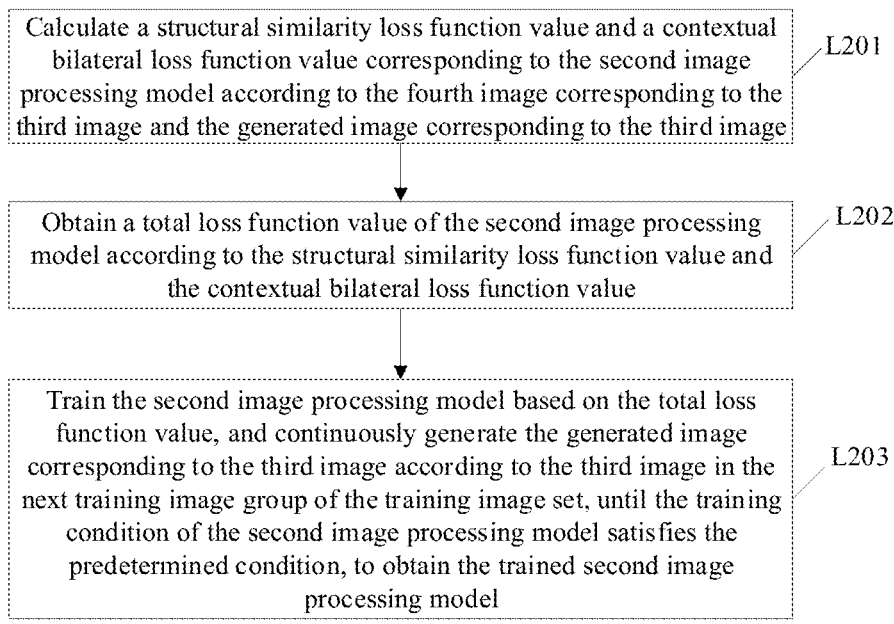
FIG. 33 is a schematic flowchart of step L200 of an image processing method according to some embodiments of the present disclosure.

Further, in some embodiments, the loss function value may be calculated through a structural similarity loss function and a contextual bilateral loss function. Correspondingly, as shown in FIG. 33, the second image processing model is configured to correct the model parameter of the second image processing model according to the fourth image corresponding to the third image and the generated image corresponding to the third image, and continue to generate the generated image corresponding to the third image according to the third image in the next training image group of the training image set until the training condition of the second image processing model satisfies the predetermined condition to obtain the trained image processing model. The method includes the following processes.

At L201, a structural similarity loss function value and a contextual bilateral loss function value corresponding to the second image processing model are calculated according to the fourth image corresponding to the third image and the generated image corresponding to the third image.

At L202, a total loss function value of the second image processing model is obtained according to the structural similarity loss function value and the contextual bilateral loss function value.

At L203, the second image processing model is trained based on the total loss function value, and the generated image corresponding to the third image is continuously generated according to the third image in the next training image group of the training image set, until the training condition of the second image processing model satisfies the predetermined condition, to obtain the trained second image processing model.

In some embodiments, the second image processing model may use a combination of a structural similarity index (SSIM) loss function and a contextual bilateral loss (CoBi) loss function for extracting the feature based on a visual data geometry index (VGG Network) as the loss function. Then, when the loss function value of the second image processing model is calculated, the structural similarity loss function value and the contextual bilateral loss function value may be calculated, respectively, and then the loss function value of the second image processing model may be calculated according to the structural similarity loss function value and the contextual bilateral loss function value. In some embodiments, the total loss function value of the second image processing model=a×structural similarity loss function value+b×contextual bilateral loss function value, and a and b may be weight coefficients. For example, the weight coefficient a and the weight coefficient b may be 1. The total loss function value of the second image processing model=the structural similarity loss function value+the contextual bilateral loss function value. In addition, in some embodiments, when the second image processing model is trained by using the total loss function value, the second image processing model may be trained by using a stochastic gradient descent method. A trained initial network parameter may be set to 0.0001. The network parameter may be modified in an exponential decay manner during a correction.

Further, the structural similarity loss function value may be used to measure the similarity between the generated image and the fourth image. The greater the structural similarity loss function value is, the higher the similarity between the generated image and the fourth image is. On the contrary, the smaller the structural similarity loss function value is, the lower the similarity between the generated image and the fourth image is. Therefore, the structural similarity loss function value may be sensitive to the local structure change and may be closer to a human eye perception system. Thus, the accuracy of the second image processing model may be improved. In some embodiments, an equation of the structural similarity loss function corresponding to the structural similarity loss function value is $$SSIM(x, y) = \frac{(2\mu_x\mu_y + C_1)(2\sigma_{xy} + C_2)}{(\mu_x^2 + \mu_y^2 + C_1)(\sigma_x^2 + \sigma_y^2 + C_2)}$$

where $\mu_x$ denotes an average value of the pixel values of all pixels in the generated image, $\mu_y$ denotes an average value of the pixel values of all pixels in the fourth image, $\sigma_x$ denotes a variance of the pixel values of all pixels in the generated image, $\sigma_y$ denotes a variance of the pixel values of all the pixels in the fourth image, and $\sigma_{xy}$ denotes the covariance of the generated image and the fourth image.

Further, the contextual bilateral loss function value may be calculated through the CoBi loss function based on the VGG feature. A plurality of groups of VGG features may be extracted from the generated image and the fourth image by the CoBi loss function based on the VGG feature. For each first VGG feature of the generated image, a second VGG feature close to the first VGG feature may be searched in the second VGG features of the fourth image. Then, a distance between each first VGG feature and the second VGG feature matching the first VGG feature may be calculated to obtain the contextual bilateral loss function value. Thus, the bilateral distance may be searched through the contextual bilateral loss function, and the loss of the first VGG feature and the second VGG feature matched with the first VGG feature may be considered in space to obtain the contextual bilateral loss function value. Therefore, the impact that the third image is not completely aligned with the fourth image may be avoided. A speed and accuracy of the training of the second image processing model may be improved. In addition, when the second VGG feature matching with the first VGG feature is searched, the contextual bilateral loss function value may be determined according to the distance and the positional relationship between the first VGG feature and the second VGG feature, which may improve matching accuracy and further reduce the impact of misalignment of the third image and the fourth image on the training of the second image processing model. In some embodiments, the equation of the contextual bilateral loss function is $$CoBi_{VGG}(x, y) = \frac{1}{N}\sum_{i}^{N} \min_{j=1,...,M}\left(D_{x_i,y_j} + \omega_s D'_{x_i,y_j}\right)$$

where D denotes a cosine distance between the VVG feature of the generated image and the VVG feature of the fourth image, D' denotes a spatial position distance between the VVG feature of the generated image and the VVG feature of the fourth image, N denotes a feature quantity of the VVG features of the generated images. $\omega_s$ denotes a weight coefficient.

At N200, ghost effect removal is performed on the processed image by the second image processing model, the image after the ghost effect removal is used as the processed image.

In some embodiments, performing the ghost effect removal on the to-be-processed image by the second image processing model may include inputting the to-be-processed image as an input item of the second image processing model into the second image processing model, and removing the ghost effect of the to-be-processed image through the second image processing model to obtain the processed image. The processed image may be an image obtained by performing ghost effect removal processing on the to-be-processed image. The to-be-processed image may be an image with the ghost effect corresponding to the output image. That is, the output image corresponds to the to-be-processed image. The to-be-processed image and the output image may represent a same image scene. The output image may be a normally displayed image. The image content of the to-be-processed image may correspond to the output image, but an object in the image content of the to-be-processed image may have a ghost effect or a blurring effect similar to the ghost effect. For example, as shown in FIG. 25, the ghost effect removal is performed on the to-be-processed image to obtain the output image as shown in FIG. 26.

Further, according to the training process of the second image processing model, the second image processing model may include an encoder and a decoder. Thus, when the to-be-processed image is processed by the second image processing model, the to-be-processed image may need to be processed by the encoder and the decoder. Correspondingly, performing the ghost effect removal on the to-be-processed image by using the second image processing model to obtain the processed image corresponding to the to-be-processed image includes the following processes.

At N201, the to-be-processed image is input into the encoder. A feature image of the to-be-processed image is obtained by the encoder. The image size of the feature image is less than the image size of the to-be-processed image.

At N202, the feature image is input into the decoder. The processed image corresponding to the to-be-processed image is output by the decoder. The image size of the processed image is equal to the image size of the to-be-processed image.

In some embodiments, the encoder may be configured to convert the input to-be-processed image into the feature image having the image space size smaller than the input image and more channel numbers than the input image, and input the feature image to the decoder. The decoder may be configured to convert the input feature image into the generated image having the same image size as the to-be-processed image. The structure of the encoder may be the same as the structure of the encoder in the predetermined network model. For the structure of the encoder, references may be made to the description of the structure of the encoder in the predetermined network model. The processing performed by the encoder of the second image processing model on the to-be-processed image may be the same as the processing performed by the encoder in the predetermined network model on the third image. For an execution process of process N201, references may be made to process L101. Similarly, the structure of the decoder may be the same as the structure of the decoder in the predetermined network model. For the structure of the decoder, references may be made to the description of the structure of the decoder in the predetermined network model. The processing performed by the decoder of the second image processing model on the feature image corresponding to the to-be-processed image may be the same as the processing performed by the decoder in the predetermined network model on the feature image corresponding to the third image. Thus, for the execution process of process N202, references may be made to process L102.

The network structure corresponding to the second image processing model in the training process may be the same as the network structure in the application process (removing the ghost effect of the processed image). For example, in the training process, the second image processing model may include the encoder and the encoder. Correspondingly, when the ghost effect of the processed image is removed by the second image processing model, the second image processing model may also include the encoder and the encoder.

Further, for example, in the training process, the encoder of the second image processing model may include a first redundant learning layer and a down-sampling layer. The decoder may include an up-sampling layer and a second redundant learning layer. Correspondingly, when the ghost effect of the processed image is removed by the second image processing model, the encoder may also include the first redundant learning layer and the down-sampling layer, and the decoder may include the up-sampling layer and the second redundant learning layer. In the application process, an operation principle of each layer may be the same as an operation principle of each layer in the training process. Therefore, for an input/output situation of each layer of a neural network of the second image processing model in the application process, references may be made to related descriptions of the second image processing model in the training process, which is not repeated here again.

Further, in order to further improve the image quality of the output image, after the output image output by the second image processing model is obtained, post-processing may be performed on the output image. The post-processing may include sharpening processing and noise reduction processing. Correspondingly, after performing the ghost effect removal processing on the processed image by using the second image processing model to obtain the output image, the method further includes performing sharpening processing and noise reduction processing on the processed image and using the output image after the sharpening processing and the noise reduction processing as the output image corresponding to the to-be-processed image.

In some embodiments, the sharpening processing may refer to compensating the contour of the output image, enhancing the edge of the output image and the portion with the gray jump to improve the image quality of the processed image. The sharpening processing may include an existing sharpening processing method, for example, a high-pass filtering method. The noise reduction processing may refer to removing the noise in the image and improving a signal-to-noise ratio of the image. The noise reduction processing may include an existing noise reduction algorithm or a trained noise reduction network model. For example, the noise reduction processing may adopt a Gaussian low-pass filtering method.

Figure 38:
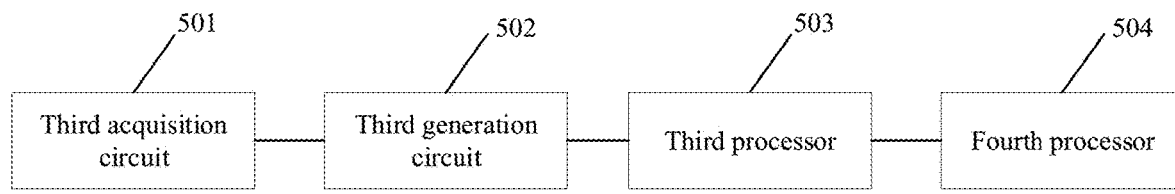
FIG. 38 is a schematic structural diagram of an image processing device according to some embodiments of the present disclosure.

Based on the image processing method, as shown in FIG. 38, embodiments of the present disclosure provide an image processing device. The image processing device includes a third acquisition circuit 501, a third generation circuit 502, a third processor 503, and a fourth processor 504.

The third acquisition circuit 501 may be configured to obtain the to-be-processed image set. The to-be-processed image set may include a plurality of images.

The second generation circuit 502 may be configured to generate the denoised image corresponding to the to-be-processed image set according to the to-be-processed image set.

The third processor 503 may be configured to input the denoised image to the trained first image processing model and perform color deviation removal processing on the denoised image through the first image processing model to obtain the processed image corresponding to the denoised image.

The fourth processor 504 may be configured to input the processed image to the second image processing model and perform ghost effect removal processing on the processed image through the second image processing model to obtain the output image.

In some embodiments, one of the plurality of images included in the to-be-processed image set may be used as the base image. The rest of the plurality of images may be the neighboring images of the base image. The third generation circuit 502 may be configured to divide the base image into a plurality of base image blocks, determine neighboring image blocks in the neighboring images corresponding to the base image blocks, determine a weight parameter set corresponding to the base image blocks, and determined the denoised image according to the to-be-processed image set and the weight parameter set corresponding to the base image blocks. The weight parameter set corresponding to the base image blocks may include a first weight parameter and the second weight parameter. The first weight parameter may be a weight parameter of the base image blocks. The second weight parameter may be a weight parameter of the neighboring image blocks corresponding to the base image blocks in the neighboring images.

In some embodiments, a quantity of images of the to-be-processed image set may be determined according to the photographing parameter corresponding to the to-be-processed image set.

In some embodiments, the definition of the base image may be greater than or equal to the definition of the neighboring images.

In some embodiments, the third generation circuit may be configured to, for each base image block, determine the second weight parameter of the neighboring image blocks corresponding to the base image block and obtain the first weight parameter corresponding to the base image block to obtain the weight parameter set corresponding to the base image block.

In some embodiments, the third generation circuit may be configured to, for each neighboring image block, calculate the similarity degree of the base image block and the neighboring image block, and calculate the second weight parameter of the neighboring image block according to the similarity degree.

In some embodiments, the third generation circuit may be configured to, when the similarity degree is smaller than or equal to the first threshold, use a first predetermined parameter as the second weight parameter of the neighboring image block, when the similarity degree is greater than the first threshold and smaller than or equal to the second threshold, calculate the second weight parameter of the neighboring image block according to the similarity degree, the first threshold, and the second threshold, and when the similarity degree is greater than the second threshold, use a second predetermined parameter as the second parameter of the neighboring image block.

In some embodiments, the first threshold and the second threshold may be determined according to the similarity degree of the base image block and the neighboring image block.

In some embodiments, the image processing device further includes a spatial domain noise reduction circuit. The spatial domain noise reduction circuit may be configured to perform spatial domain noise reduction on the denoised image, and use the image obtained after the spatial domain noise reduction as the denoised image.

In some embodiments, the first image processing model may be trained based on the first training image set. The first training image set may include a plurality of training image groups. Each training image group may include a first image and a second image. The first image is a color deviation image corresponding to the second image.

In some embodiments, the first image may be an image captured by an under-screen imaging system.

In some embodiments, the image processing device further includes a third alignment circuit. The third alignment circuit may be configured to, for each training image group in the first training sample set, perform alignment processing on the first image and the second image corresponding to the first image in the training image group to obtain an aligned image aligned with the second image, and use the aligned image as a first image.

In some embodiments, the first training image set may include a plurality of training image sub-sets. Each training image sub-set may include a plurality of training sample image groups. If the exposure degrees of the first images in any two training sample image groups of the plurality of training sample image groups are the same, the exposure degrees of the second images in each training sample image group of the plurality of training sample image groups may be within a predetermined range. The exposure degrees of the first images in any two training image sub-sets may be different.

In some embodiments, the first image processing model may correspond to a plurality of model parameters. Each model parameter may be obtained by training according to one training image sub-set in the first training image set. The training image sub-sets corresponding to any two model parameters, respectively, may be different from each other.

In some embodiments, the third processor may be configured to extract an exposure degree of the denoised image, determine a model parameter corresponding to the denoised image according to the exposure degree, update the model parameter of the first image processing model by using the model parameter, and input the denoised image into an updated first image processing model.

In some embodiments, the third processor may be configured to determine a third pixel satisfying the predetermined condition according to the R value, the G value, and the B value of each pixel in the denoised image. The predetermined condition may include that at least one of the R value, the G value, or the B value may be greater than the predetermined threshold. A highlight region of the denoised image may be determined according to all third pixels satisfying the predetermined condition. The exposure degree of the denoised image may be determined according to the highlight region.

In some embodiments, the third processor may be configured to obtain a connected area formed by all the third pixels satisfying the predetermined condition, select a target region satisfying a predetermined rule in all the obtained connected areas, calculate an area corresponding to each target region obtained, and select a target region with the largest area as the highlight region. The predetermined rule may include that the R value, the G value, and the B value of the third pixel in the target area are the same as the R value, the G value and/or the B value of the third pixel in the target region.

In some embodiments, the third processor may be configured to calculate a first area of the highlight region and a second area of the denoised image and determine the exposure degree corresponding to the denoised image according to the ratio of the first area and the second area.

In some embodiments, the first image processing model may include a down-sampling module and a transformation module. The third processor may be configured to input the denoised image into the down-sampling module and obtain a bilateral grid corresponding to the denoised image and a guidance image corresponding to the denoised image through the down-sampling module. The resolution of the guidance image may be the same as the resolution of the denoised image. The third processor may be further configured to input the guidance image, the bilateral grid, and the denoised image into the transformation module and generate the processed image corresponding to the denoised image by the transformation module.

In some embodiments, the down-sampling module includes a down-sampling unit and a convolution unit. The third processor may be configured to input the denoised image into the down-sampling unit and the convolution unit, obtain the bilateral grid corresponding to the denoised image through the down-sampling unit, and obtain the guidance image corresponding to the denoised image through the convolution unit.

In some embodiments, the transformation module may include a segmentation unit and a transformation unit. The third processor may be configured to input the guidance image into the segmentation unit, segment the bilateral grid by the segmentation unit to obtain a color transformation matrix of the pixels in the denoised image, input the denoised image the color transformation matrix of the pixels of the denoised image into the transformation unit, and generate the processed image corresponding to the denoised image through the transformation unit.

In some embodiments, the second image processing model may be obtained by training based on a second training image set. The second training image set may include a plurality of training image groups. Each training image group may include a third image and a fourth image. The third image may be a ghost image corresponding to the fourth image.

In some embodiments, the third image may be generated according to the fourth image and the point spread function. The point spread function may be generated according to a grayscale image generated by the shielding structure of the under-screen imaging system.

In some embodiments, the third image is an image captured by an under-screen imaging system.

In some embodiments, the under-screen imaging system may include an under-screen camera.

In some embodiments, the image processing device further includes a fourth alignment circuit. The fourth alignment circuit may be configured to, for each training image group in the second training image set, perform alignment processing on the third image and the fourth image corresponding to the third image in the training image group to obtain an aligned image aligned with the fourth image, and use the aligned image as a third image.

In some embodiments, the second image processing model may include an encoder and a decoder. The fourth processor may be configured to input the processed image into the encoder to obtain a feature image of the processed image through the encoder, and input the feature image into the decoder, and output an output image corresponding to the processed image through the decoder. The image size of the feature image may be smaller than the image size of the processed image. The image size of the output image may be equal to the image size of the processed image.

In some embodiments, the third alignment circuit and/or the fourth alignment circuit may be configured to obtain a reference image and a benchmark image in a training image group, calculate a pixel deviation amount between the reference image and the benchmark image, determine an alignment manner corresponding to the reference image according to the pixel deviation amount, and performing alignment processing on the reference image and the benchmark image by using the alignment manner. When the benchmark image is the second image, the reference image may be the first image. When the benchmark image is the fourth image, the reference image may be the third image.

In some embodiments, the third alignment circuit and/or the fourth alignment circuit may be configured to, when the pixel deviation amount is less than or equal to the preset deviation amount threshold, perform the alignment processing on the reference image by taking the benchmark image as a basis according to the mutual information of the reference image and the benchmark image, and when the pixel deviation amount is greater than the predetermined deviation amount threshold, extract a benchmark pixel set of the reference image and a reference pixel set of the benchmark image, and for each benchmark pixel in the benchmark pixel set, calculate a coordinate difference of the benchmark pixel and the reference pixel corresponding thereto, and perform position adjustment on the reference pixel according to the coordinate difference corresponding to the reference pixel to align the reference pixel with the benchmark pixel corresponding to the reference pixel.

In some embodiments, the image processing device further includes a sharpening noise reduction circuit. The sharpening noise reduction circuit may be configured to perform sharpening and noise reduction processing on the processed image, and use the processed image after the sharpening and noise reduction processing as the output image.

Based on the image processing method, embodiments of the present disclosure provide a computer-readable storage medium. The computer-readable storage medium may store one or more programs. The one or more programs may be executed by one or more processors to implement processes of the image processing method.

Figure 39:
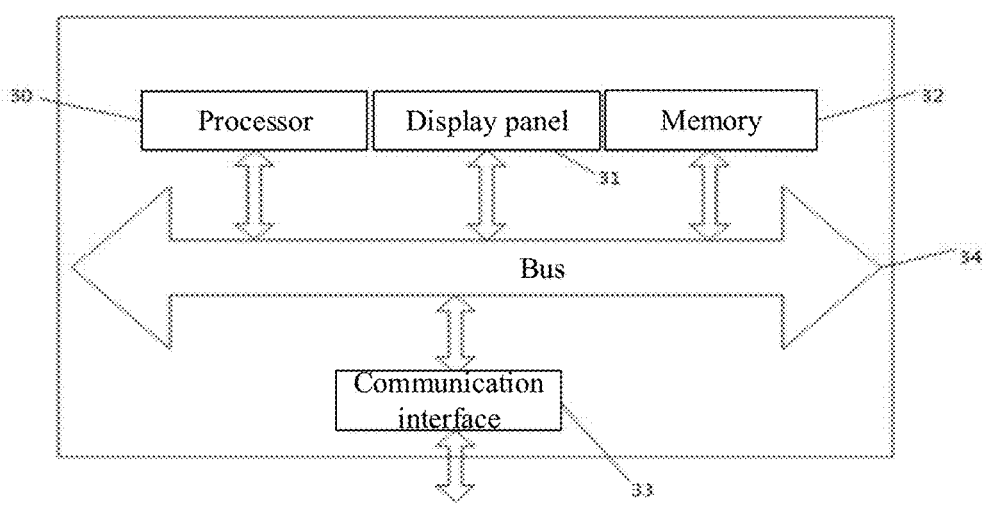
FIG. 39 is a schematic structural diagram of a terminal according to some embodiments of the present disclosure.

Based on the image processing method, the present disclosure further provides a terminal. As shown in FIG. 39, the terminal includes at least one processor 30, a display panel 31, a memory 32, a communications interface 33, and a bus 34. The processor 30, the display panel 31, the memory 32, and the communication interface 33 may communicate with each other through the bus 34. The display panel 31 may be configured to display a predetermined user guidance interface in the initial setting mode. The communication interface 33 may transmit information. The processor 30 may call a logic instruction in the memory 32 to execute the above method.

In addition, the logic instruction in the memory 32 may be implemented in a form of a software functional unit. When the logic instruction is sold or used as an independent product, the logic instruction may be stored in a computer-readable storage medium.

As a computer-readable storage medium, the memory 32 may be used to store a software program, a computer-executable program, such as a program instruction or module corresponding to the methods of embodiments of the present disclosure. The processor 30 may be configured to execute a functional application and data processing, that is the above method, by running the software program, the instruction, or the module stored in the memory 32.

The memory 32 may include a storage program area and a storage data area. The storage program area may store an operating system, and an application program required for at least one function. The storage data area may store data created according to the use of the terminal. In addition, the memory 32 may include a high-speed random access memory, and a non-volatile memory. For example, U disk, portable hard drive, read-only memory (ROM), random access memory (RAM), magnetic disk, or optical disk that can store program codes, or a temporary state storage medium.

In addition, the specific process of loading and executing the plurality of instructions of the above storage medium and the terminal by the processor has been described in detail in the above-mentioned method, which is not repeated here.

The above embodiments may be only used to illustrate the technical solutions of the present disclosure, but not to limit them. Although the present disclosure is described in detail with reference embodiments of the present disclosure, those of ordinary skill in the art should understand that modifications may still be made to the technical solutions described in embodiments of the present disclosure, or equivalent replacements may be made to some technical features. These modifications or replacements do not make the essence of the corresponding technical solutions depart from the spirit and scope of the technical solutions of embodiments of the present disclosure.

What is claimed is:

1. An image processing method comprising:
   obtaining a to-be-processed image captured by an under-screen camera;
   performing an image processing operation on the to-be-processed image by inputting the to-be-processed image into a corresponding image processing model to obtain a processed image, the image processing operation including at least ghost effect removal processing, wherein the image processing model corresponding to color deviation removal processing is a first image processing model, and the image processing model corresponding to the ghost effect removal processing is a second image processing model; and
   obtaining an output image according to the processed image of the corresponding image processing model,
   wherein each image processing model is generated by:
      generating a generated image corresponding to a first image by a predetermined network model according to the first image of a training image set, the training image set including a plurality of training image groups, each training image group including the first image and a second image, wherein the first image is a color deviation image of the second image for the first image processing model, or the first image is a ghost effect image of the second image for the second image processing model; and correcting a model parameter by the predetermined network model according to the second image corresponding to the first image and the generated image corresponding to the first image, and continuing to generate an updated generated image corresponding to a next first image according to the next first image in a next training image group of the training image set until a training condition of the predetermined network model satisfies a predetermined condition, wherein the first image is generated based on an under-screen imaging system, and the second image describes a same content as the first image and is acquired without the under-screen imaging system wherein: the predetermined network model for generating the second image processing model corresponding to the ghost effect removal processing includes an encoder and a decoder; and generating the generated image corresponding to the first image by the predetermined network model according to the first image of the training image set includes:

inputting the first image of the training image set into the encoder to obtain a feature image of the first image through the encoder, an image size of the feature image being smaller than an image size of the first image; and inputting the feature image into the decoder to output the generated image through the decoder, an image size of the generated image being equal to the image size of the first image.

2. The method according to claim 1, wherein obtaining the to-be-processed image and inputting the to-be-processed image into the first image processing model includes:

extracting an exposure degree of the to-be-processed image;

determining a model parameter corresponding to the to-be-processed image according to the exposure degree and updating a model parameter of the first image processing model by using the model parameter corresponding to the to-be-processed image; and inputting the to-be-processed image into the updated first image processing model.

3. The method according to claim 2, wherein extracting the exposure degree of the to-be-processed image includes:

determining one or more pixels satisfying a predetermined condition according to an R value, a G value, and a B value of each of pixels in the to-be-processed image, the predetermining condition including that at least one of the R value, the G value, or the B value is greater than a predetermined threshold; and determining a highlight region of the to-be-processed image according to the one or more pixels satisfying the predetermined condition and the exposure degree of the to-be-processed image according to the highlight region.

4. The method according to claim 3, wherein determining the highlight region of the to-be-processed image according to all the pixels satisfying the predetermined condition includes:

obtaining one or more connected regions formed by the one or more pixels satisfying the predetermined condition and selecting one or more target regions satisfying a predetermined rule in the obtained one or more connected regions, the predetermined rule including that pixels having the R value, the G value, and/or the B value greater than the predetermined threshold of R values, G values, and B values belong to a same type; and calculating areas corresponding to the one or more target regions and selecting a target region with a largest area as the highlight region.

5. The method according to claim 3, wherein determining the exposure degree of the to-be-processed image according to the highlight region includes:

calculating a first area of the highlight region and a second area of the to-be-processed image; and determining the exposure degree corresponding to the to-be-processed image according to a ratio of the first area and the second area.

6. The method according to claim 1, wherein:

the training image set for generating the first image processing model corresponding to the color deviation removal processing includes a plurality of training image sub-sets;

each training image sub-set includes a plurality of training sample image groups;

first images of any two training sample image groups of the plurality of training image groups have a same exposure degree;

an exposure degree of a second image of each training sample image group of the plurality training image groups is in a predetermined range; and first images of any two training image sub-sets have different exposure degrees.

7. The method according to claim 1, wherein:

the first image processing model includes a plurality of model parameters;

each model parameter is trained according to a training image sub-set of the training image set; and any two model parameters correspond to different training image sub-sets are different.

8. The method according to claim 1, wherein:

the predetermined network model for generating the first image processing model corresponding to the color deviation removal processing includes a down-sampling module and a transformation module; and generating the generated image corresponding to the first image by the predetermined network model according to the first image of the training image set includes:

inputting the first image of the training image set into the down-sampling module to obtain a bilateral grid corresponding to the first image and a guidance image corresponding to the first image through the down-sampling module, the guidance image and the first image having a same resolution; and inputting the guidance image, the bilateral grid, and the first image into the transformation module to generate the generated image corresponding to the first image through the transformation module.

9. The method according to claim 8, wherein:

the down-sampling module includes a down-sampling unit and a convolution unit; and inputting the first image of the training image set into the down-sampling module to obtain the bilateral grid corresponding to the first image and the guidance image corresponding to the first image through the down-sampling module includes:

inputting the first image of the training image set into the down-sampling unit and the convolution unit; and obtaining the bilateral grid corresponding to the first image through the down-sampling unit and the guidance image corresponding to the first image through the convolution unit.

10. The method according to claim 8, wherein:
the transformation module includes a segmentation unit and a transformation unit; and
inputting the guidance image, the bilateral grid, and the first image into the transformation module to generate the generated image corresponding to the first image through the transformation module includes:
  inputting the guidance image into the segmentation unit to divide the bilateral grid to obtain a color transformation matrix of pixels in the first image; and
  inputting the first image and the color transformation matrix of the pixels in the first image into the transformation unit to generate the generated image corresponding to the first image.

11. The method according to claim 1, wherein before generating the generated image corresponding to the first image according to the first image of the training image set, the predetermine network model is configured to:
for each training image group of the training image set, perform alignment processing on the first image and the second image of the training image group to obtain an aligned image aligned with the second image, and use the aligned image as the first image.

12. The method according to claim 11, wherein performing the alignment processing on the first image and the second image of the training image group includes:
  obtaining a pixel deviation amount between the first image and the second image of the training image group; and
  determining an alignment manner corresponding to the first image according to the pixel deviation amount and performing the alignment processing on the first image and the second image by the alignment manner.

13. The method according to claim 12, wherein determining the alignment manner corresponding to the first image according to the pixel deviation amount and performing the alignment processing on the first image and the second image by the alignment manner includes:
  in response to the pixel deviation amount being smaller than or equal to a predetermined deviation threshold, performing the alignment processing on the first image by using the second image as a reference according to mutual information of the first image and the second image; and
  in response to the pixel deviation amount being greater than the predetermined deviation threshold, extracting a first pixel set of the first image and a second pixel set of the second image, the first pixel set including a plurality of first pixels of the first image, the second pixel set including a plurality of second pixels of the second image, the second pixels of the second pixel set having a one-to-one correspondence with the first pixels of the first pixel set, and for each first pixel of the first pixel set, calculating a coordinate difference between the first pixel and a second pixel corresponding to the first pixel and performing position transformation on the first pixel according to the coordinate difference corresponding to the first pixel to align the first pixel with the second pixel.

14. The method according to claim 1, further comprising, after performing the color image processing operation on the to-be-processed image to obtain the processed image corresponding to the to-be-processed image:
performing sharpening and noise reduction processing on the processed image; and
using the image after the sharpening and noise reduction processing as an updated processed image corresponding to the to-be-processed image.

15. The method according to claim 1, wherein:
the second image processing model includes the encoder and the decoder; and
performing the ghost effect removal processing on the to-be-processed image includes:
  inputting the to-be-processed image into the encoder to obtain a target feature image of the to-be-processed image, an image size of the target feature image being smaller than an image size of the to-be-processed image; and
  inputting the target feature image into the decoder to output the output image corresponding to the to-be-processed image, an image size of the output image being equal to the image size of the to-be-processed image.

16. The method according to claim 1, wherein when generating the second image processing model corresponding to the ghost effect removal processing, correcting the model parameter of the predetermined network model by the predetermined network model according to the second image corresponding to the first image and the generated image corresponding to the first image and continuing to generate the updated generated image corresponding to the next first image according to the next first image in the next training image group of the training image set until the training condition of the predetermined network model satisfies the predetermined condition includes:
  calculating a structural similarity loss function value and a contextual bilateral loss function value corresponding to the predetermined network model according to the second image corresponding to the first image and the generated image corresponding to the first image;
  obtaining a total loss function value of the predetermined network model according to the structural similarity loss function value and the contextual bilateral loss function value; and
  training the predetermined network model based on the total loss function value and continuing to generate the updated generated image corresponding to the next first image according to the next first image of the next training image group of the training image set until the training condition of the predetermined network model satisfies the predetermined condition.

17. The method according to claim 1, wherein:
the first image is generated according to the second image and a point spread function; and
the point spread function is generated according to a grayscale image generated by a light-shielding structure of the under-screen imaging system.

18. The method according to claim 1, wherein obtaining the to-be-processed image comprises:
  obtaining a to-be-processed image set, the to-be-processed image set including a plurality of images;
  generating a denoised image corresponding to the to-be-processed image set according to the to-be-processed image set, wherein the denoised image is used as the to-be-processed image.

19. The method according to claim 18, wherein:
one of the plurality of images included in the to-be-processed image set is a base image, and the rest of the images are neighboring images of the base image; and generating the denoised image corresponding to the to-be-processed image set according to the to-be-processed image set includes:
  dividing the base image into a plurality of base image blocks to determine neighboring image blocks of the neighboring images corresponding to the base image;
  determining a weight parameter set corresponding to the base image blocks, the weight parameter set including a first weight parameter and a second weight parameter, the first weight parameter being a weight parameter of the base image blocks, and the second weight parameter being a weight parameter of neighboring image blocks corresponding to the base image in the neighboring image; and
  determining the denoised image according to the to-be-processed image set and the weight parameter set corresponding to the base image block.

20. The method according to claim 19, wherein:
a definition of the base image is greater than or equal to a definition of the neighboring images.

21. The method according to claim 19, wherein determining the weight parameter set corresponding to the base image blocks includes:
for each base image block, determining the second weight parameter of the neighboring image blocks corresponding to the base image block and obtaining the first weight parameter corresponding to the base image block to obtain the weight parameter set corresponding to the base image block.

22. The method according to claim 21, wherein determining the second weight parameter of the neighboring image blocks corresponding to the base image block includes:
for each neighboring image block, calculating a similarity degree of the base image block and the neighboring image block; and
calculating the second weight parameter of the neighboring image block according to the similarity degree.

23. The method according to claim 22, wherein calculating the second weight parameter of the neighboring image block according to the similarity degree includes:
in response to the similarity degree being smaller than or equal to a first threshold, using a first predetermined parameter as the second weight parameter of the neighboring image block;
in response to the similarity degree being greater than the first threshold and smaller than or equal to a second threshold, calculating the second weight parameter of the neighboring image block according to the similarity degree, the first threshold, and the second threshold; and
in response to the similarity degree being greater than the second threshold, using a second predetermined parameter as the second weight parameter of the neighboring image block.

24. A terminal comprising:
a processor; and
a memory storing a program that, when executed by the processor, causes the processor to:
  obtain a to-be-processed image captured by an under-screen camera;
  perform an image processing operation on the to-be-processed image by inputting the to-be-processed image into a corresponding image processing model to obtain a processed image, the image processing operation including at least ghost effect removal processing, wherein the image processing model corresponding to color deviation removal processing is a first image processing model, and the image processing model corresponding to the ghost effect removal processing is a second image processing model; and
  obtain an output image according to the processed image of the corresponding image processing model,
  wherein each image processing model is generated by:
    generating a generated image corresponding to a first image by a predetermined network model according to the first image of a training image set, the training image set including a plurality of training image groups, each training image group including the first image and a second image, wherein the first image is a color deviation image of the second image for the first image processing model, or the first image is a ghost effect image of the second image for the second image processing model; and
    correcting a model parameter by the predetermined network model according to the second image corresponding to the first image and the generated image corresponding to the first image, and continuing to generate an updated generated image corresponding to a next first image according to the next first image in a next training image group of the training image set until a training condition of the predetermined network model satisfies a predetermined condition,
  wherein the first image is generated based on an under-screen imaging system, and the second image describes a same content as the first image and is acquired without the under-screen imaging system
  wherein: the predetermined network model for generating the second image processing model corresponding to the ghost effect removal processing includes an encoder and a decoder; and
  generating the generated image corresponding to the first image by the predetermined network model according to the first image of the training image set includes:
    inputting the first image of the training image set into the encoder to obtain a feature image of the first image through the encoder, an image size of the feature image being smaller than an image size of the first image; and
    inputting the feature image into the decoder to output the generated image through the decoder, an image size of the generated image being equal to the image size of the first image.

25. A non-transitory computer readable storage medium storing one or more computer programs, the one or more computer programs, when executed by a processor, causing the processor to:
  obtain a to-be-processed image captured by an under-screen camera;
  perform an image processing operation on the to-be-processed image by inputting the to-be-processed image into a corresponding image processing model to obtain a processed image, the image processing operation including at least ghost effect removal processing, wherein the image processing model corresponding to color deviation removal processing is a first image processing model, and the image processing model corresponding to the ghost effect removal processing is a second image processing model; and
  obtain an output image according to the processed image of the corresponding image processing model, wherein each image processing model is generated by:
   generating a generated image corresponding to a first image by a predetermined network model according to the first image of a training image set, the training image set including a plurality of training image groups, each training image group including the first image and a second image, wherein the first image is a color deviation image of the second image for the first image processing model, or the first image is a ghost effect image of the second image for the second image processing model; and
   correcting a model parameter by the predetermined network model according to the second image corresponding to the first image and the generated image corresponding to the first image, and continuing to generate an updated generated image corresponding to a next first image according to the next first image in a next training image group of the training image set until a training condition of the predetermined network model satisfies a predetermined condition,
   wherein the first image is generated based on an under-screen imaging system, and the second image describes a same content as the first image and is acquired without the under-screen imaging system
wherein: the predetermined network model for generating the second image processing model corresponding to the ghost effect removal processing includes an encoder and a decoder; and
generating the generated image corresponding to the first image by the predetermined network model according to the first image of the training image set includes:
   inputting the first image of the training image set into the encoder to obtain a feature image of the first image through the encoder, an image size of the feature image being smaller than an image size of the first image; and
   inputting the feature image into the decoder to output the generated image through the decoder, an image size of the generated image being equal to the image size of the first image.

* * * * *